US 8,745,064 B2
Jun. 3, 2014

(12) United States Patent
Carter

(10) Patent No.: US 8,745,064 B2
(45) Date of Patent: Jun. 3, 2014

(54) SYSTEMS AND METHODS FOR OPERATING A SATURATED HASH TABLE

(75) Inventor: Alan Geoffrey Carter, Galway (IE)

(73) Assignee: Lumension Security, Inc., Scottsdale, AZ (US)

( * ) Notice: Subject to any disclaimer, the term of this patent is extended or adjusted under 35 U.S.C. 154(b) by 121 days.

(21) Appl. No.: 13/230,575

(22) Filed: Sep. 12, 2011

(65) Prior Publication Data

US 2012/0066229 A1 Mar. 15, 2012

Related U.S. Application Data

(60) Provisional application No. 61/382,432, filed on Sep. 13, 2010.

(51) Int. Cl.
G06F 17/30 (2006.01)

(52) U.S. Cl.
USPC ............................ 707/747; 707/758; 709/206

(58) Field of Classification Search
CPC ............... G06F 17/30949; G06F 17/30067; G06F 17/30864; G06Q 10/10; G06Q 10/107
USPC ................ 726/28; 707/747, 758; 709/206
See application file for complete search history.

(56) References Cited

U.S. PATENT DOCUMENTS

| 6,990,660 | B2 | 1/2006 | Moshir et al. | 717/171 |
|---|---|---|---|---|
| 7,278,158 | B2 | 10/2007 | Peretti | 726/21 |
| 7,487,495 | B2 | 2/2009 | Usov | 717/139 |
| 7,849,514 | B2 | 12/2010 | Usov et al. | 726/28 |
| 8,060,924 | B2 | 11/2011 | Usov | 726/10 |
| 2003/0014667 | A1 | 1/2003 | Kolichtchak | 713/201 |
| 2004/0220975 | A1 | 11/2004 | Carpentier et al. | 707/200 |
| 2007/0276793 | A1* | 11/2007 | Han | 707/2 |
| 2008/0005203 | A1 | 1/2008 | Bots et al. | 707/205 |
| 2009/0210267 | A1 | 8/2009 | Fish et al. | 705/7 |
| 2009/0256938 | A1* | 10/2009 | Bechtel et al. | 348/302 |
| 2010/0106734 | A1 | 4/2010 | Calder et al. | 707/758 |

OTHER PUBLICATIONS

Extended Search Report, dated Jan. 24, 2012 from corresponding European Patent App. No. 11181022.2.
Appleby, A., "MurmurHash," pp. 1-2, retrieved from the Internet on Feb. 10, 2012 at http://sites.google.com/site/murmurhash/.
Partow, A. "General Purpose Hash Function Algorithms," pp. 1-6, retrieved from the Internet on Sep. 10, 2010 at http://www.partow.net/programming/hashfunctions/.
"Hash Functions—djb2 and sdbm," pp. 1-2, retrieved from the Internet on Feb. 2, 2012 at http://www.cse.yorku.ca/~oz/hash.html.

(Continued)

Primary Examiner — Alex Gofman
Assistant Examiner — Tuan-Khanh Phan
(74) Attorney, Agent, or Firm — Greenberg Traurig, LLP

(57) ABSTRACT

Systems and methods for operating a saturated hash table are disclosed. In one embodiment, a system includes a hash table located in memory of a computer and a hash program in communication with the hash table. The hash table may include a plurality of index positions, and the hash program may be operable to populate the hash table with a first new digest value, where the first new digest value is associated with a first data item. The first new digest value may be stored at least at a first index position and a second index position of the hash table.

15 Claims, 47 Drawing Sheets

(56) References Cited

OTHER PUBLICATIONS

"Jenkins hash function," pp. 1-2, last modified on Jan. 29, 2012, retrieved from the Internet on Feb. 10, 2012 at http://en.wikipedia.org/wiki/Jenkins_hash_function.

"Fowler-Noll-Vo has function," pp. 1-3, last modified on Dec. 4, 2011, retrieved from the Internet on Feb. 10, 2012 at http://en.wikipedia.org/wiki/Fowler-Noll-Vo_hash_function.

"Pearson hashing," p. 1, last modified on Dec. 18, 2010, retrieved from the Internet on Feb. 10, 2012, at http://en.wikipedia.org/wiki/Pearson_hashing.

"Zobrist hashing," pp. 1-2, last modified on Jan. 17, 2012, retrieved from the Internet on Feb. 10, 2012, at http://en.wikipedia.org/wiki/Zobrist_hashing.

"Brownian noise"—Wikipedia, the free encyclopedia, retrieved from the Internet on Apr. 20, 2012 at http://en.wikipedia.org/wiki/Brownian_noise.

"Pink noise"—Wikipedia, the free encyclopedia, retrieved from the Internet on Apr. 20, 2012 at http://en.wikipedia.org/wiki/Pink_noise.

* cited by examiner

|      |          |
|------|----------|
| 0001 | 78654376 |
| 0002 | 56185468 |
| 0003 | 24629561 |
| 0004 | 34792764 |
| ⋮    | ⋮        |
| 0627 | 34792764 |
| ⋮    | ⋮        |
| 1024 | 41296154 |

FIG. 4e

| | | |
|---|---|---|
| 0001 | 78654376 | 230_{FN2} |
| 0002 | 67921486 | |
| 0003 | 24629561 | |
| 0004 | 34792764 | 230_{FN1} |
| ⋮ | ⋮ | |
| 0627 | 34792764 | 230_{FN1} |
| ⋮ | ⋮ | |
| 1024 | 67921486 | 230_{FN2} |

| 0001 | 78654376 |
|------|----------|
| 0002 | 56185468 |
| 0003 | 24629561 |
| 0004 | 67921486 |
| ⋮ | ⋮ |
| 0627 | 34792764 |
| ⋮ | ⋮ |
| 1024 | 67921486 |

FIG. 5d

| | | |
|---|---|---|
| | 0001 | 78654376 |
| | 0002 | 56185468 |
| | 0003 | 24629561 |
| $212_4$ | 0004 | 67921486 | $230_{FN2}$
| | ⋮ | ⋮ |
| $212_{627}$ | 0627 | 67921486 | $230_{FN2}$
| | ⋮ | ⋮ |
| | 1024 | 41296154 |

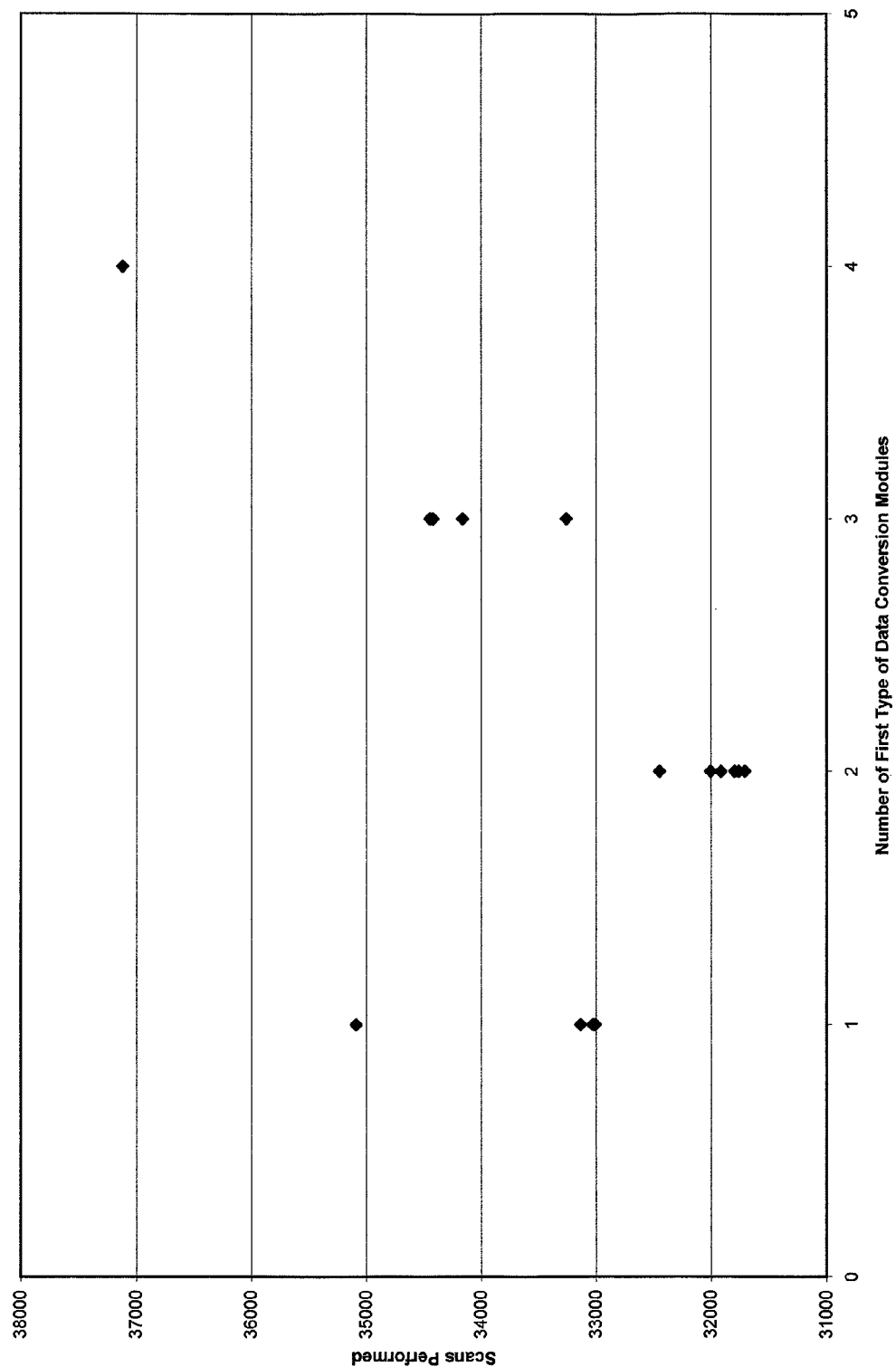
FIG. 9 - 1024 Byte Table

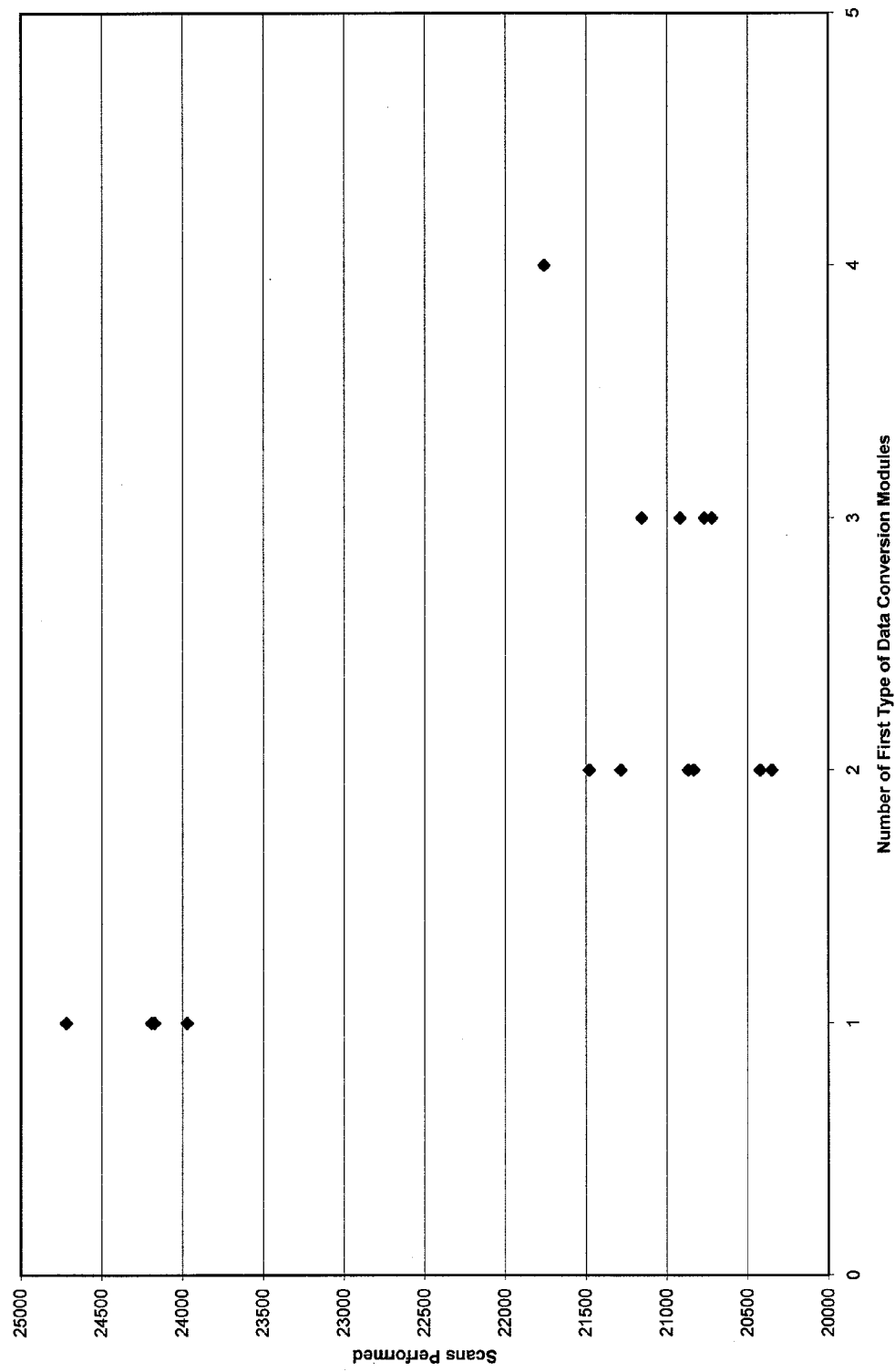
FIG. 10 - 2048 Byte Table

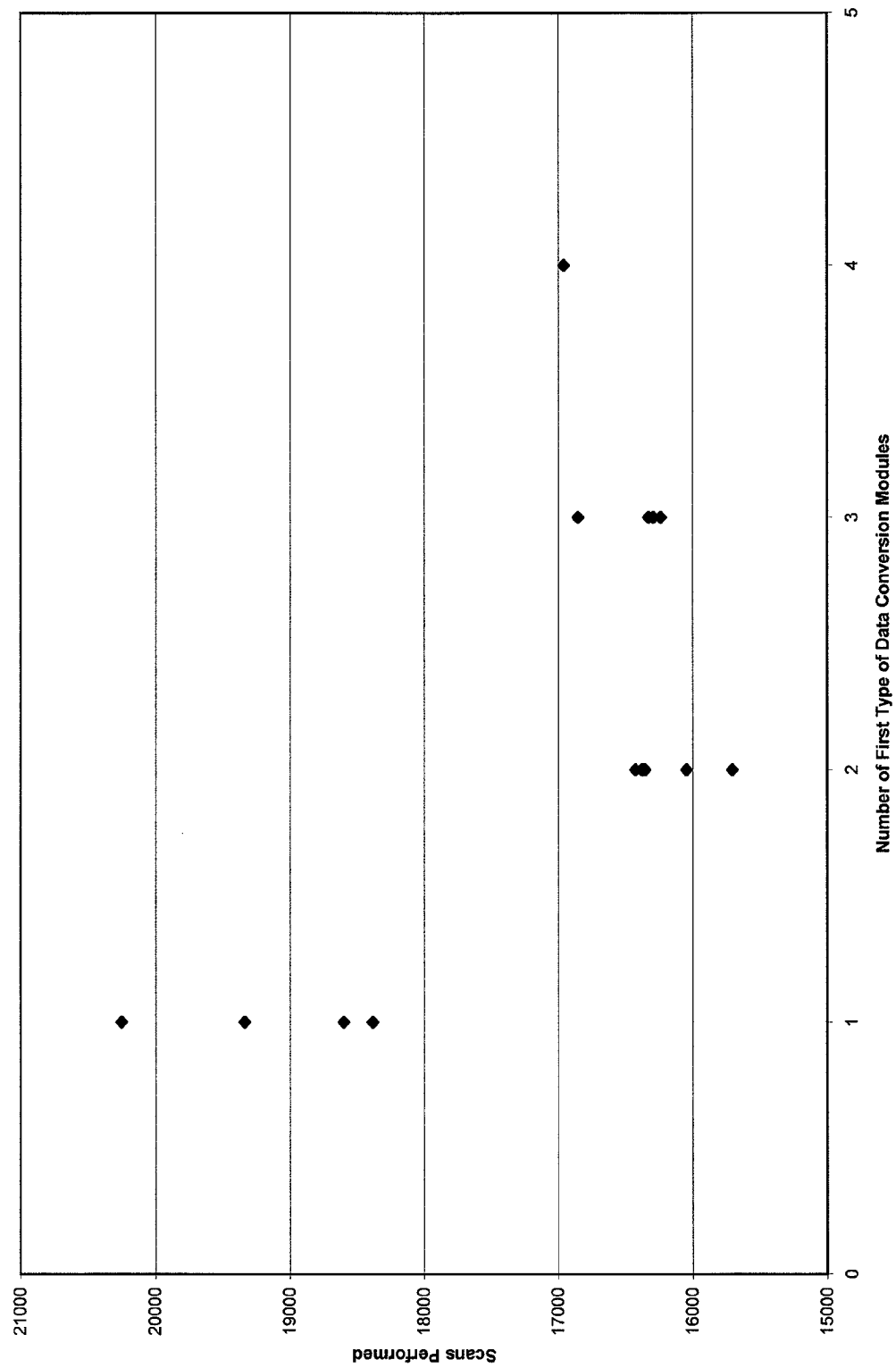
FIG. 11 - 3072 Byte Table

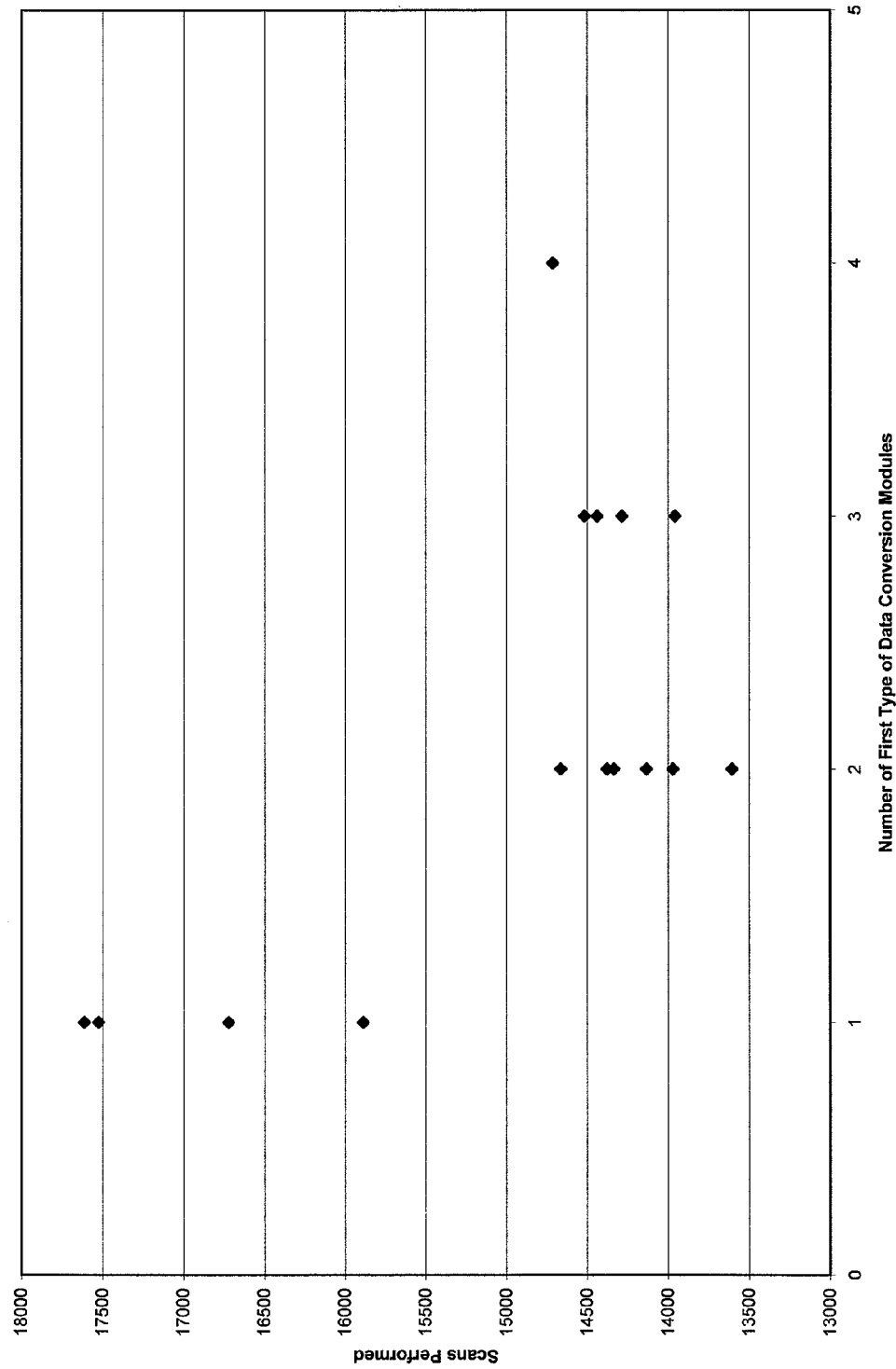
FIG. 12 - 4096 Byte Table

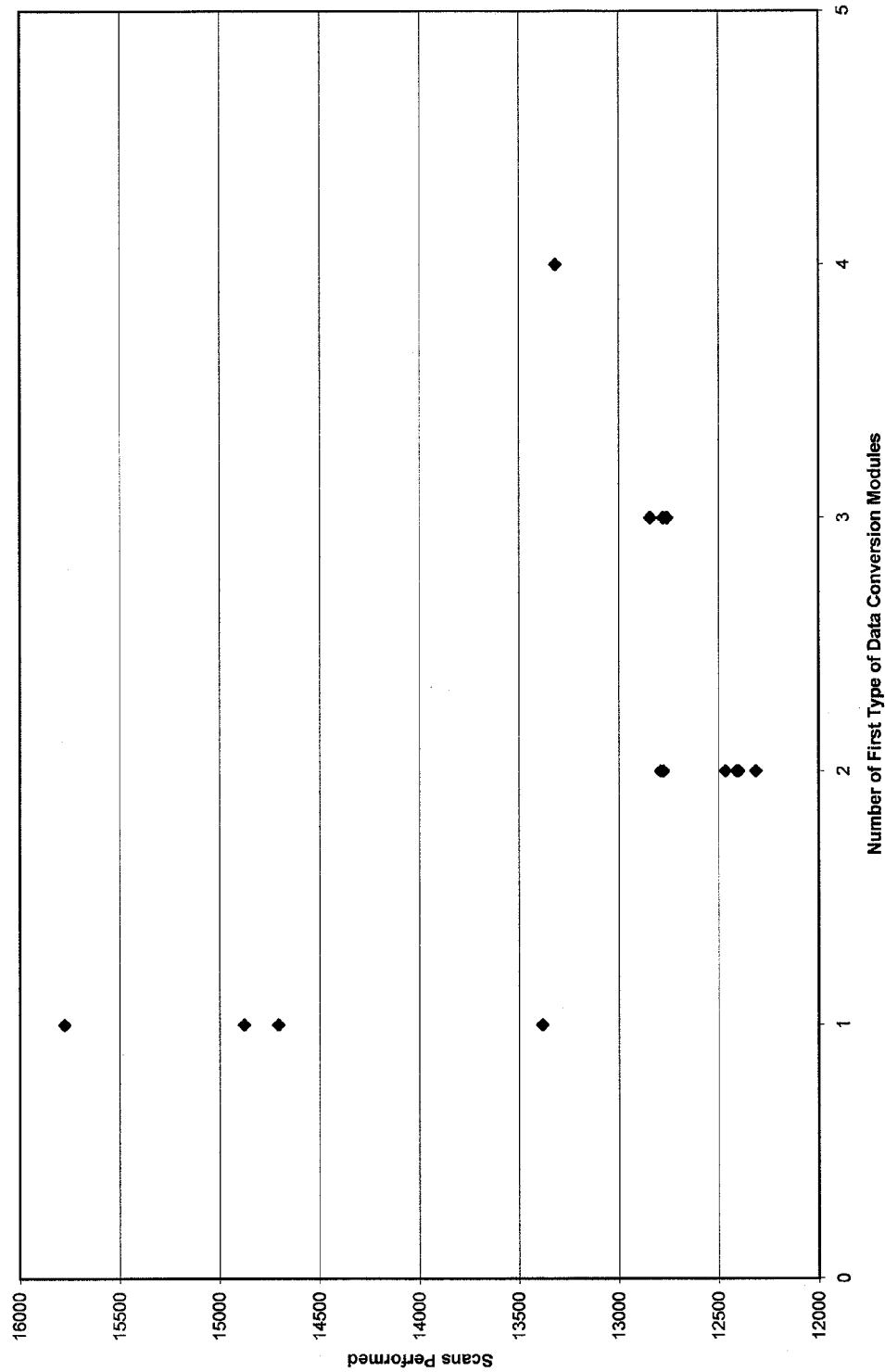
FIG. 13 - 5120 Byte Table

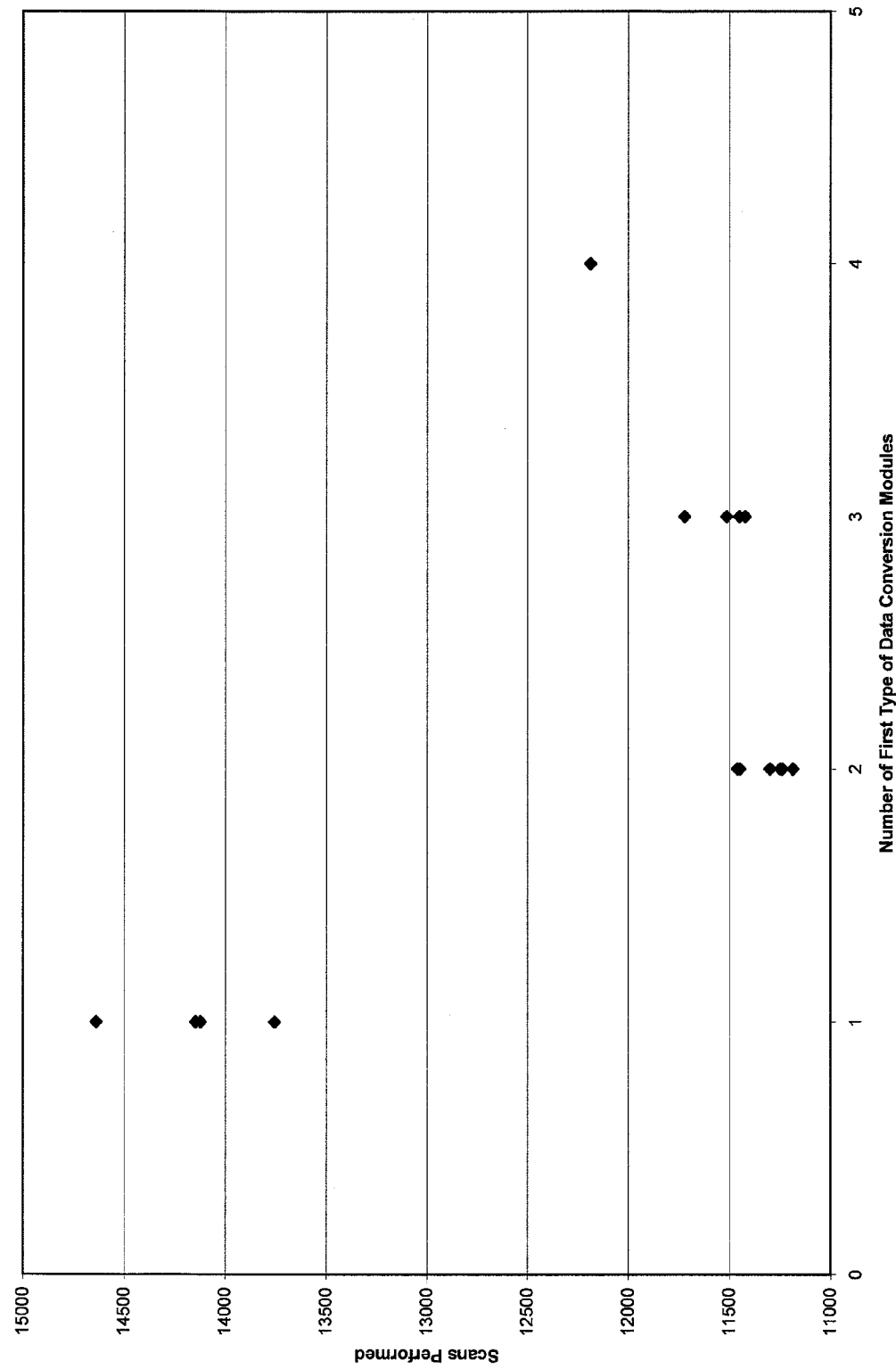
FIG. 14 - 6144 Byte Table

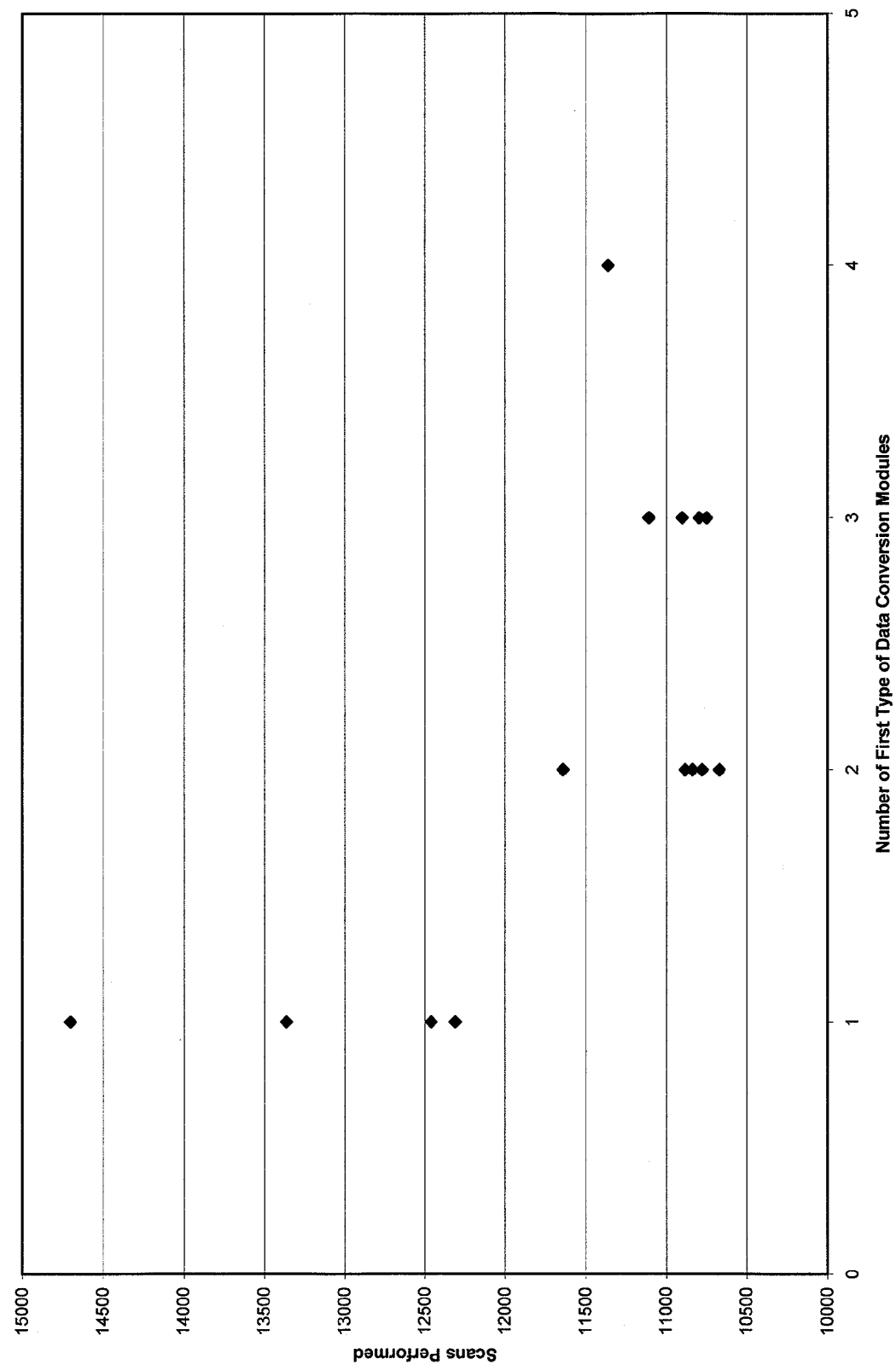

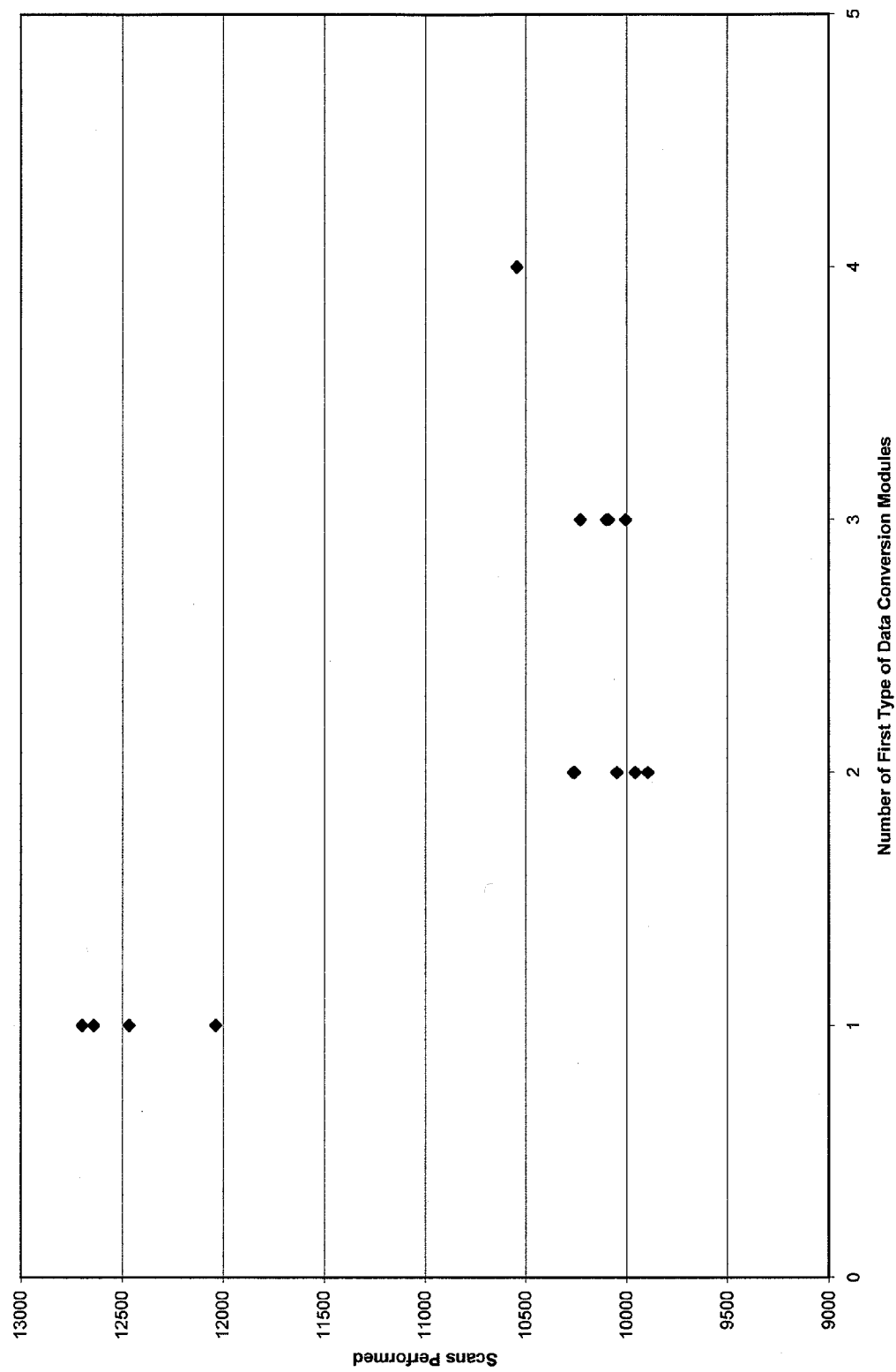
FIG. 16 - 8192 Byte Table

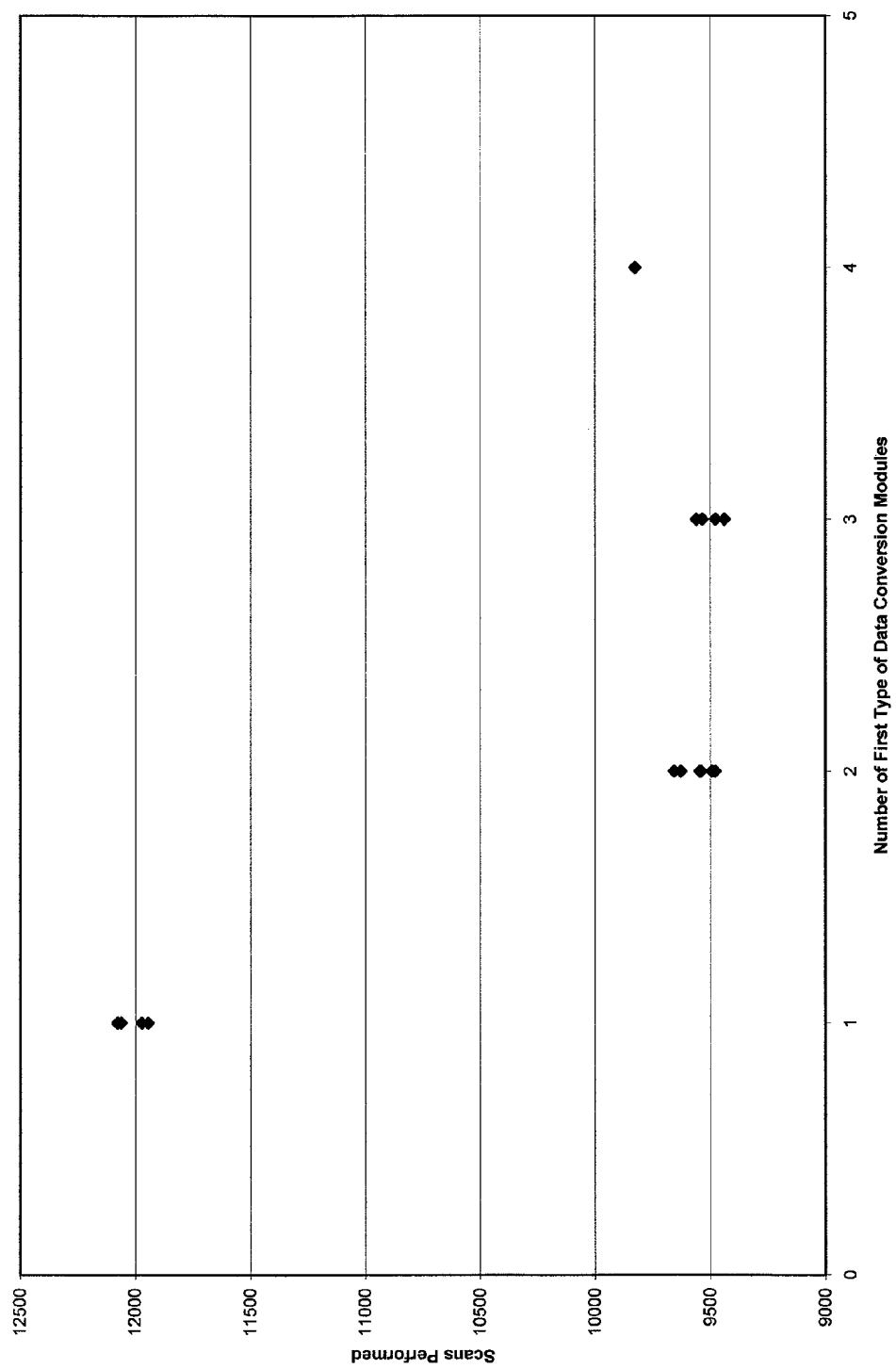

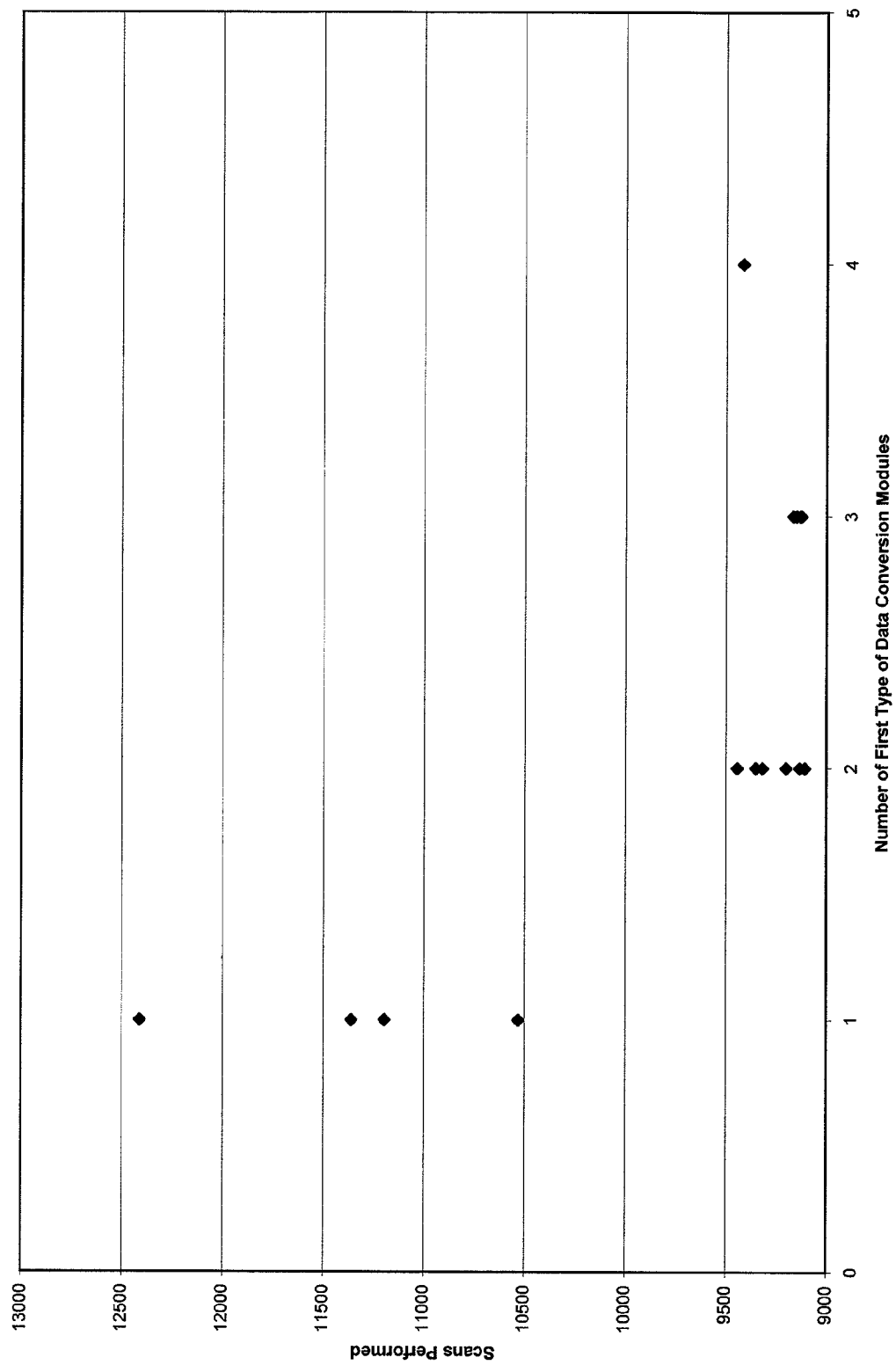
FIG. 18 - 10240 Byte Table

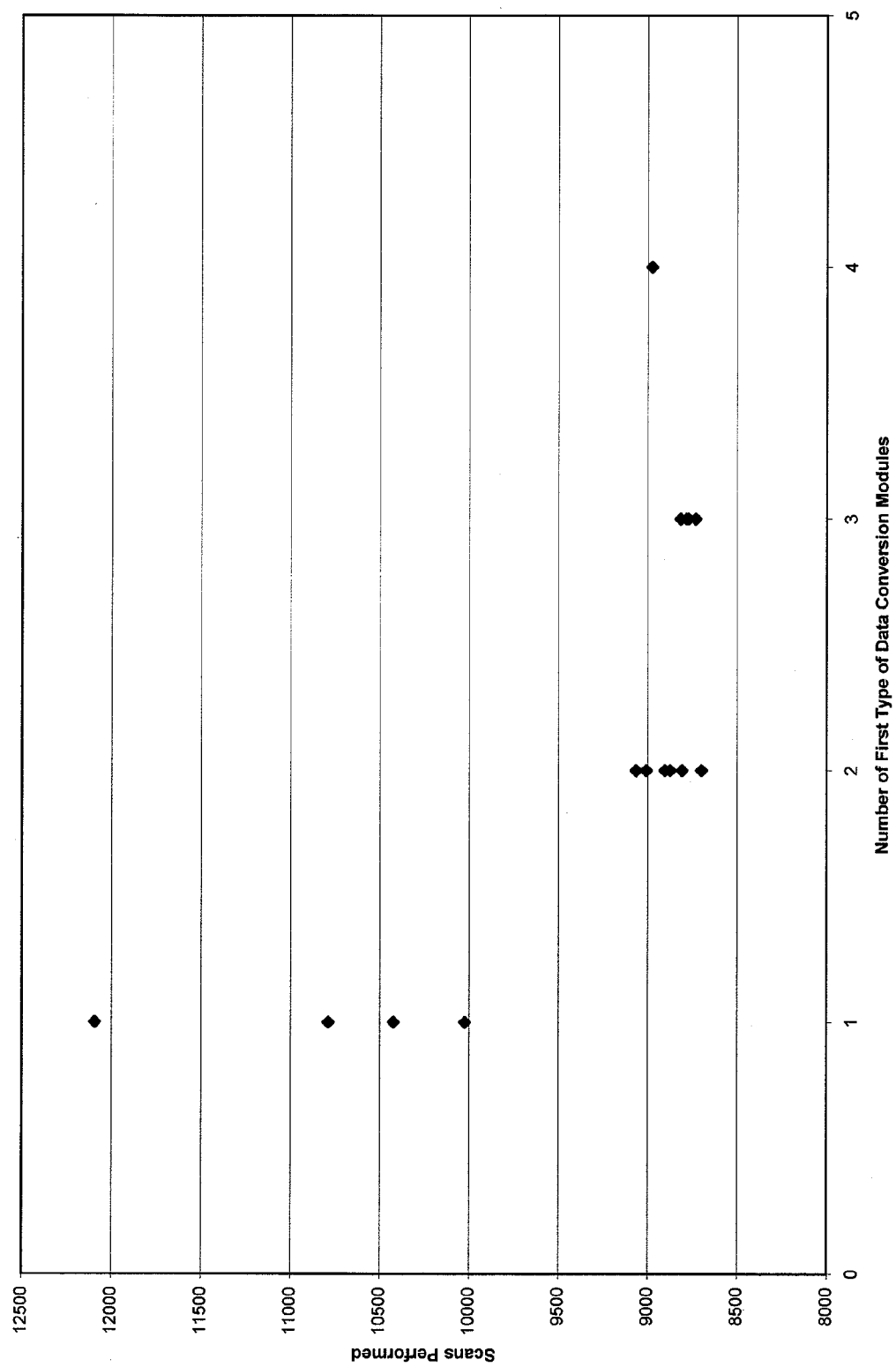
FIG. 19 - 11264 Byte Table

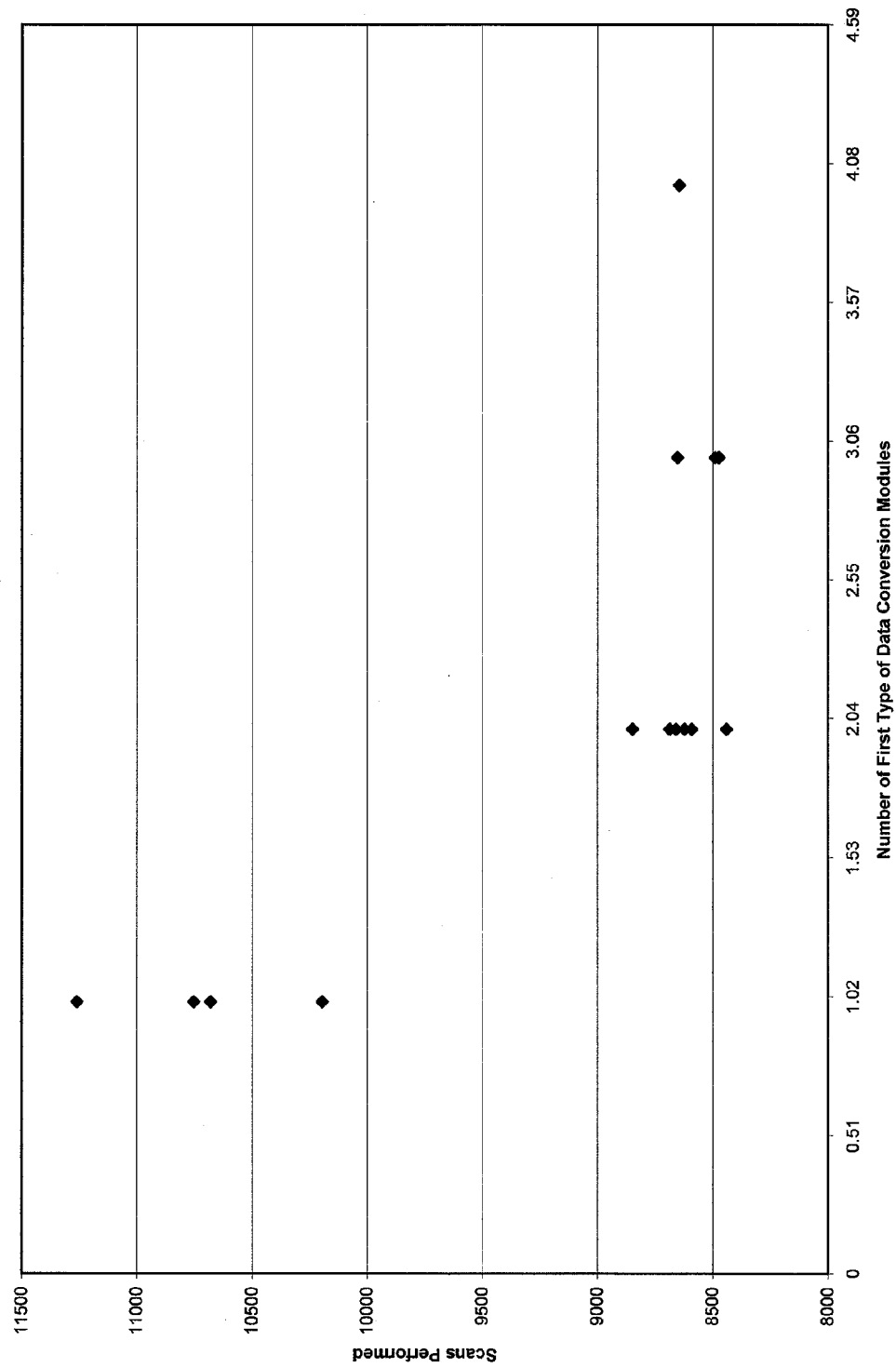

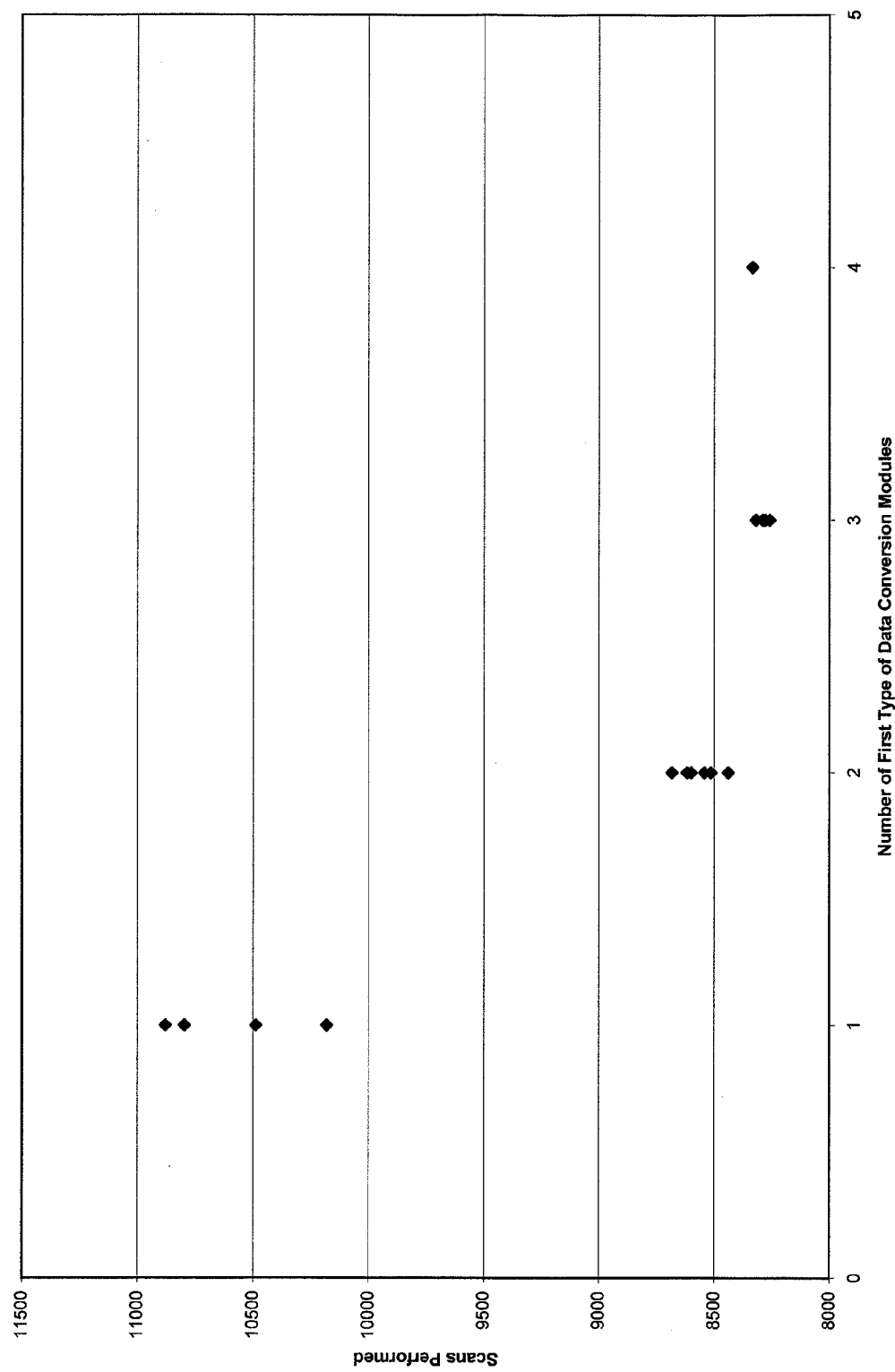
FIG. 21 - 13312 Byte Table

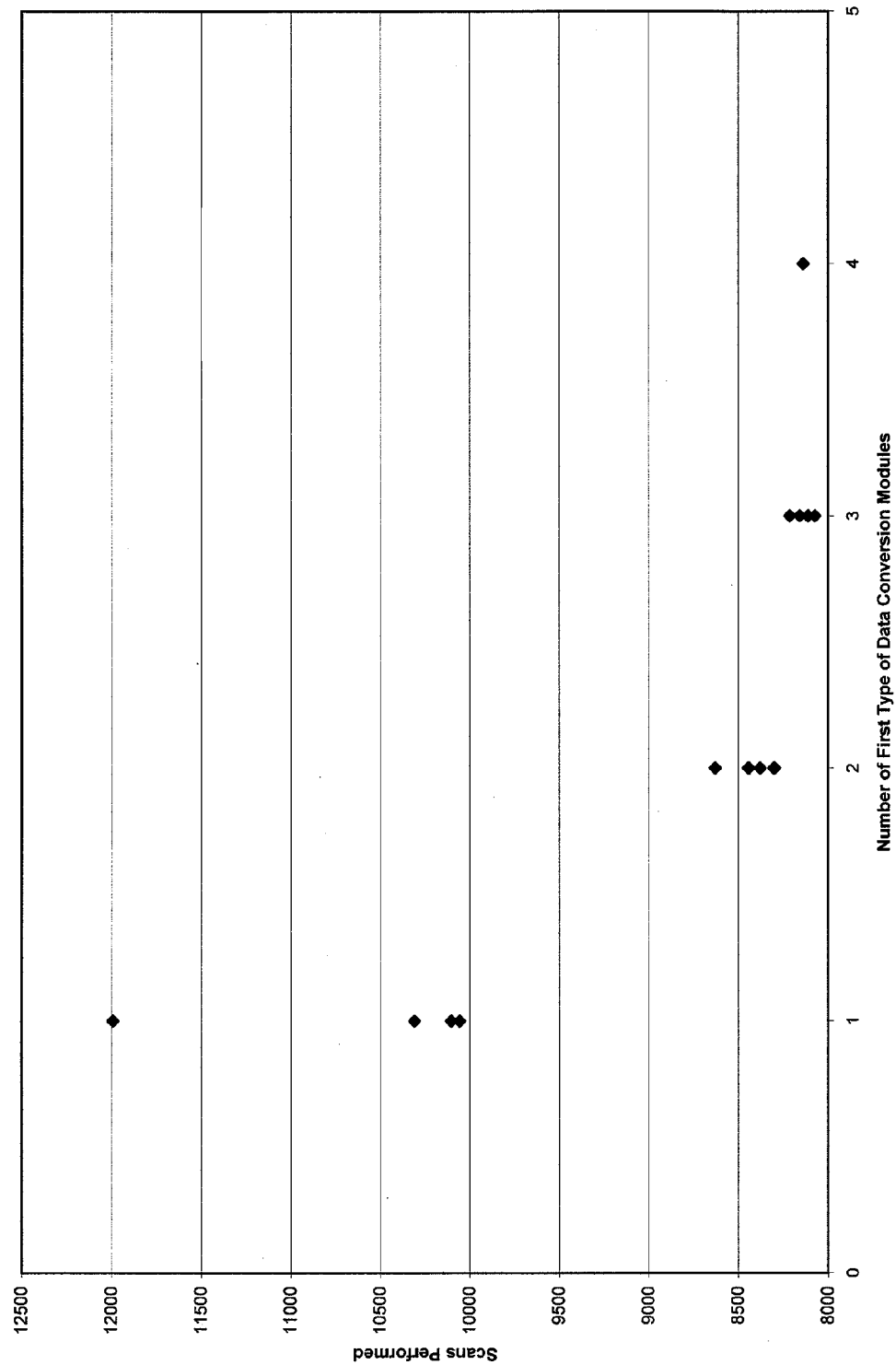
FIG. 22 - 14336 Byte Table

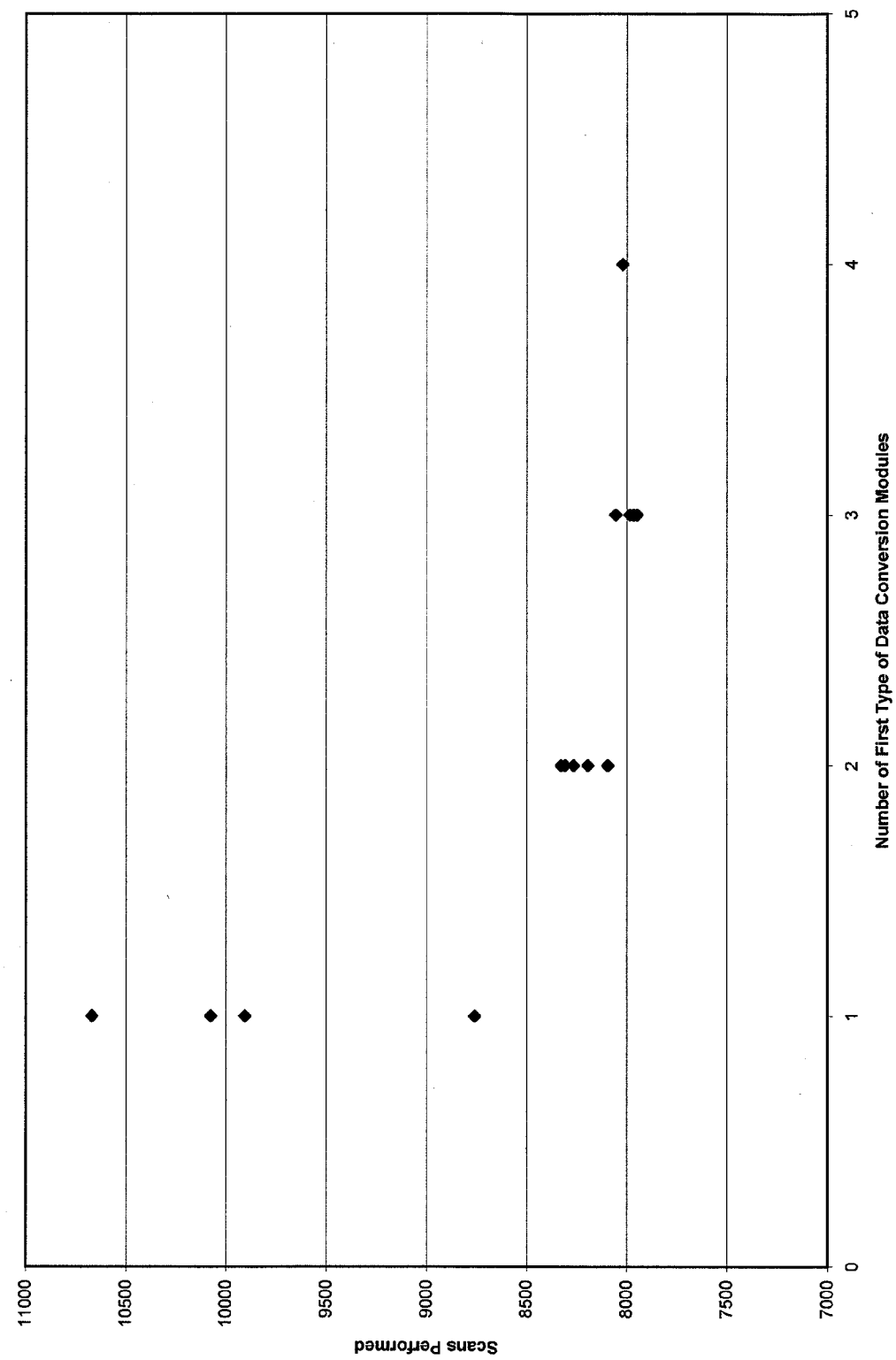
FIG. 23 - 15360 Byte Table

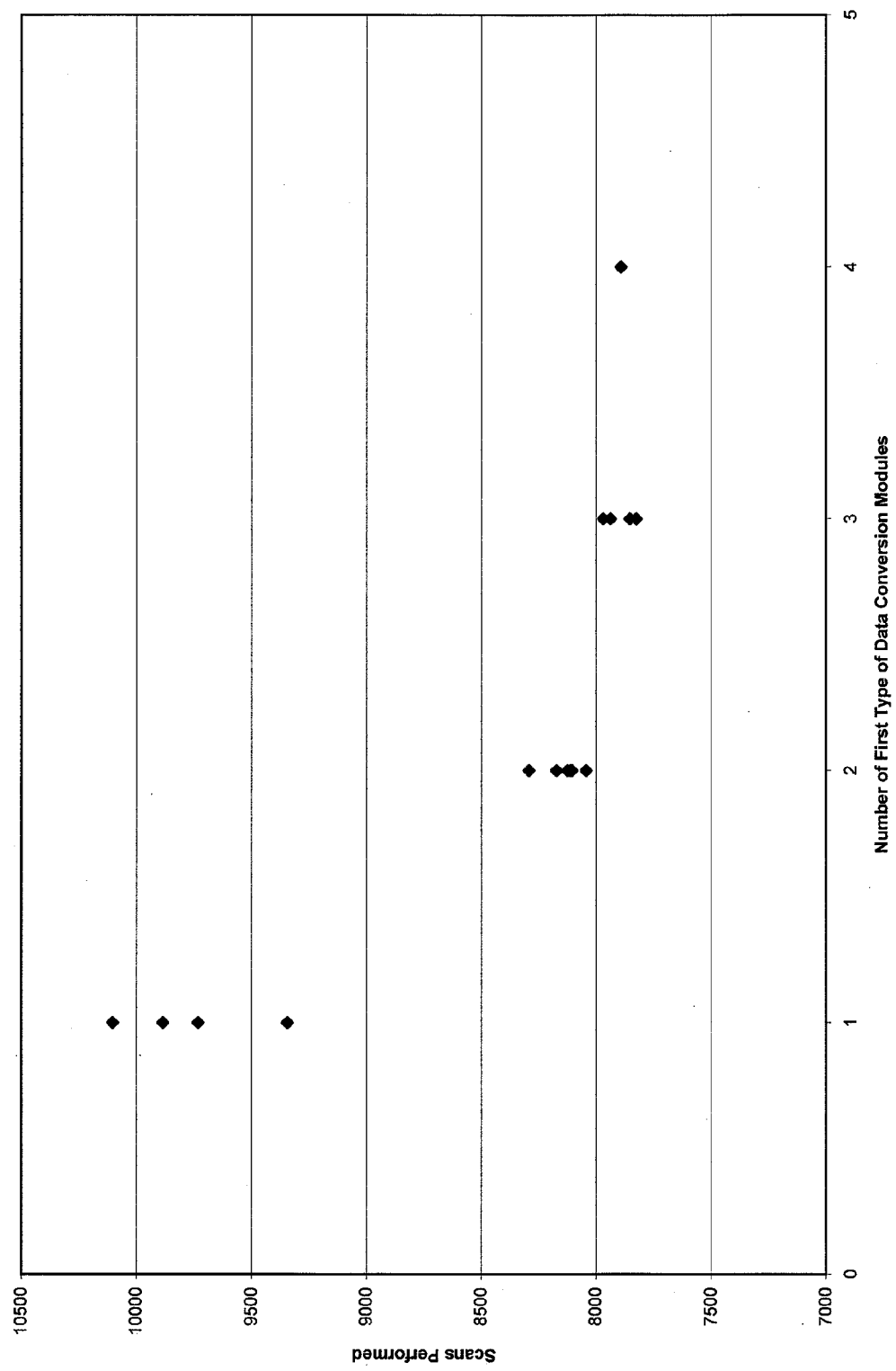
FIG. 24 - 16384 Byte Table

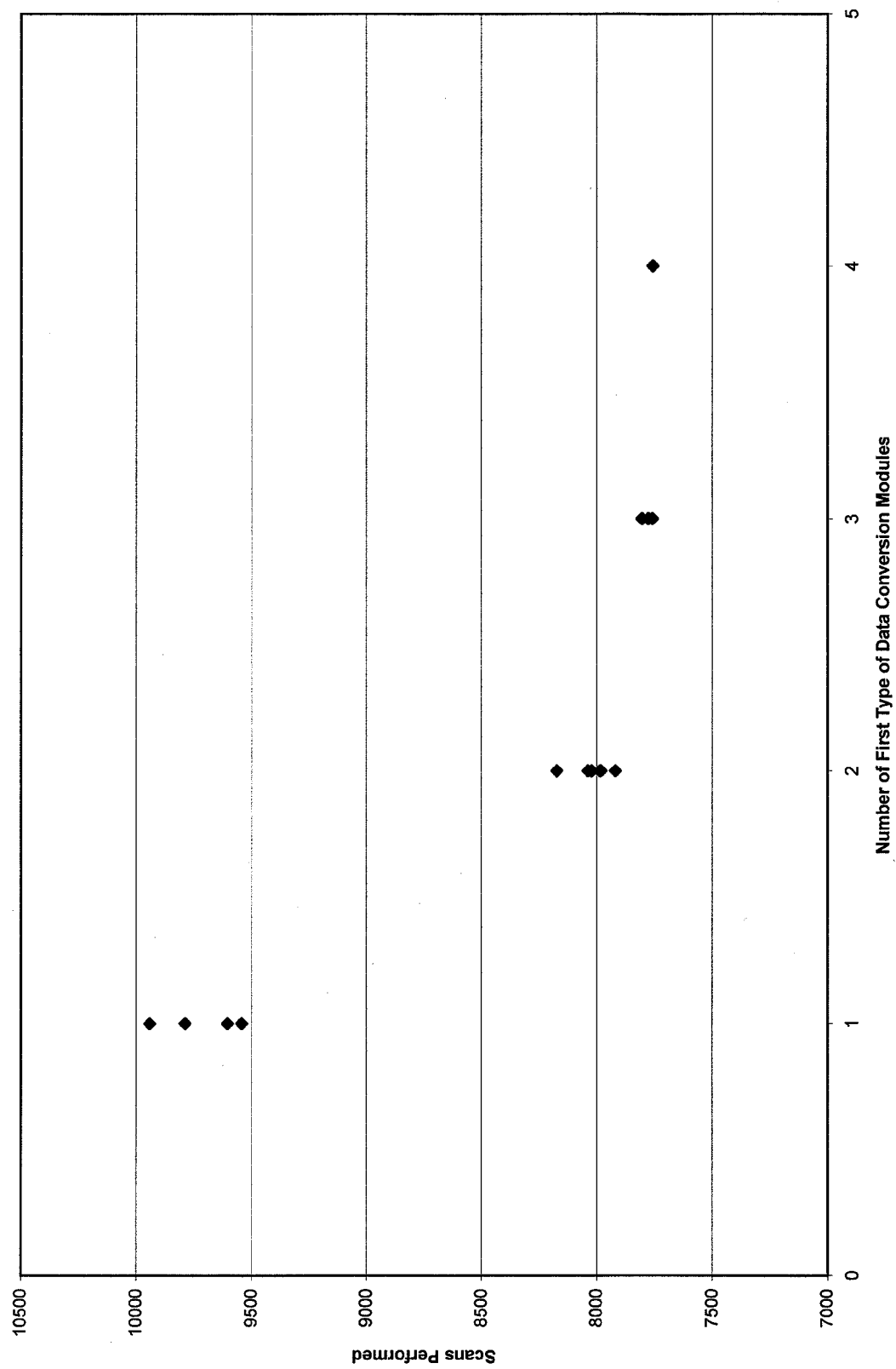
FIG. 25 - 17408 Byte Table

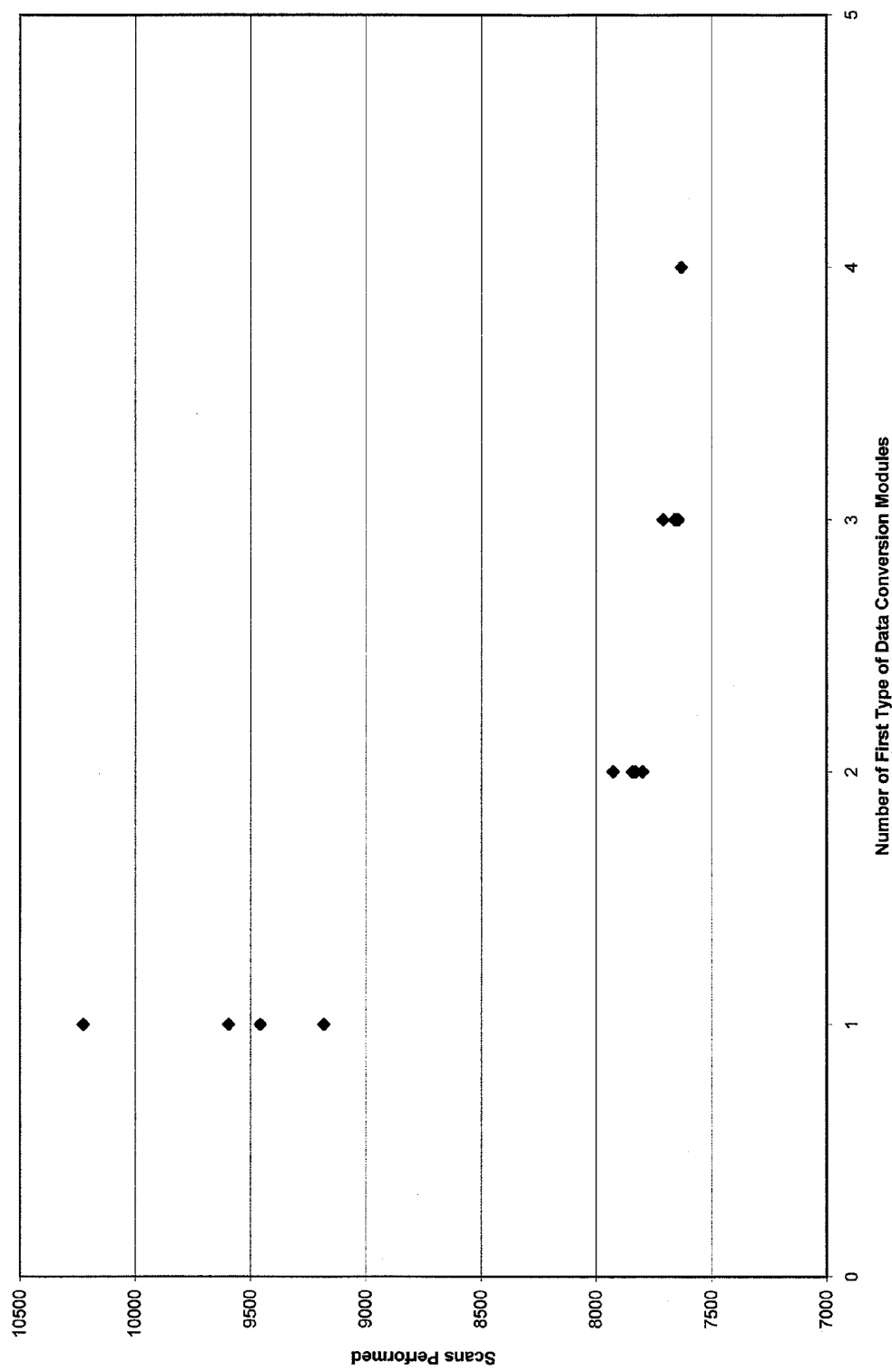
FIG. 26 - 18432 Byte Table

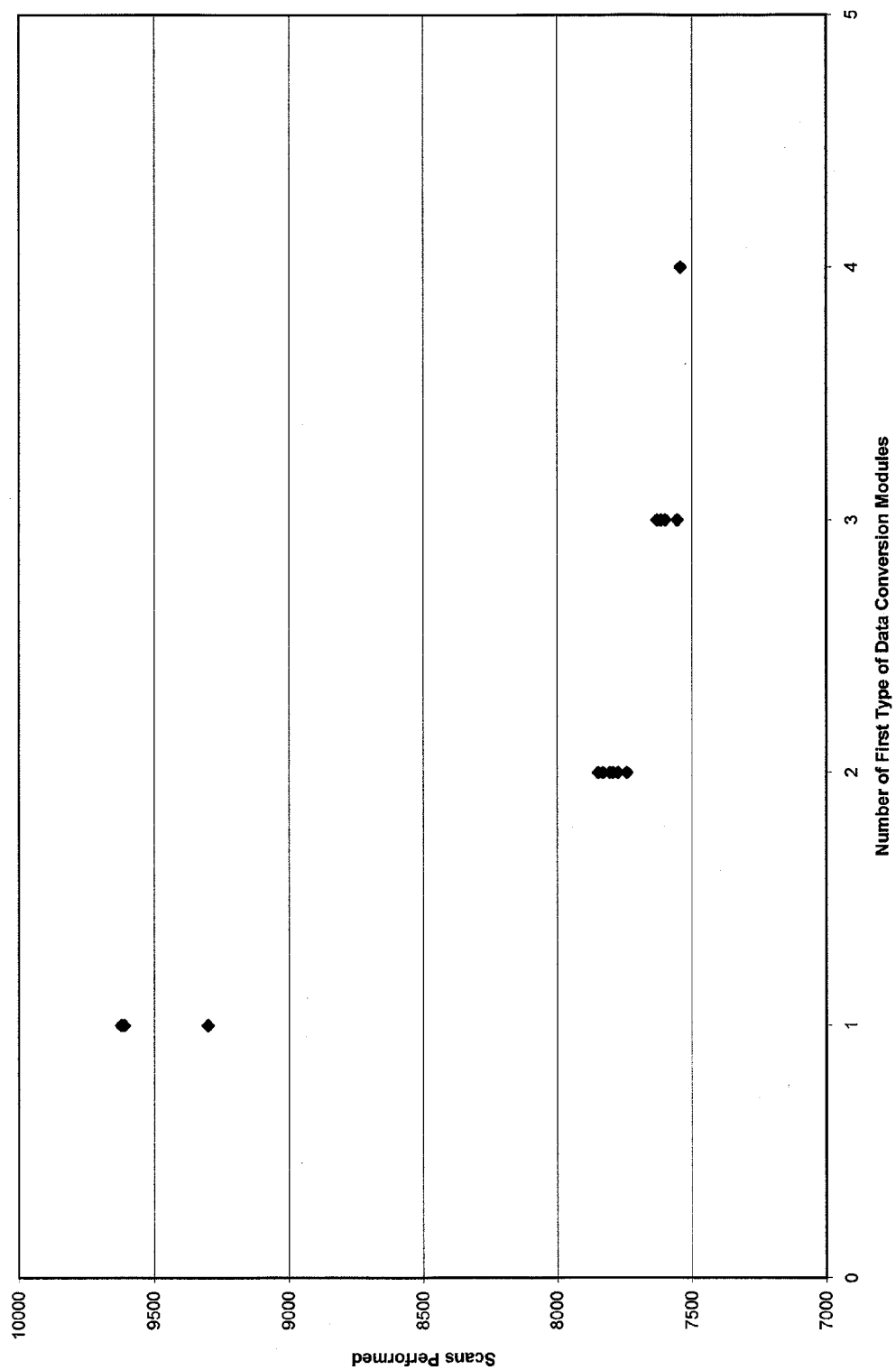
FIG. 27 - 19456 Byte Table

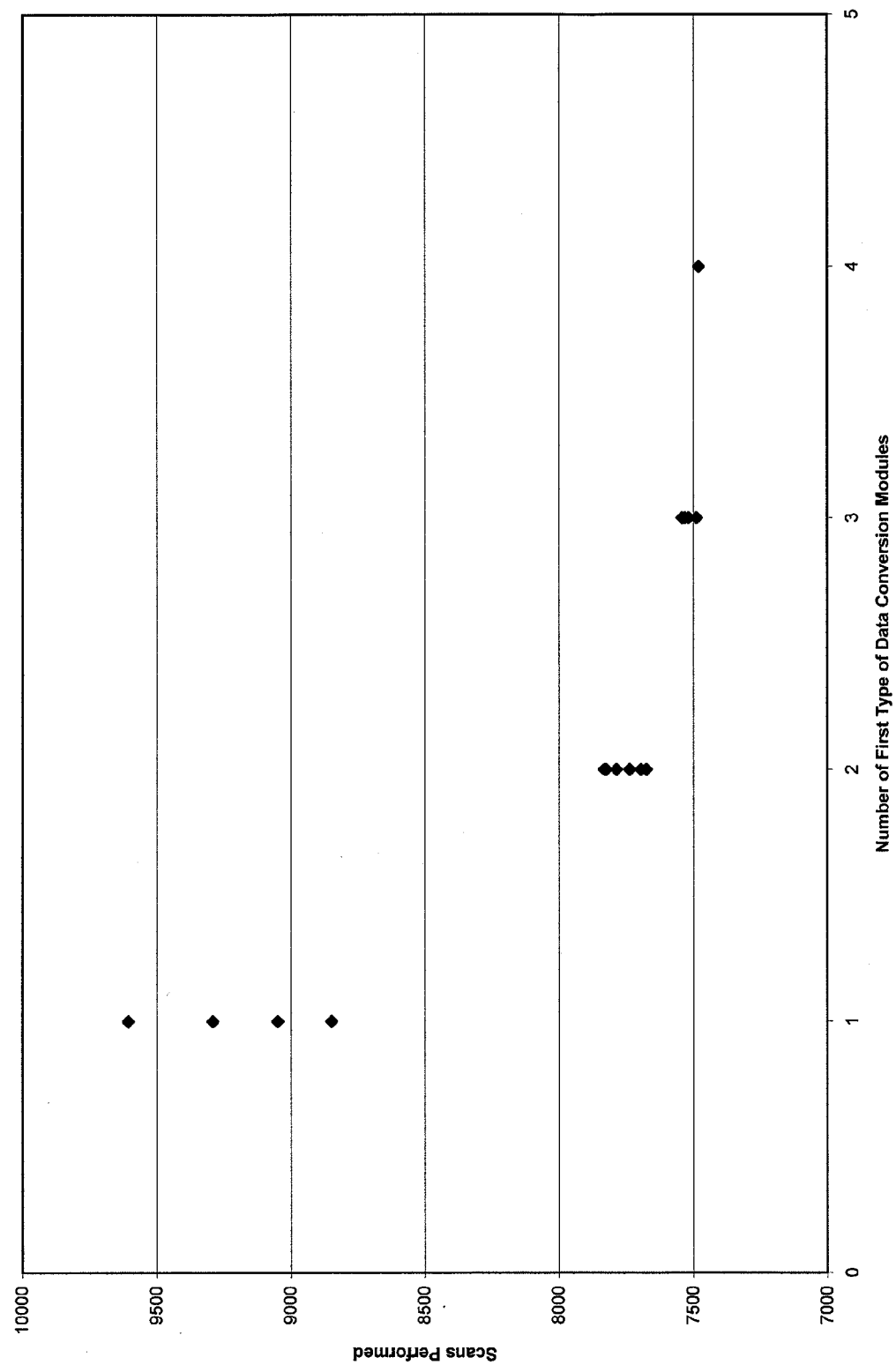
FIG. 28 - 20480 Byte Table

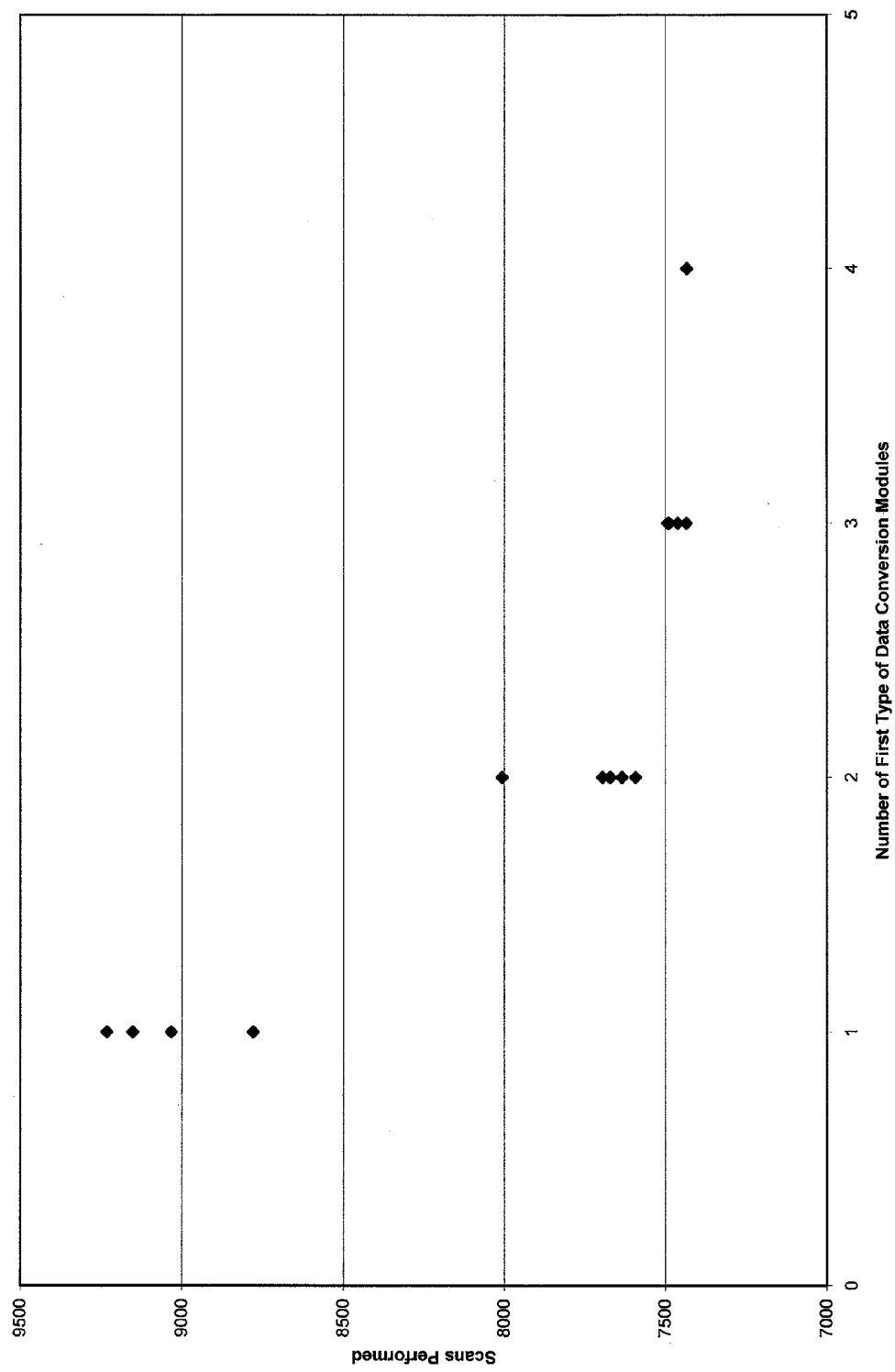
FIG. 29 - 21504 Byte Table

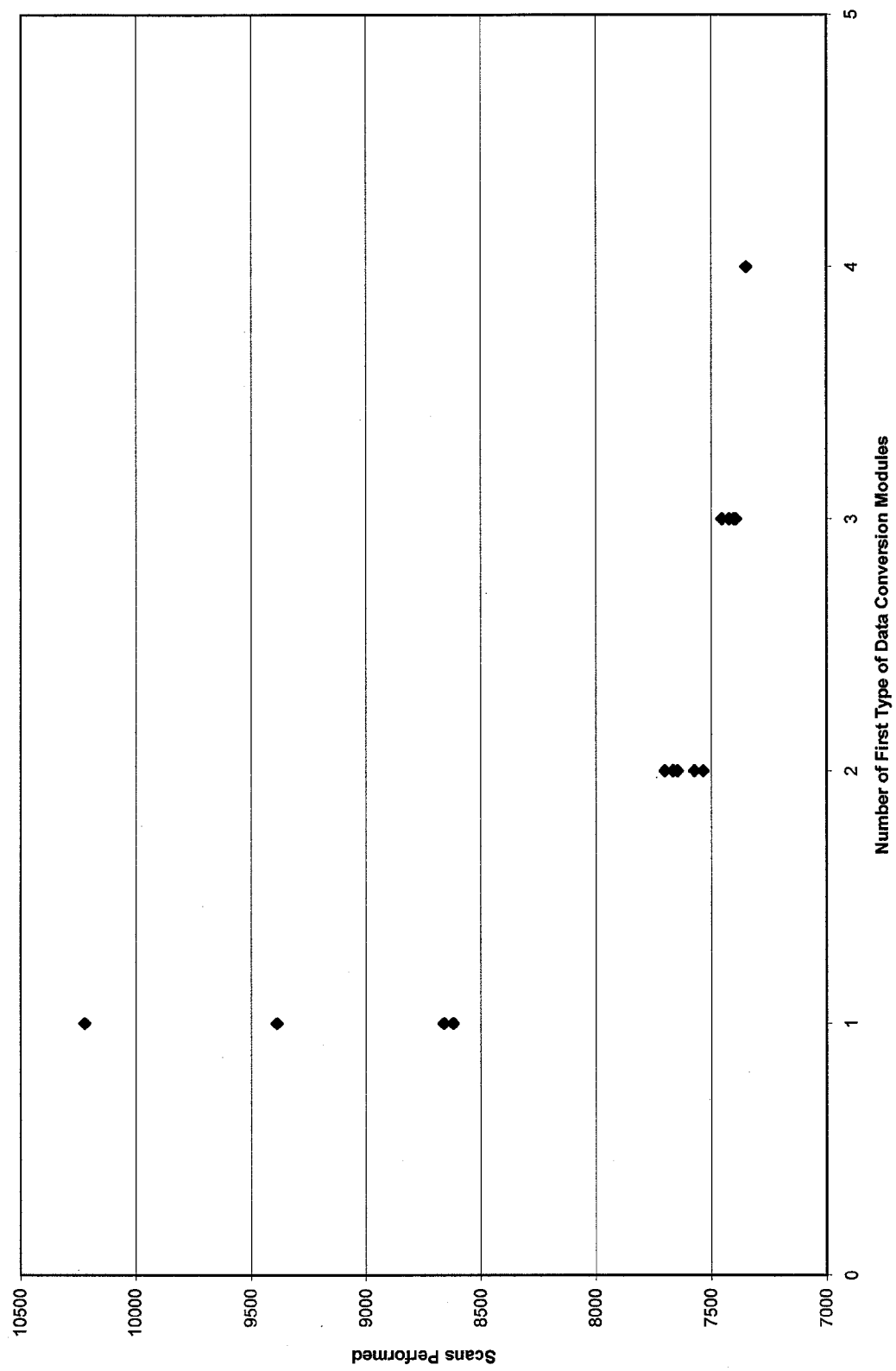

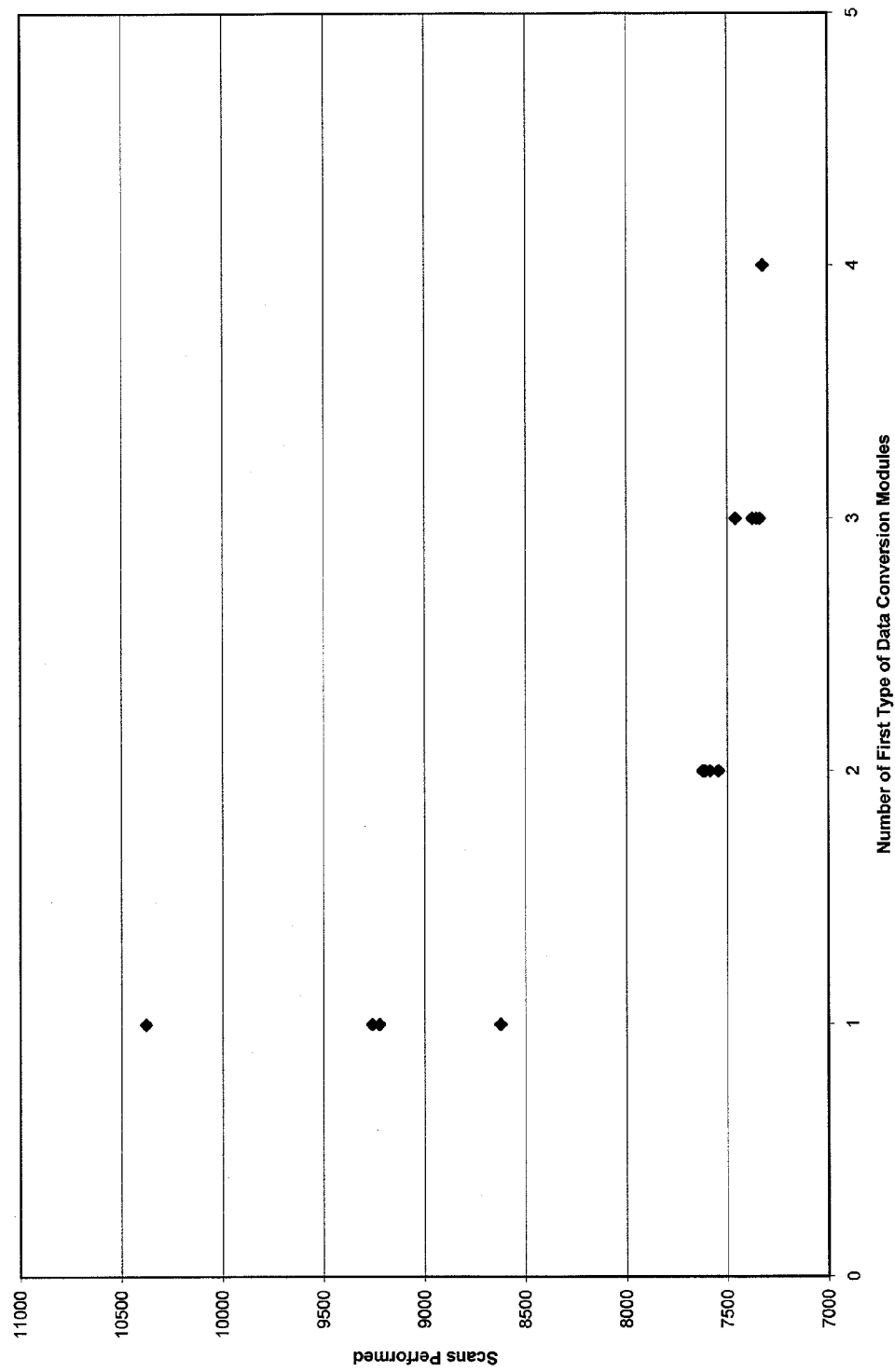

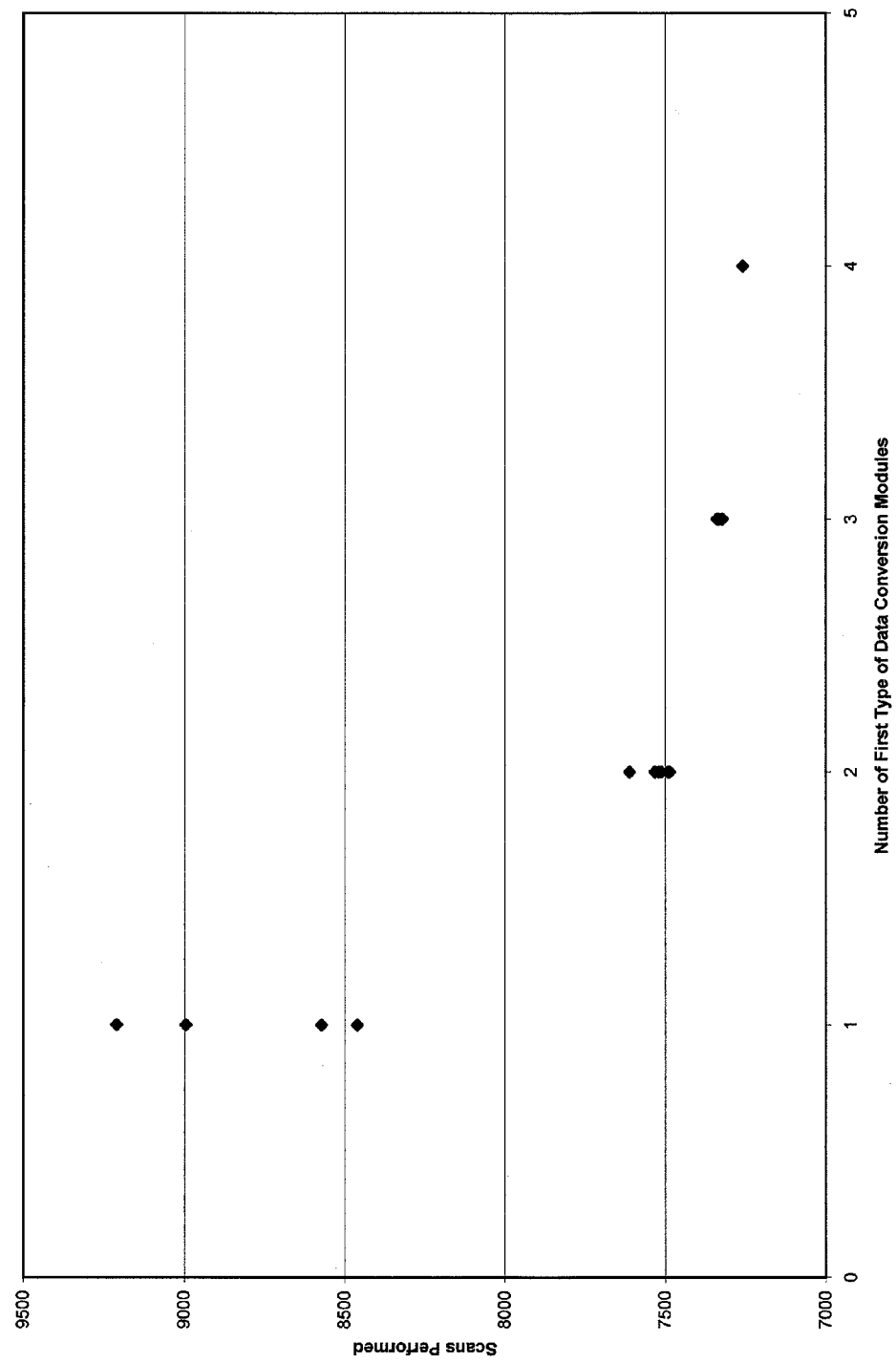
FIG. 32 - 24576 Byte Table

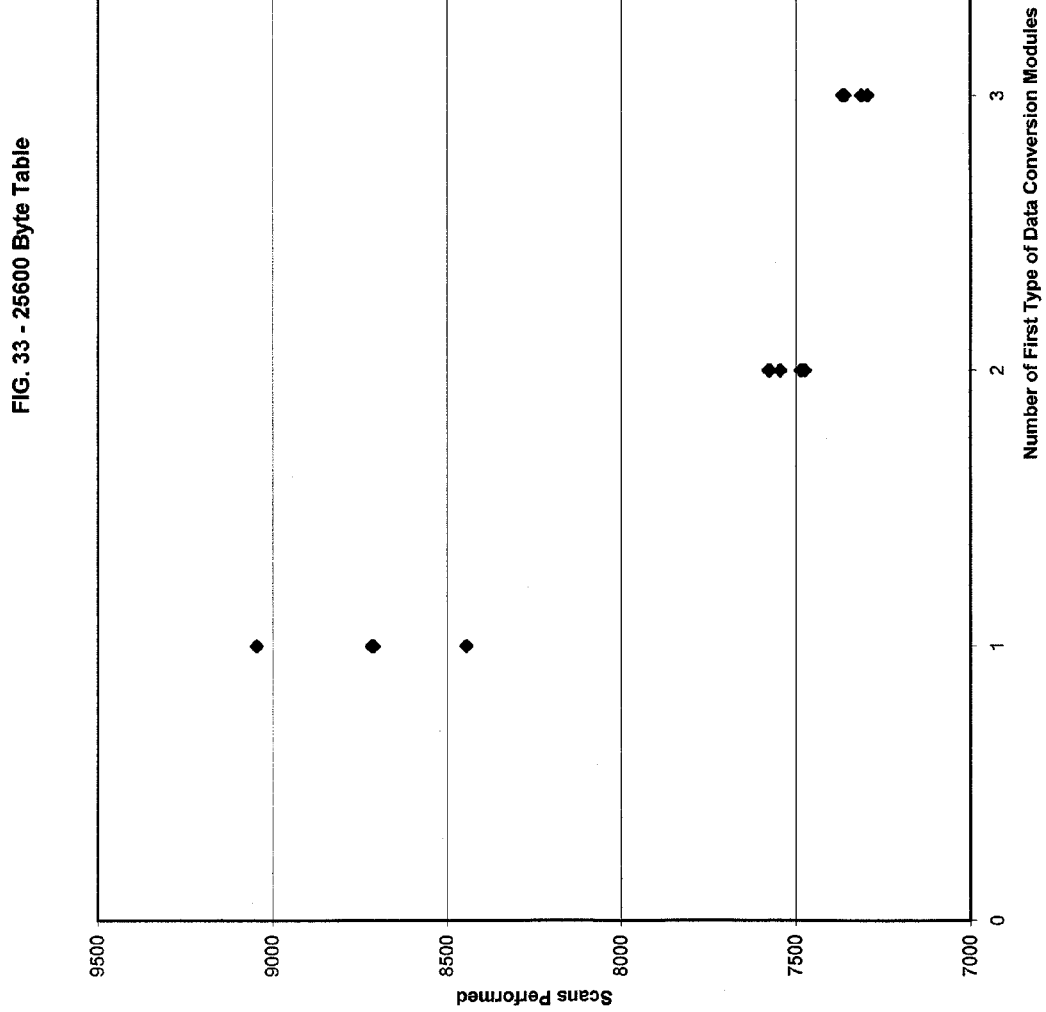
FIG. 33 - 25600 Byte Table

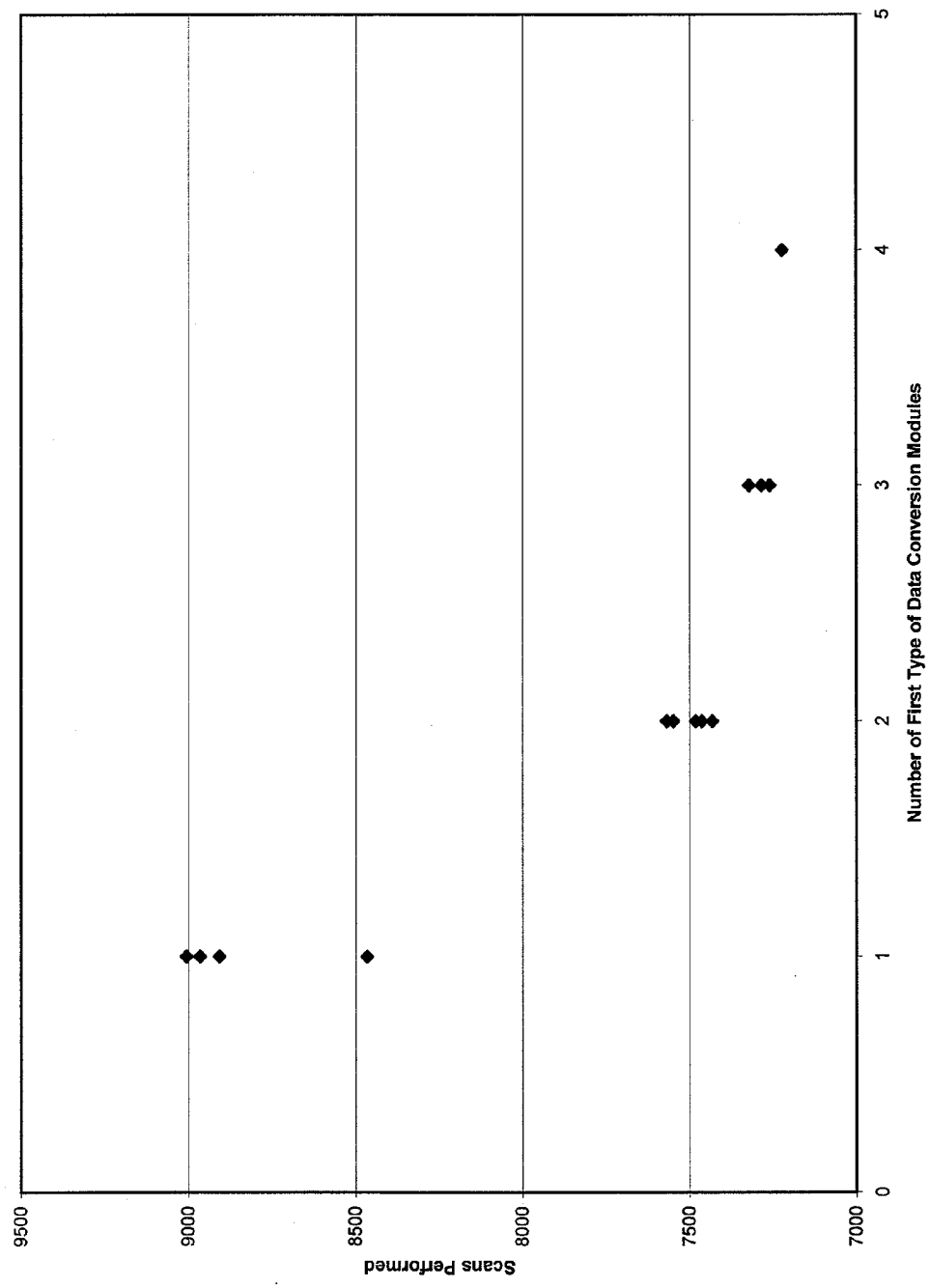
FIG. 34 - 26624 Byte Table

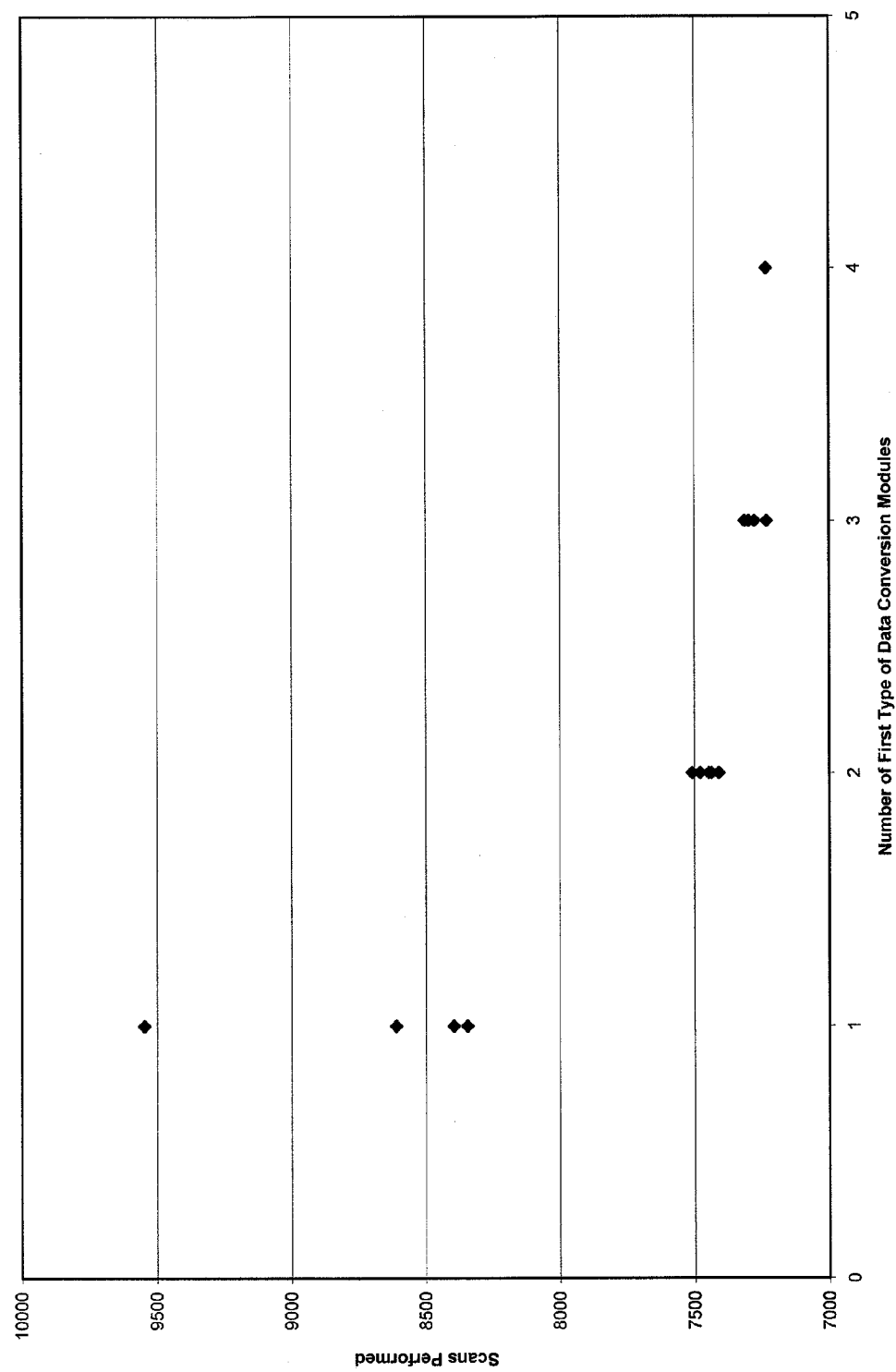

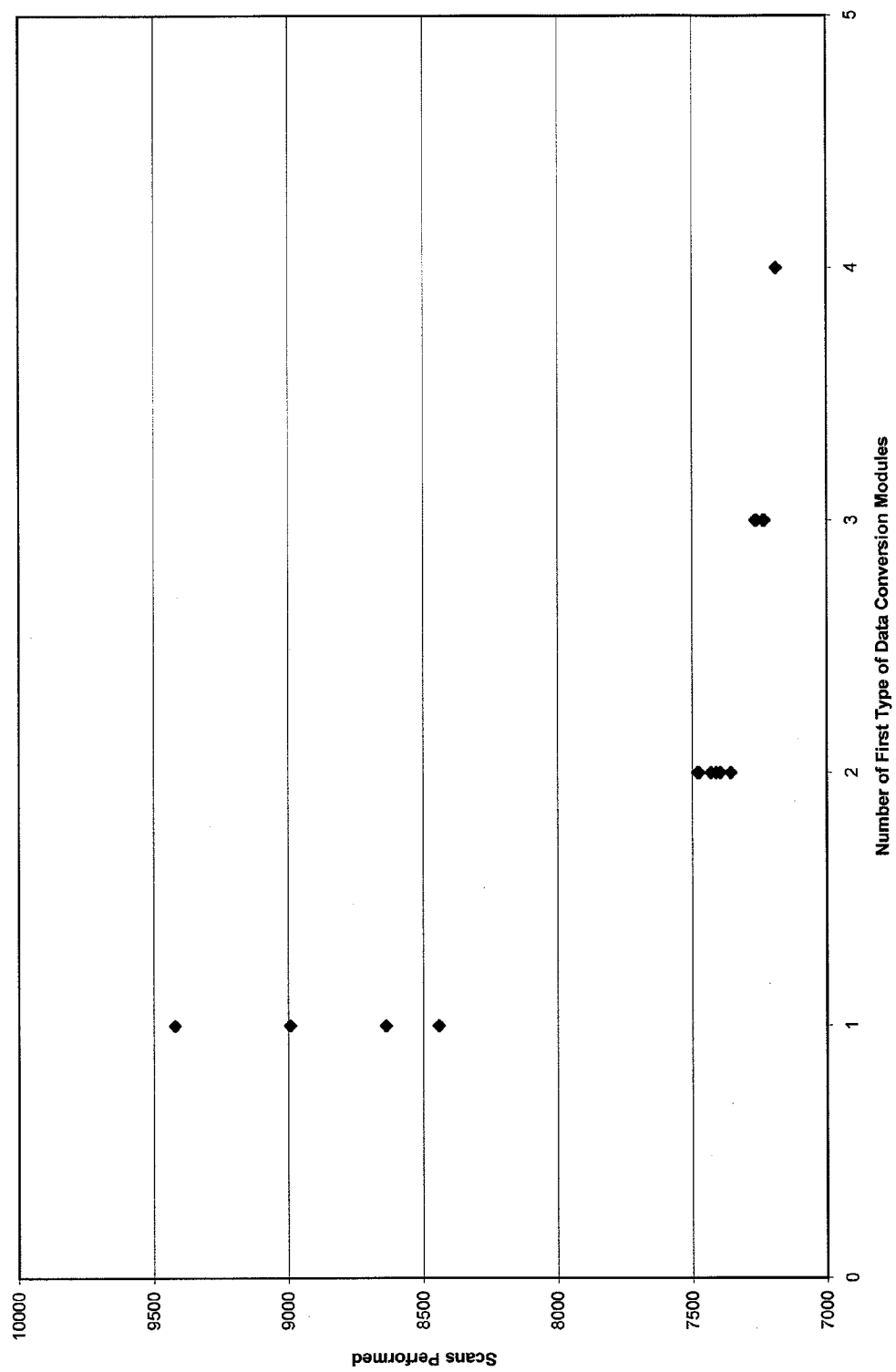
FIG. 36 - 28672 Byte Table

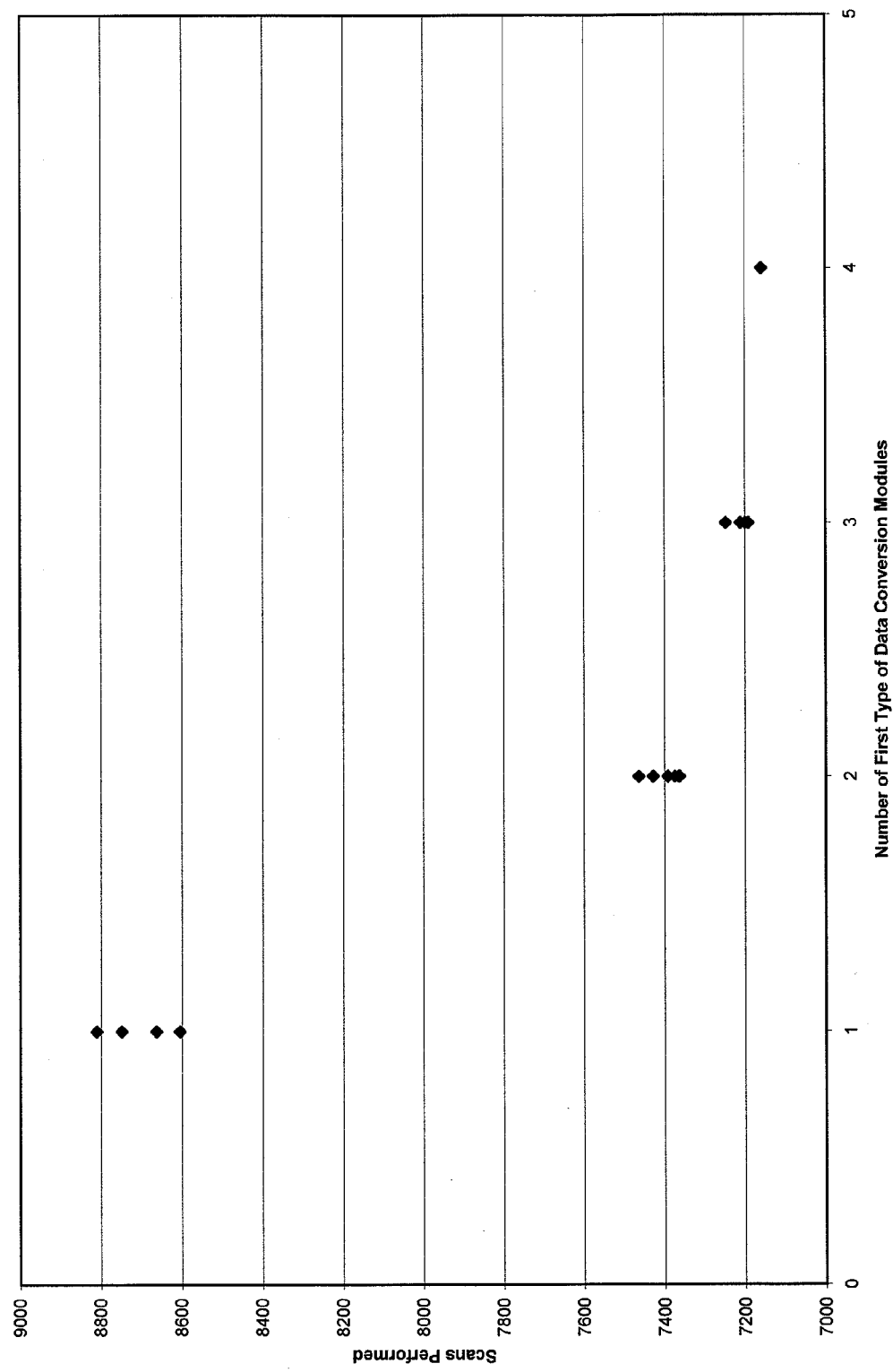
FIG. 37 - 29696 Byte Table

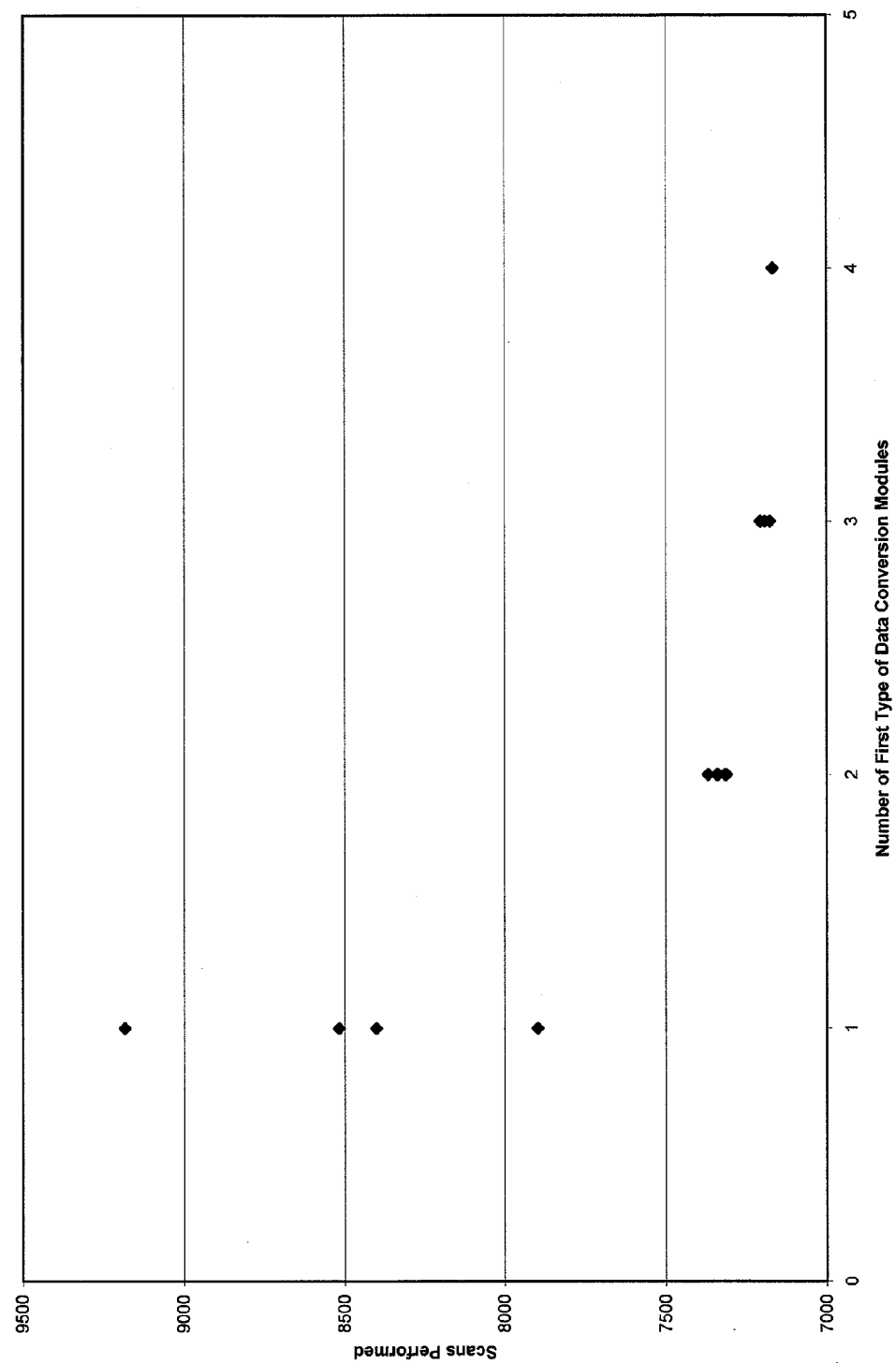
FIG. 38 - 30720 Byte Table

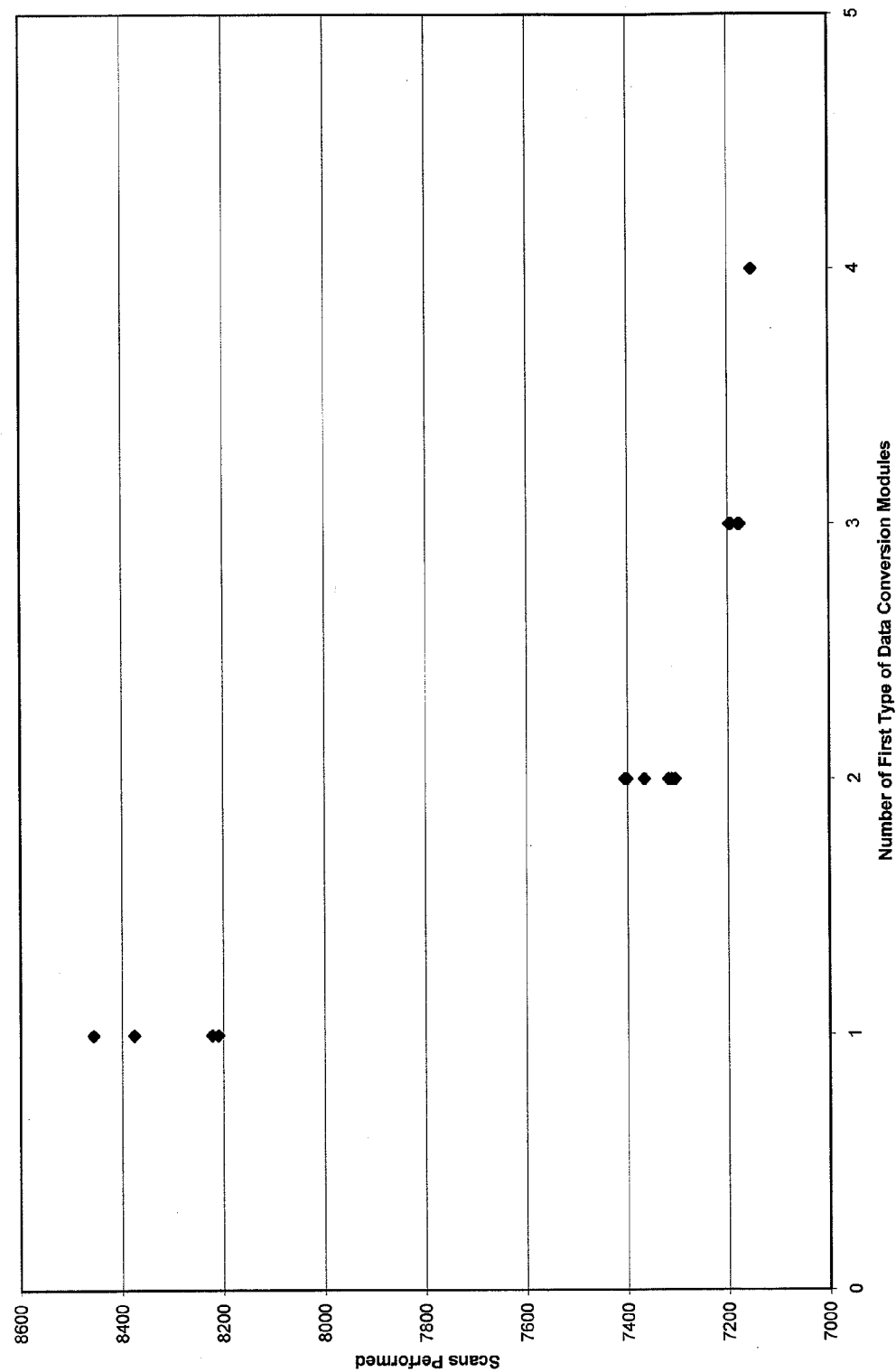

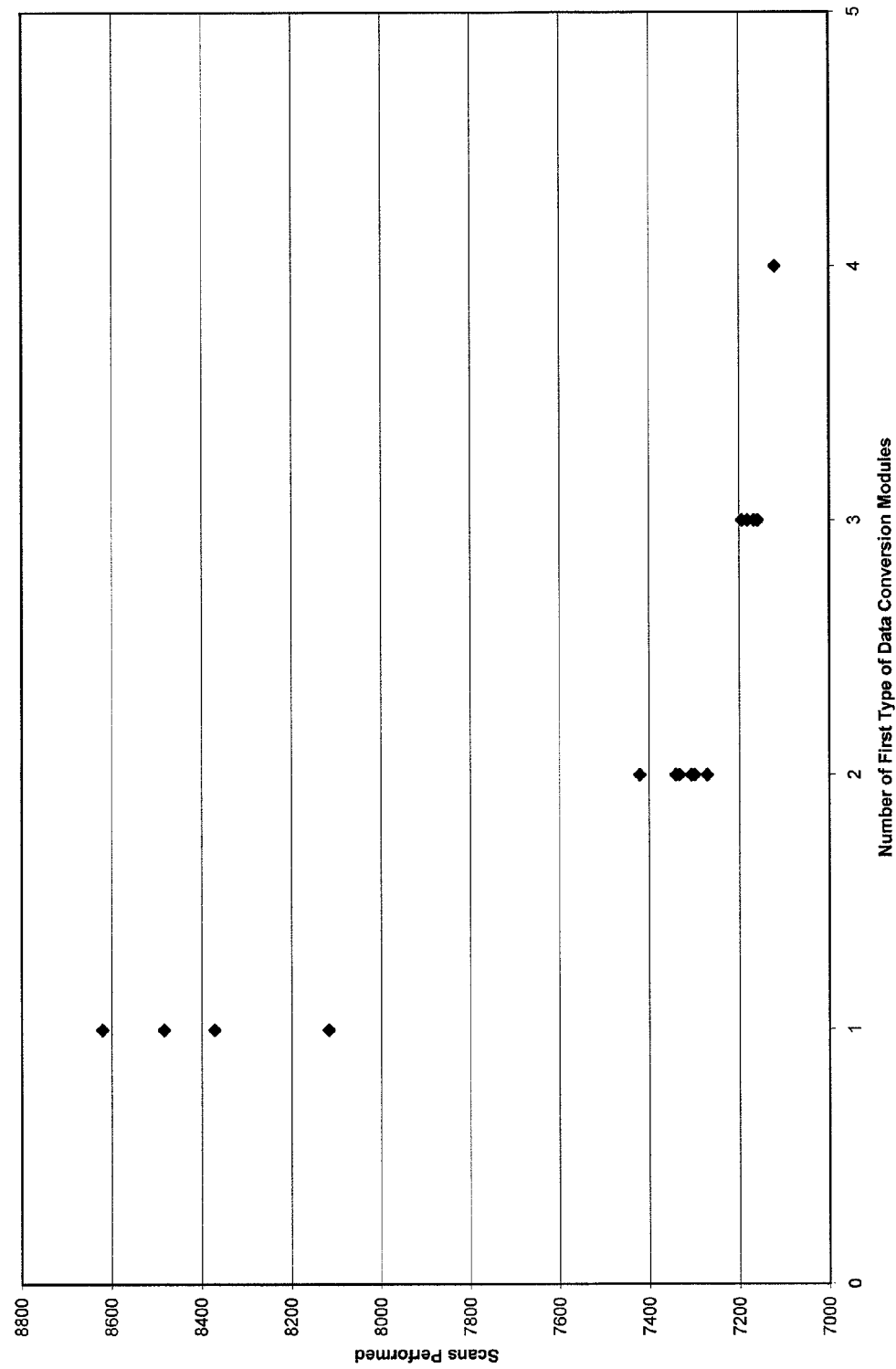
FIG. 40 - 32768 Byte Table

SYSTEMS AND METHODS FOR OPERATING A SATURATED HASH TABLE

CROSS-REFERENCE TO RELATED APPLICATION

This application claims priority to U.S. Patent Application No. 61/382,432, filed Sep. 13, 2010, entitled "SYSTEMS AND METHODS FOR OPERATING A SATURATED HASH TABLE," which is incorporated herein by reference in its entirety.

BACKGROUND

Hash tables are used in computer systems to remember files that have already been processed in order to eliminate unnecessary processing. For example, a virus scanner may employ a hash table to determine whether a file has previously been scanned for a virus. If the file has been previously scanned, the virus scanner can skip the scanning step, resulting in a more efficient use of the virus software.

SUMMARY OF THE DISCLOSURE

Broadly, the present disclosure relates to systems, methods, and apparatus for operating a hash table. Using the systems, methods, and apparatus disclosed herein, the hash table may provide improved efficiency (e.g., in a computer processing environment). In one aspect, a system includes a hash table having index positions for storing a plurality of digest values (e.g., in the form of an array). When a first digest value is received, that first digest value is stored at a plurality of the index positions. As additional digest values, e.g., a second, third, fourth, etc., are received and stored at a plurality of index positions of the hash table, at least one of the first stored digest values may be overwritten. However, since the first digest value is stored at a plurality of index positions, the first digest value may still be stored in at least one index position of the hash table. This results in biasing the hash table's memory towards more recent digest values, i.e., the more recently accessed software files and/or programs (e.g., data items) by the system. Thus, the more frequently accessed data items will be remembered in the hash table, which may eliminate unnecessary processing of various computer software programs.

In one approach, the hash table may comprise a plurality of index positions. The plurality of index positions of the hash table may determine the hash table size. For example, a hash table of size 1K (kilobytes) has 1024 index positions. Each of the plurality of index positions of the hash table may be associated with a data value, e.g., a digest value. For example, a hash table of size 1K may be operable to store 1024 digest values. In this example, each of the 1024 index positions is associated with a corresponding digest value. The digest values may represent at least one attribute of a data item. In one example, a data item may be a file and an attribute of the data item may include metadata (e.g., the file name, the file size, the file type) and/or contained information of the data item (e.g., text, images, source code).

In another approach, the system includes a hash program in communication with the hash table and operable to populate the hash table with a first new digest value. The first new digest value may be stored at a plurality of index positions. For example, the first new digest value may be stored at least at a first index position and a second index position of the hash table. In one embodiment, the first index position may contain a first old digest value and the second index position may contain a second old digest value. The hash program may be operable to compare the first new digest value to the first old digest value and the second old digest value. In one embodiment, the hash program may be operable to replace both the first old digest value and the second old digest value with the first new digest value. For example, if the first old digest value is stored at the first index position and the second old digest value is stored at the second index position, the first new digest value will be stored in both the first index position and the second index position. In one embodiment, the hash program is operable to transmit a comparison result to an executable program. For example, if the first new digest value is the same as either the first old digest value or the second old digest value, the hash program may transmit "found" to an executable program. In another example, if the first new digest value is different than both the first old digest value and the second old digest value, the hash program may transmit "not found" to an executable program.

The first new digest value may be associated with a first data item, e.g., a file. In one approach, the hash program may be operable to determine the first index position and the second index position of the hash table based on an attribute of the first data item. For example, the first index position and the second index position may be determined based on the name of a file being utilized by a software program of a computer. The hash program may be operable to produce a first hash value via a first data conversion module and a second hash value via a second data conversion module. The first hash value may be associated with the first index position and the second hash value may be associated with the second index position.

In another approach, the hash program is operable to populate the hash table with a second new digest value. The second new digest value may be stored at least at a third index position and a fourth index position of the hash table. The second new digest value may be associated with a second data item. In one embodiment, the first data item is different than the second data item. In one embodiment, the first data item is the same as the second data item. In one embodiment, the third index position is the same as the first index position. In this case, the first new digest value is replaced with the second new digest value at the first index position, the first new digest value is stored at the second index position, and the second new digest value is stored at the first index position and the fourth index position.

In one embodiment, the third index position and fourth index position are both different than the first index position and the second index position. In this case, the first new digest value is stored at the first index position and the second index position and the second new digest value is stored at the third index position and fourth index position. As noted above, a first hash value may be produced via a first data conversion module and a second hash value may be produced via a second data conversion module. In one embodiment, the hash program comprises at least three data conversion modules. For example, two data conversion modules may be of a first type and one data conversion module may be of a second type.

As noted above, the hash table may comprise a plurality of index positions. The ratio of the plurality of index positions to the data conversion modules may be at least about 1024:3. In one embodiment, the first data item is one of a plurality of data items, and the ratio of the plurality of index positions of the hash table to the plurality of data items is at least 1:10. In one embodiment, each of the plurality of index positions contains one digest value.

In one embodiment, the system may be located in memory of a computer. For example, the hash table and/or the hash program may be located in memory of a computer. The memory of the computer may include read-only memory and/or read-write memory (e.g., random access memory, hard disk drive). The hash table may be located in the same or different memory component as the hash program. For example, the hash table may be located in a read-only memory component and the hash program may be located in a read-write memory component. In another example, the hash table may be located in a read-write memory component and the hash program may be located in a read-write memory component. In this example, the read-write memory components may be the same or different.

In one aspect, a system includes a hash table located in random access memory of a computer having a size of from about 1 KB to about 16 KB and a hash program in communication with the hash table. The hash table may comprise a plurality of index positions, where each of the plurality of index positions is operable to contain a digest value. The hash program may comprise at least three data conversion modules. Two of the data conversion modules may be of a first type and one of the data conversion modules may be of a second type. The first type of data conversion module may be operable to produce hash values used to determine index positions of the hash table. The second type of data conversion module may be operable to produce digest values. The ratio of the plurality of index positions to the data conversion modules may not be greater than about 16,384:3. The hash program may be operable to populate the hash table with the digest values, where the digest values are associated with data items.

Methods for operating a hash table are provided. In one embodiment, a method may comprise populating a hash table with a first new digest value, where the first new digest value may be associated with a first data item, the hash table may comprise a plurality of index positions, and the hash table may be located in memory of a computer, and storing the first new digest value at least at a first index position and a second index position of the hash table. In one embodiment, prior to the storing step, the first index position may contain a first old digest value and the second index position may contain a second old digest value.

In one embodiment, the storing step may comprise first comparing the first new digest value to the first old digest value, second comparing the first new digest value to the second old digest value, first replacing the first old digest value with the first new digest value, and second replacing the second old digest value with the first new digest value. In one embodiment, the method may further comprise transmitting, in response to at least one of the first or second comparing steps, a comparison result to an executable program. In one embodiment, the storing step comprises determining the first index position and the second index position of the hash table based on an attribute of the first data item. In one embodiment, the determining step comprises first producing a first hash value via a first data conversion module, and second producing a second hash value via a second data conversion module, where the first hash value is associated with the first index position, and where the second hash value is associated with the second index position.

In one embodiment, the storing step may be a first storing step and may further comprise populating the hash table with a second new digest value, where the second new digest value is associated with a second data item. In one embodiment, the populating step comprises second storing the second new digest value at least at a third index position and a fourth index position of the hash table. In one embodiment, the first data item may be different than the second data item. In one embodiment, the third index position is the same as the first index position. In this case, the first new digest value is replaced with the second new digest value at the first index position. In one embodiment, after the second storing step, the first new digest value is stored at the second index position, and the second new digest value is stored at the first index position and the fourth index position.

In one embodiment, the third index position and fourth index position are both different than the first index position and the second index position. In this case, and after the second storing step, the first new digest value is stored at the first index position and the second index position and the second new digest value is stored at the third index position and fourth index position. In one embodiment, the hash table is in communication with a hash program. In one embodiment, the hash program comprises at least three data conversion modules. As noted above, the hash table may comprise a plurality of index positions. The ratio of the plurality of index positions to the data conversion modules may be at least about 1024:3. As noted above, the first new digest value may be associated with a first data item. In one embodiment, the first data item is one of a plurality of data items, and the ratio of the plurality of index positions of the hash table to the plurality of data items is at least 1:10. In one embodiment, each of the plurality of index positions contains one digest value. In one embodiment, the hash table is a saturated hash table. The description of operating a hash table noted herein may apply to a saturated hash table.

Various ones of the unique aspects, approaches, and embodiments noted herein above may be combined to yield various systems, methods, and apparatus configured to operate a hash table. Furthermore, the above-described systems may be utilized in conjunction with the above-described methods, and vice-versa, as appropriate, to achieve various inventive systems, methods, and apparatus for operating hash tables.

These and other aspects and advantages, and novel features of this new technology are set forth in part in the description that follows and will become apparent to those skilled in the art upon examination of the following description and figures, or may be learned by practicing one or more embodiments of the technology provided for by the present disclosure.

BRIEF DESCRIPTION OF THE DRAWINGS

FIG. 4e is a schematic view illustrating one embodiment of a saturated hash table useful in accordance with the present disclosure.

FIG. 5c is a schematic view illustrating one embodiment of a saturated hash table useful in accordance with the present disclosure.

FIG. 5d is a schematic view illustrating one embodiment of a saturated hash table useful in accordance with the present disclosure.

FIG. 5e is a schematic view illustrating one embodiment of a saturated hash table useful in accordance with the present disclosure.

FIGS. 9-40 are graphs illustrating the operation of saturated hash tables with a combination of data conversion modules.

DETAILED DESCRIPTION

Reference will now be made in detail to the accompanying drawings, which at least assist in illustrating various pertinent embodiments of the new technology provided for by the present disclosure.

Figure 1:
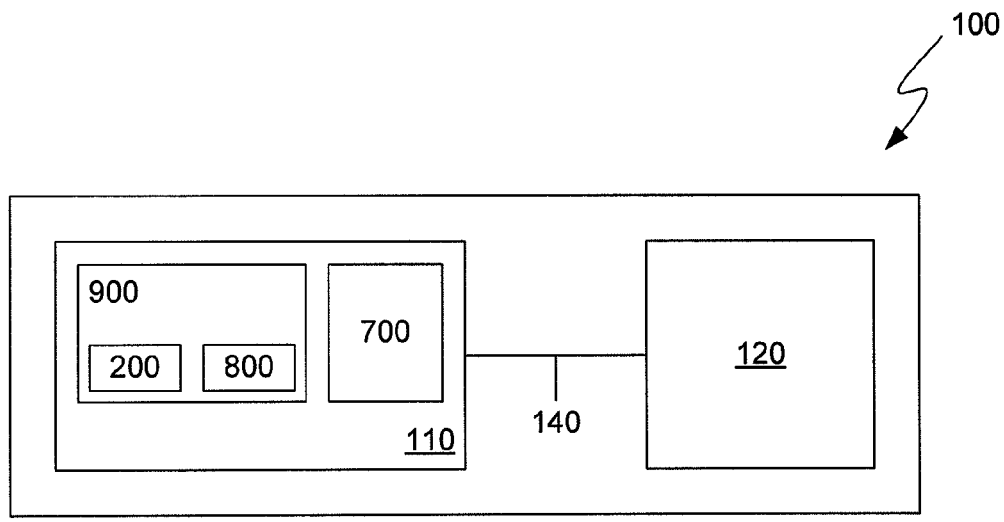
FIG. 1 is a schematic view of one embodiment of a computer system useful in accordance with the present disclosure.

One embodiment of a system useful for operating a saturated hash table is illustrated in FIG. 1. In the illustrated embodiment, the system is a computer 100, which includes one or more memory components 110 and a processor 120 in communication with the memory components 110 via a bus 140. The memory components 110 may include one or more of read-only memory (ROM) 700 (e.g., PROM, EPROM, EEPROM, EAROM, Flash memory), and read-write memory 900 (e.g., random access memory, hard disk drive). Random access memory (RAM) 200 may include SRAM, DRAM, and MRAM, to name a few. Hard disk drive (HDD) 800 may include a desktop disk drive, a mobile disk drive, solid state disk and an enterprise disk drive, among others. At least one memory component 110 (ROM, RAM, HDD, etc.) includes a hash table, and at least one memory component 110 includes a hash program.

Figure 2:
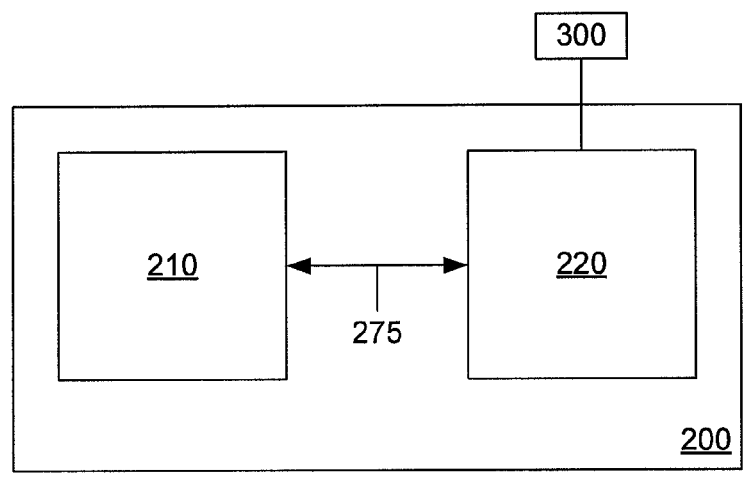
FIG. 2 is a schematic view of a memory component of FIG. 1.

In one example, and with reference now to FIG. 2, the random access memory 200 may include a hash table 210 and a hash program 220. In one embodiment, the hash table 210 and the hash program 220 may be located in different memory components 110. For example, the hash table 210 may be located in random access memory 200 and the hash program 220 may be located in read-only memory 700. Other combinations may be used. As described in further detail below, the hash program 220 may produce values 600 using data items 300. The values 600 may be communicated to the hash table 210 via a memory bus 275. The values 600 may be compared with values previously stored in the hash table 210. The hash program 220 may populate the hash table 210 with the values 600.

Figure 3:
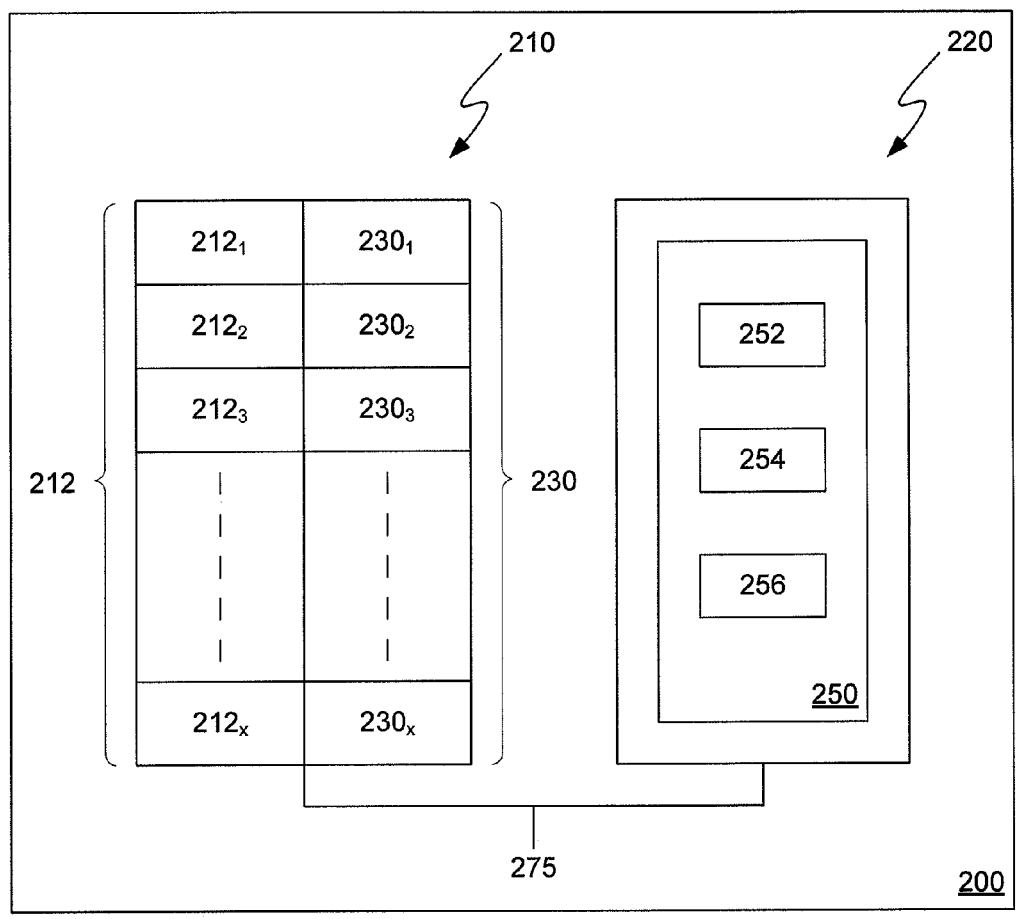
FIG. 3 is a perspective view of a memory component of FIG. 1.

In particular, and with reference now to FIG. 3, the hash program 220 may include a plurality of data conversion modules 250. The hash table 210 may comprise a plurality of index positions 212. Each one ($212_1$-$212_x$) of the index positions 212 may be associated with a corresponding one ($230_1$-$230_x$) of a plurality of values 230, which are called a digest values in the illustrated embodiment. The hash table 210 is generally a saturated hash table, meaning the hash table 210 includes a number of index positions 212 that is less than the number of data items 300 utilized by the hash program 220.

As noted above, the hash program 220 may populate the hash table 210 with the values 600. For many computer applications, the hash table 210 generally has limited number of index positions 212 available due to memory constraints. For example, hash tables 210 associated with virus scanning may have a size of about 4 KB-16 KB, which is typically smaller than the available memory of a digital watch. Thus, conventional hash tables store a determined digest value at a single index position so as to maximize the number of digest values stored in the hash table. This is done in an effort to remember data items which have already been processed in order to eliminate unnecessary processing.

In contradistinction to the conventional wisdom, the present system is operable to populate a common digest value at a plurality of locations, i.e., index positions 212, of the hash table 210. Despite storing this common digest value in at least two locations, which basically at least halves the size of the table by at least halving the number of available index positions 212, it has been found that computer performance is significantly increased, even in applications having small available memory (e.g., not greater than about 16 KB).

For example, the computer system 100 may employ the hash program 220 to populate the hash table 210 with a single digest value associated with a data item 300 at a plurality of the index positions 212 of the hash table 210. By populating the hash table 210 with this single digest value at least at two of the index positions 212 of the hash table 210, the hash table 210 is capable of storing that single digest value for a potentially longer period of time, thereby assisting the computer system 100 in storing more recent and relevant values 230, i.e., the more recently accessed data items 300. The computer system 100 may populate the hash table 210 with a single digest value associated with any type of data item 300, as defined below.

In operation, a data item 300 may be received by the hash program 220, which may use the data item 300 to produce values 600. The data conversion modules 250 of the hash program 220 may use an attribute of the data item 300 to produce a plurality of values 600. These values are generally called hash values. For example, a first data conversion module 252 may produce a first hash value based on an attribute of the data item 300. This hash value may be used to determine a first index position of the hash table 210. A second data conversion module 254 may produce a second hash value based on the attribute of the data item 300. This second hash value may be used to determine a second index position of the hash table 210. A third data conversion module 256 may produce a third hash value based on the attribute of the data item 300. This third hash value may be a digest value. This digest value may be stored at both the first index position and the second index position of the hash table 210.

Figure 4A:
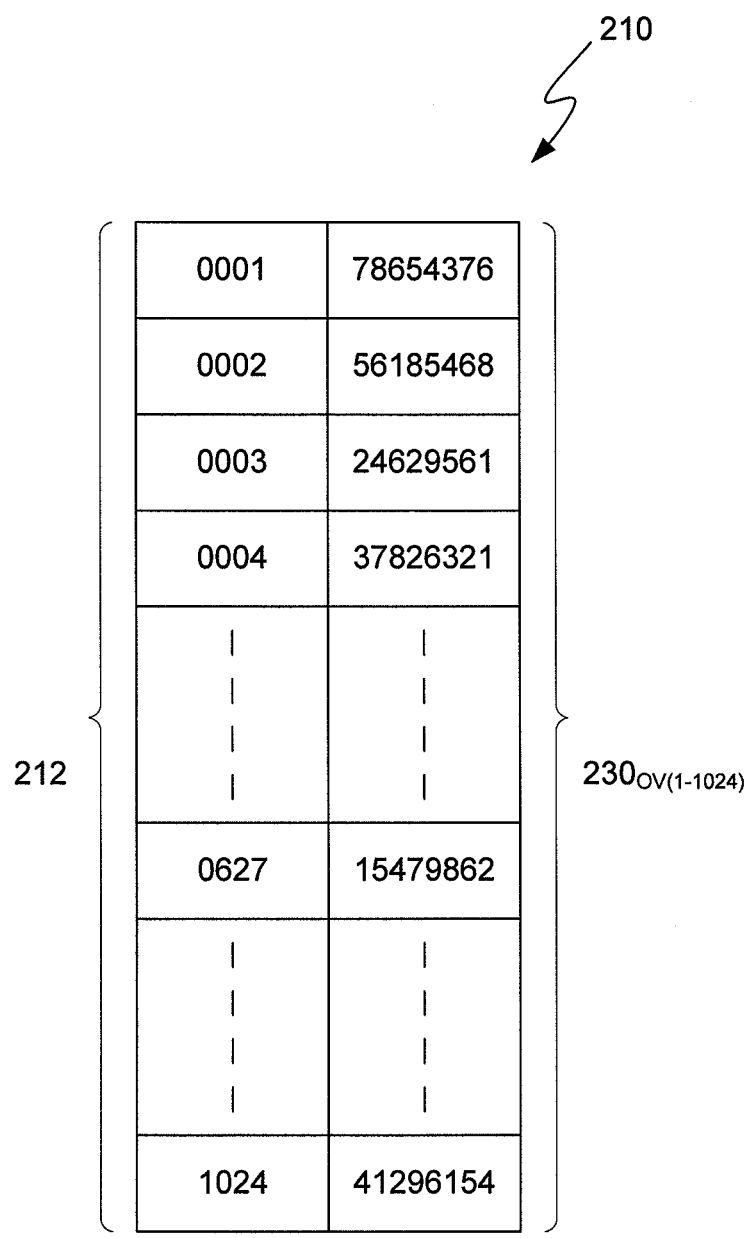
FIG. 4a is a perspective view illustrating one embodiment of a saturated hash table useful in accordance with the present disclosure.
Figure 4B:
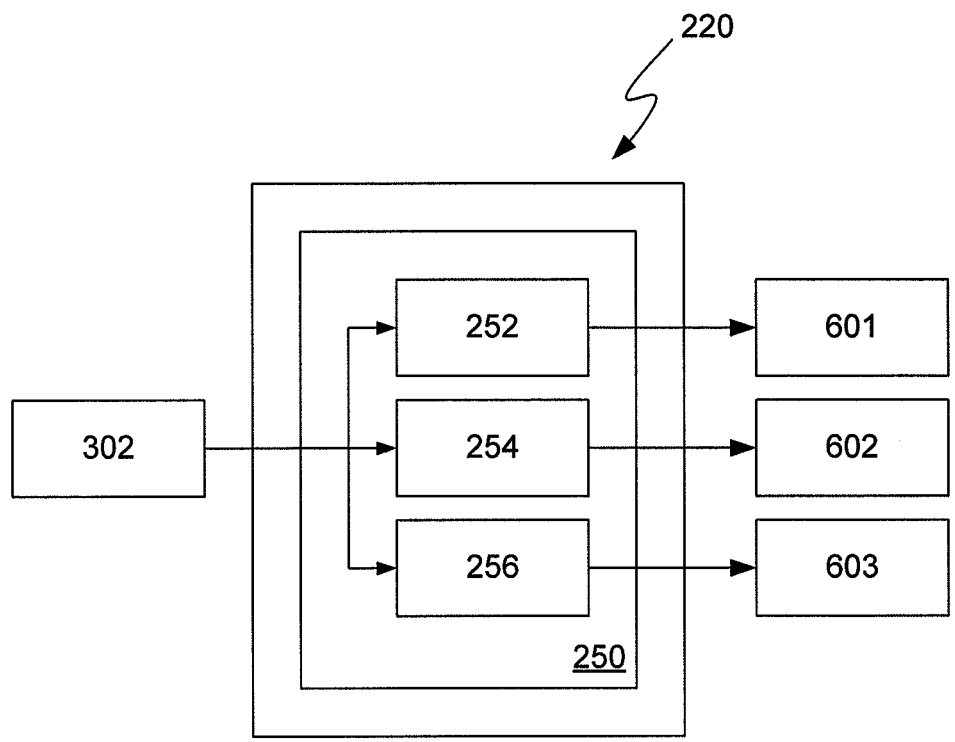
FIG. 4b is a schematic view illustrating one embodiment of a hash program useful in accordance with the present disclosure.

In one example of operation, and with reference now to FIG. 4a, a hash table 210 has a size of 1K, or 1024 index positions 212. Each of the 1024 index positions 212 contains one of a plurality of old digest values $230_{OV(1-1024)}$ that may be periodically replaced with new digest values 230, as explained below. With reference now to FIG. 4b, a file 302, (a type of a data item 300), having a file name (e.g., FN1) may be received by the hash program 220. The first data conversion module 252 may use the file name of the file 302 to produce a first hash value 601. The second data conversion module 254 may use the file name of the file 302 to produce a second hash value 602. The third data conversion module 256 may use the file name of the file 302 to produce a third hash value 603.

Figure 4C:
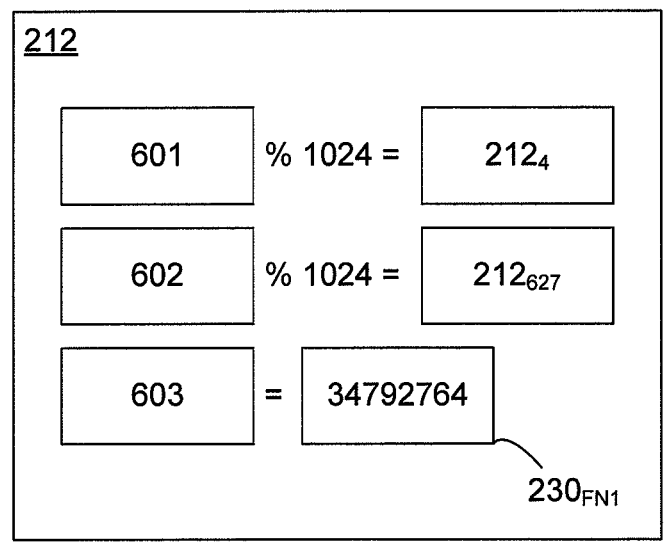
FIG. 4c is a schematic view of one embodiment of a method for producing values useful in accordance with the present disclosure.

With reference now to FIG. 4c, the first hash value 601 may be used to determine a first index position. The second hash value 602 may be used to determine a second index position. In the illustrated embodiment, the first index position is identified as $212_4$ and the second index position is identified as $212_{627}$. The first index position $212_4$ and the second index position $212_{627}$ may be determined by dividing the first hash value 601 and the second hash value 602 with the hash table size, i.e., 1024. The first index position $212_4$ and the second index position $212_{627}$ may be the remainder of this division. The third hash value 603 may be a first new digest value $230_{FN1}$, i.e., 34792764.

Figure 4D:
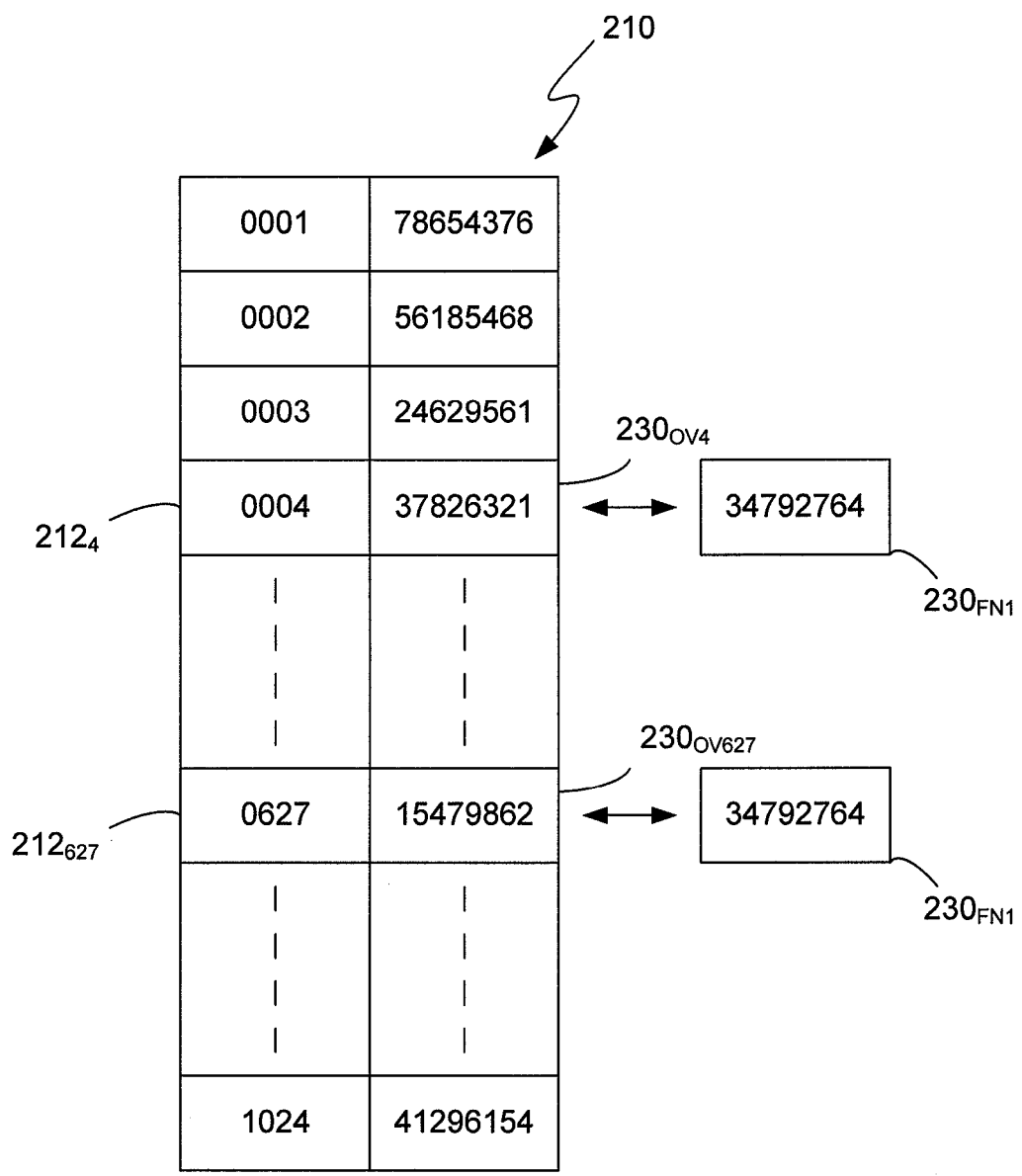
FIG. 4d is a schematic view illustrating one embodiment of a saturated hash table useful in accordance with the present disclosure.

As illustrated in FIG. 4d, the hash program 220 may compare the first new digest value $230_{FN1}$ to the old digest value $230_{OV4}$ stored at the first index position $212_4$. The hash program 220 may compare the first new digest value $230_{FN1}$ to the old digest value $230_{OV627}$ stored at the second index position $212_{627}$.

Figure 4E:
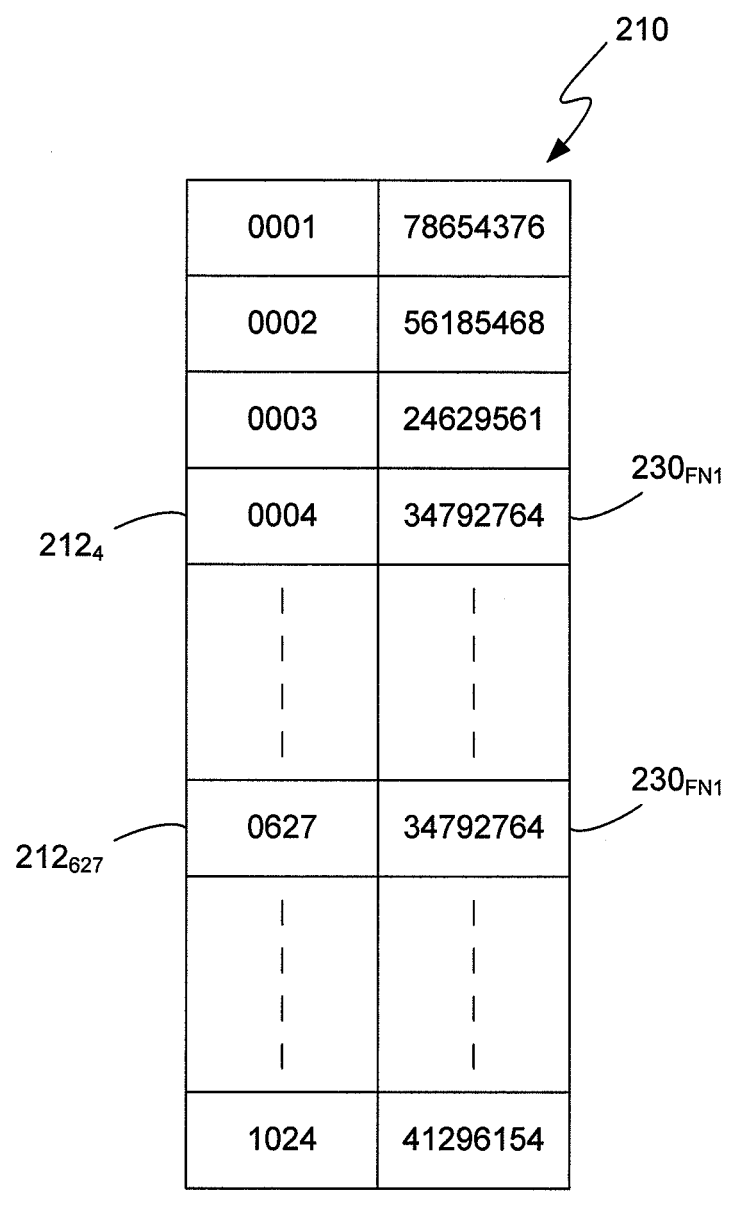
Figure 4F:
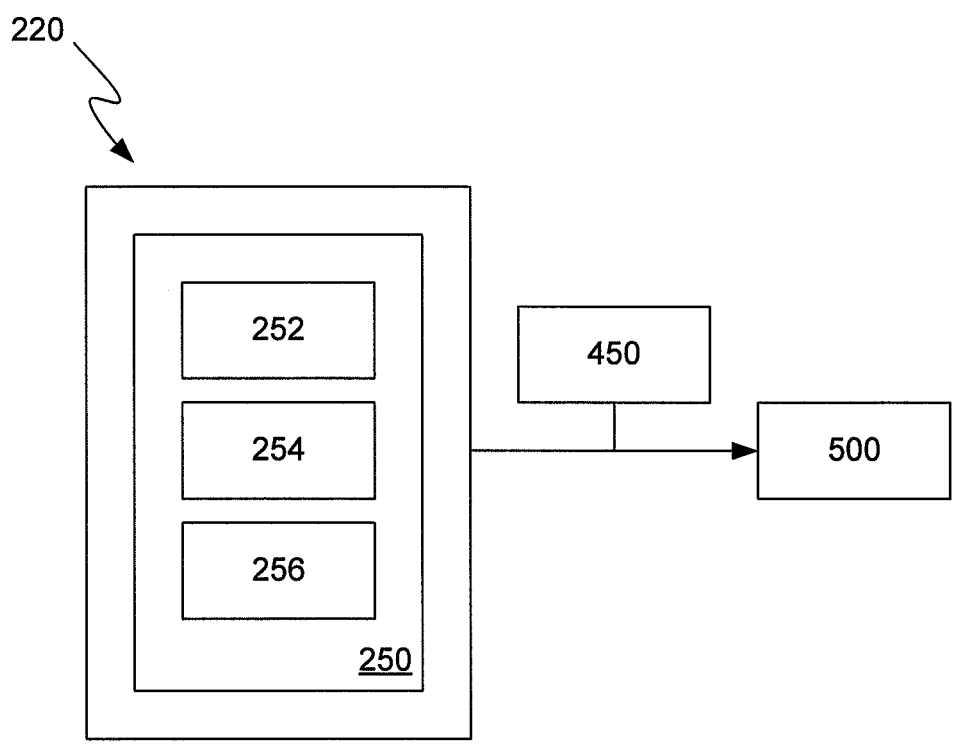
FIG. 4f is a schematic view illustrating one embodiment of a hash program useful in accordance with the present disclosure.

With reference now to FIG. 4f, the hash program 220 may transmit a comparison result 450 to an executable program 500, e.g., a virus scanner. For example, if the first new digest value $230_{FN1}$ is the same as the old digest value $230_{OV4}$ stored at the first index position $212_4$ and/or the old digest value $230_{OV267}$ stored at the second index position $212_{627}$, the hash program 220 may transmit "found" to the executable program 500. In another example, if the first new digest value $230_{FN1}$ is different than the old digest value $230_{OV4}$ stored at the first index position $212_4$ and/or the old digest value $230_{OV627}$ stored at the second index position $212_{627}$, the hash program 220 may transmit "not found" to the executable program 500.

With reference now to FIG. 4e, the hash program 220 may replace the old digest value $230_{OV4}$ stored at the first index position $212_4$ with the first new digest value $230_{FN1}$. The hash program 220 may replace the old digest value $230_{OV627}$ stored at the second index position $212_{627}$ with the first new digest value $230_{FN1}$. By storing the first new digest value $230_{FN1}$ at least at two index positions 212, the more likely it is that the file 302 will be remembered in the hash table 210.

Figure 5A:
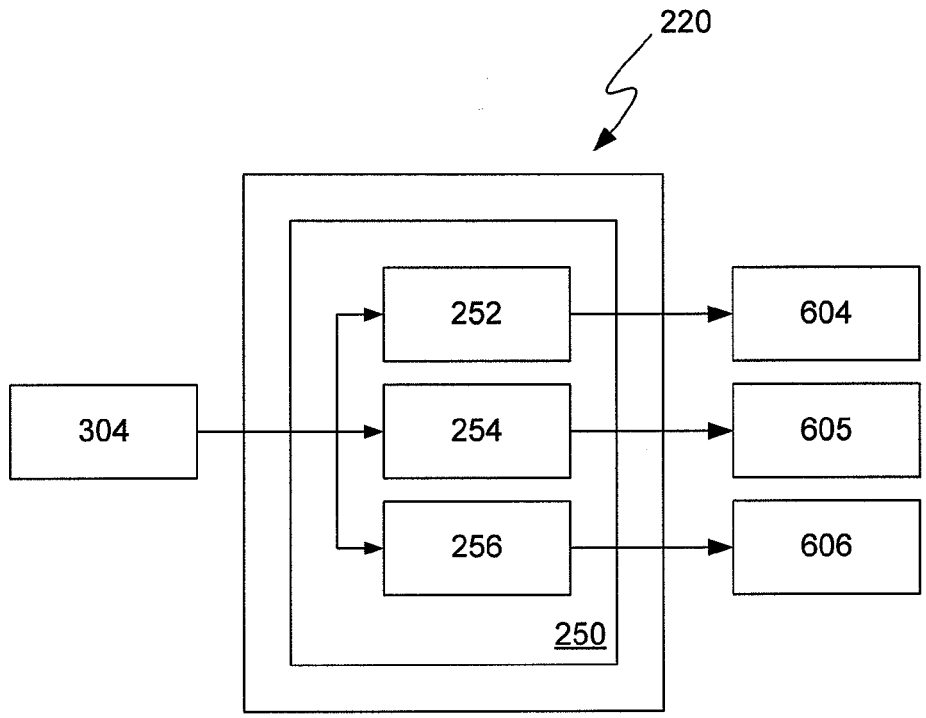
FIG. 5a is a schematic view illustrating one embodiment of a hash program useful in accordance with the present disclosure

As illustrated in FIG. 4e, the first new digest value $230_{FN1}$ may be stored at both the first index position $212_4$ and the second index position $212_{627}$ of the hash table 210. With reference now to FIG. 5a, a second file 304, (a type of a data item 300), having a file name (e.g., FN2) may be received by the hash program 220. In this example, the second file 304 is different than the first file 302, i.e., the second file 304 has a different file name than the first file 302, and the hash program 220 may produce fourth through sixth hash values (604-606) associated with the file name of the second file 304.

Figure 5B:
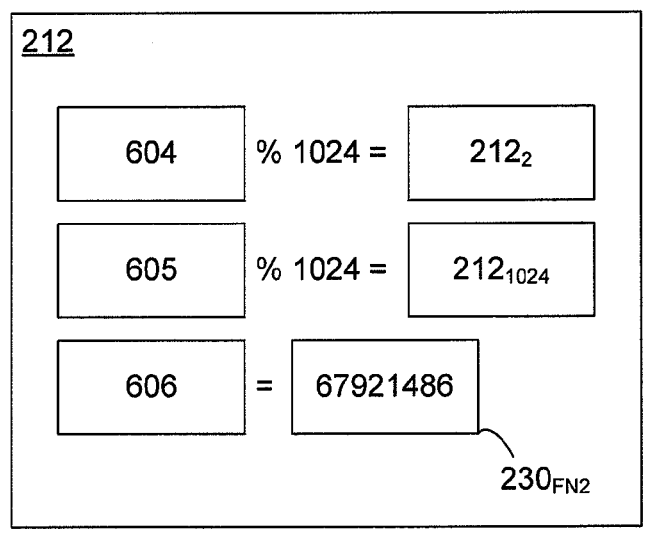
FIG. 5b is a schematic view of one embodiment of a method for producing values useful in accordance with the present disclosure

With reference now to FIG. 5b, the fourth hash value 604 may be used to determine a third index position of the hash table 210. The fifth hash value 605 may be used to determine a fourth index position of the hash table 210. In the illustrated embodiment, the third index position is identified as $212_2$ and the fourth index position is identified as $212_{1024}$. The third index position $212_2$ and the fourth index position $212_{1024}$ may be determined in the same way as described above. The sixth hash value 606 may be a second new digest value $230_{FN2}$, i.e., 67921486. In one embodiment, the fourth hash value 604 may be different than the first hash value 601 and the fifth hash value 605 may be different than the second hash value 602. In this example, both third index position $212_2$ and the fourth index position $212_{1024}$ are different than both the first index position $212_4$ and the second index position $212_{627}$. The second new digest value $230_{FN2}$ may be compared to the old digest value $230_{OV2}$ stored at the third index position $212_2$ and the old digest value $230_{OV1024}$ stored at the fourth index position $212_{1024}$, as described above.

As illustrated in FIG. 5c, the second new digest value $230_{FN2}$ may be stored at both the third index position $212_2$ and the fourth index position $212_{1024}$ of the hash table 210. In this example, the first new digest value $230_{FN1}$ is stored at the first index position $212_4$ and the second index position $212_{627}$ of the hash table 210 and the second new digest value $230_{FN2}$ is stored at the third index position $212_2$ and the fourth index position $212_{1024}$ of the hash table 210. As illustrated in this example, no collisions occur.

In other embodiments, although the file names are different, the fourth hash value 604 may be the same as the first hash value 601 and the fifth hash value 605 may be different than the second hash value 602. In this example, and with reference now to FIG. 5d, the third index position is identified as $212_4$, which is the same as the first index position $212_4$ and the fourth index position is identified as $212_{1024}$, which is different than the second index position $212_{627}$. The second new digest value $230_{FN2}$ may be stored at both the first index position $212_4$ and the fourth index position $212_{1024}$ of the hash table 210. In this example, the first new digest value $230_{FN1}$ is stored at the second index position $212_{627}$ of the hash table 210 and the second new digest value $230_{FN2}$ is stored at the first index position $212_4$ and the fourth index position $212_{1024}$ of the hash table 210.

As illustrated in this example, a collision occurs between the third index position $212_4$ and the first index position $212_4$. The first new digest value $230_{FN1}$ is overwritten by the second new digest value $230_{FN2}$ at the first index position $212_4$ and the first new digest value $230_{FN1}$ remains stored at the second index position $212_{627}$. As noted above, storing a single digest value 230 at least at two index positions 212 assists the computer system 100 in storing more recent and relevant digest values 230, i.e., the more recently accessed data items 300. Since the first new digest value $230_{FN1}$ remains stored at the second index position $212_{627}$, the file 302 is more likely to be remembered in the hash table 210 the next time file 302 is accessed even with a collision occurring.

Figure 5E:
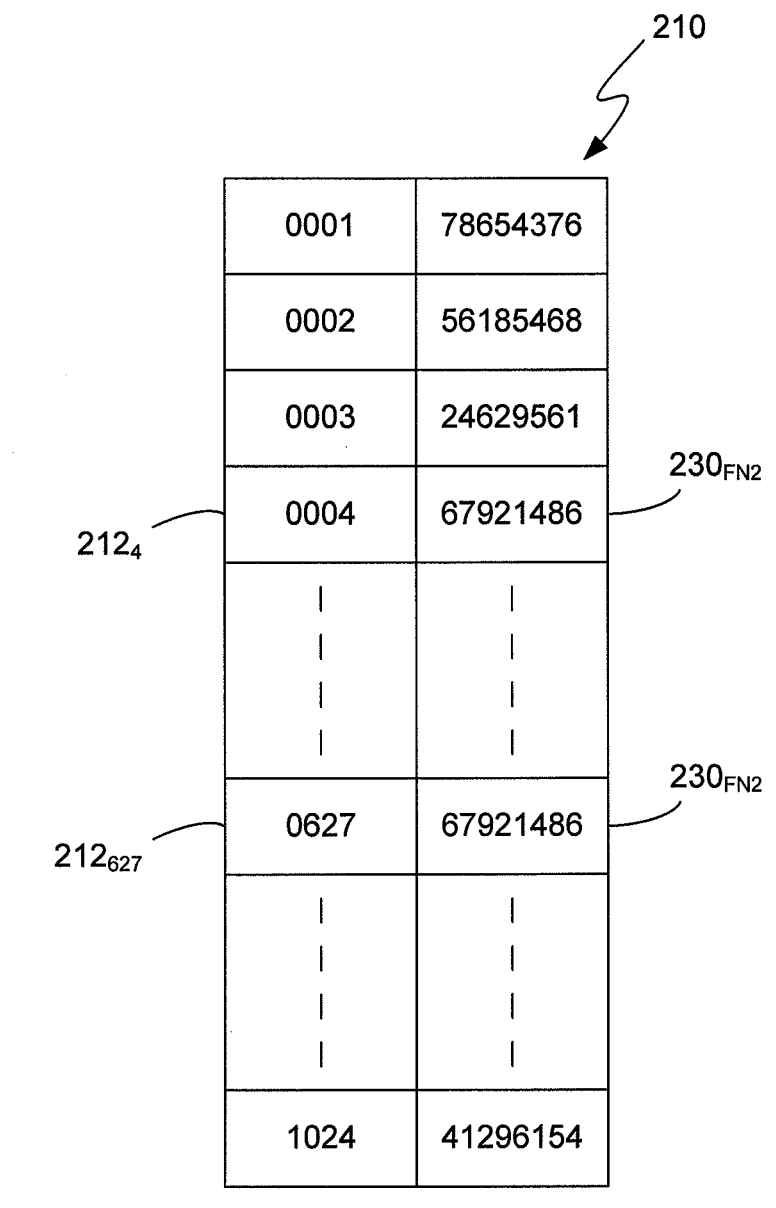

In other embodiments, the fourth hash value 604 may be the same as the first hash value 601 and the fifth hash value 605 may be the same as the second hash value 602, such as when equivalent filenames are used by data items 300. In this example, and with reference now to FIG. 5e, the third index position is identified as $212_4$, which is the same as the first index position $212_4$ and the fourth index position is identified as $212_{627}$, which is the same as the second index position $212_{627}$. The second new digest value $230_{FN2}$ may be stored at both the first index position $212_4$ and the second index position $212_{627}$ of the hash table 210. In this example, the second new digest value $230_{FN2}$ is stored at the first index position $212_4$ and the second index position $212_{627}$ of the hash table 210. A collision occurs between the fourth index position $212_{627}$ and the second index position $212_{627}$ and between the third index position $212_4$ and the first index position $212_4$. The first new digest value $230_{FN1}$ is overwritten by the second new digest value $230_{FN2}$ at the first index position $212_4$ and the second index position $212_{627}$. However, since at least three different data conversion modules 250 (two used to determine index positions 212 and one used to determine a digest value 230) are employed for each data item 300 accessed, the collisions described in this example are less likely to occur.

In other embodiments, the fourth hash value 604 may be the same as the second hash value 602 and the fifth hash value 605 may be the same as the first hash value 601. As described above, at least three hash values 600 may be produced for data items that are accessed and/or utilized by the hash program 220. In one embodiment, for each data item 300 accessed and/or utilized by the hash program 220, the hash values 600 produced for a first data item may be different than the hash values 600 produced for a second data item. In one embodiment, for each data item 300 accessed and/or utilized by the hash program 220, the hash values 600 produced for a first data item may be the same as the hash values 600 produced for a second data item.

Although a hash table 210 of size 1 KB has been utilized to illustrate the inventive features of the computer system 100, a hash table 210 of any size may be used. In some embodiments, the hash table 210 has a size of 2 KB, or 4 KB, or 8 KB, or 16 KB, or 32 KB. Larger hash tables may be used. Although the first through fourth index positions illustrated above are identified as specific locations in the hash table 210, the first through fourth index positions may be of any location in the hash table 210. For example, the first index position may be any of $212_1$-$212_{1024}$ for a hash table 210 of size 1 KB.

As noted above, the hash program 220 may include a plurality of data conversion modules 250 and the hash table 210 may include a plurality of index positions 212. In one embodiment, the plurality of data conversion modules 250 of the hash program 220 is at least three data conversion modules 250. In other embodiments, the plurality of data conversion modules 250 of the hash program 220 is at least 4 data conversion modules 250, or at least 5, or at least 6, or at least 7, or at least 8, or at least 9, or at least 10, or at least 11, or at least 12 data conversion modules 250. In one embodiment, the data conversion modules 250 may be of a first type similar to that of the first data conversion module 252 and the second data conversion module 254. For example, the data conversion modules 250 of the first type may produce a hash value 600 used to determine an index position 212 of the hash table 210. In one embodiment, at least two of the data conversion modules 250 are of the first type. In one embodiment, the data conversion modules 250 may be of a second type similar to that of the third data conversion module 256. For example, the data conversion modules 250 of the second type may produce a digest value 230 to be stored in the hash table 210. In one embodiment, at least one of the data conversion modules 250 is of the second type. In one embodiment, only one data conversion module is of a second type. In some of these embodiments, the remainder of the data conversion modules are of the first type.

To facilitate improved performance, the ratio of data conversion modules to index position may be tailored. For example, when two data conversion modules of the first type are employed, the number of index positions may be at least about 1024 (i.e., a 1K hash table size). In this embodiment, the ratio is 1024 IP:2 DCM. Two data conversion modules of the first type may be useful for hash table sizes of from 1K to 32K. In one embodiment, the hash table size is in the range of from 1K to 16K per two data conversion modules of a first type. In other embodiments, the hash table size is in the range of from 1K to 12K, or from 1K to 8K, or from 1K to 6K, or from 1K to 4K per two data conversion modules of a first type. That is, the ratio of the plurality of index positions 212 to the plurality of data conversion modules 250 of the first type may be at least about 1024:2. In other embodiments, the ratio of the plurality of index positions 212 to the plurality of data conversion modules 250 of the first type may be at least about 2048:2, or at least about 3072:2, or at least about 4096:2, or at least about 5120:2, or at least about 6144:2, or at least about 7168:2, or at least about 8192:2, or at least about 9216:2, or at least about 10240:2, or at least about 11264:2, or at least about 12288:2, or at least about 13312:2, or at least about 14336:2, or at least about 15360:2, or at least about 16384:2, or more.

For example, when three data conversion modules of the first type are employed, the number of index positions may be at least about 1024 (i.e., a 1K hash table size). In this embodiment, the ratio is 1024 IP:3 DCM. Three data conversion modules of the first type may be useful for hash table sizes of from 2K to 64K. In one embodiment, the hash table size is in the range of from 2K to 32K per three data conversion modules of a first type. In other embodiments, the hash table size is in the range of from 2K to 16K, or from 2K to 12K per three data conversion modules of a first type. In some embodiments, the hash table size is at least 3K. In other embodiments, the hash table size is at least 4K, or at least 5K, or at least 6K, or at least 7K, or at least 8K. That is, the ratio of the plurality of index positions 212 to the plurality of data conversion modules 250 of the first type is at least about 1024:3. In other embodiments, the ratio of the plurality of index positions 212 to the plurality of data conversion modules 250 of the first type is at least about 2048:3, or at least about 3072:3, or at least about 4096:3, or at least about 5120:3, or at least about 6144:3, or at least about 7168:3, or at least about 8192:3, or at least about 9216:3, or at least about 10240:3, or at least about 11264:3, or at least about 12288:3, or at least about 13312:3, or at least about 14336:3, or at least about 15360:3, or at least about 16384:3, or at least about 17408:3, or at least about 18432:3, or at least about 19456:3, or at least about 20480:3, or at least about 21504:3, or at least about 22528:3, or at least about 23552:3, or at least about 24576:3, or at least about 25600:3, or at least about 26624:3, or at least about 27648:3, or at least about 28672:3, or at least about 29696:3, or at least about 30720:3, or at least about 31744:3, or at least about 32768:3, or more. In one embodiment, the ratio of the plurality of index positions 212 to the plurality of data conversion modules 250 of the first type may be greater than 32768:3.

In another example, when four data conversion modules of the first type are employed, the number of index positions may be at least about 1024 (i.e., a 1K hash table size). In this embodiment, the ratio is 1024 IP:4 DCM. Four data conversion modules of the first type may be useful for hash table sizes of from 2K to 128K. In one embodiment, the hash table size is in the range of from 2K to 64K per four data conversion modules of a first type. In other embodiments, the hash table size is in the range of from 2K to 32K per four data conversion modules of a first type. In some embodiments, the hash table size is at least 12K. In other embodiments, the hash table size is at least 16K, or at least 32K. That is, the ratio of the plurality of index positions 212 to the plurality of data conversion modules 250 of the first type is at least about 2048:4. In other embodiments, the ratio of the plurality of index positions 212 to the plurality of data conversion modules 250 of the first type is at least about 3072:4, or at least about 4096:4, or at least about 5120:4, or at least about 6144:4, or at least about 7168:4, or at least about 8192:4, or at least about 9216:4, or at least about 10240:4, or at least about 11264:4, or at least about 12288:4, or at least about 13312:4, or at least about 14336:4, or at least about 15360:4, or at least about 16384:4, or at least about 17408:4, or at least about 18432:4, or at least about 19456:4, or at least about 20480:4, or at least about 21504:4, or at least about 22528:4, or at least about 23552:4, or at least about 24576:4, or at least about 25600:4, or at least about 26624:4, or at least about 27648:4, or at least about 28672:4, or at least about 29696:4, or at least about 30720:4, or at least about 31744:4, or at least about 32768:4. In one embodiment, the ratio of the plurality of index positions 212 to the plurality of data conversion modules 250 of the first type may be greater than 32768:4.

In one embodiment, utilizing two data conversion modules 250 of the first type is useful with a hash table 210 having a size from about 1 KB to about 6 KB. In one embodiment, utilizing three data conversion modules 250 of the first type is useful with a hash table 210 having a size from about 7 KB to about 16 KB. In one embodiment, utilizing four data conversion modules 250 of the first type is useful with a hash table 210 having a size of at least about 16 KB. In one embodiment, utilizing four data conversion modules 250 of the first type is useful with a hash table 210 having a size from about 16 KB to about 32 KB. In one embodiment, more than four data conversion modules 250 of the first type may be used with hash tables 210 of any size including larger than 32 KB. For example, the ratio of the plurality of index positions 212 to the plurality of data conversion modules 250 of the first type may be 64,512:5. Any combination and/or permutation of the ratio of plurality of index positions 212 to the plurality of data conversion modules 250 may be used.

Embodiments of the present disclosure operate on data and, for example, generate digest values based on that data irrespective of what the data represents—for example, the data may be the whole or part of an audio file, a video file, an executable file, a dynamical-linked library file, or the like.

As will be appreciated, embodiments of the disclosure operate at a level such that the overall operation of the computer on which the methods of embodiments of the disclosure are run will be more efficient—with the manner in which this is achieved being generally invisible to the user. For example, a hash table according to an embodiment of the disclosure could be used to improve the operation and performance of an operating system or other functional application—such as a virus scanner. This is because, by using embodiments of the present disclosure, a data set on which a program has already operated will, in general, be more reliably detected as recognized than would be the case using a saturated hash table generated using a prior method.

An embodiment of the present disclosure provides, a method of interrogating a saturated hash table in a computer system to determine if a data set is recognized, the method comprising: computing a first digest value based on an attribute of a first data set; computing a first and a second location in the hash table based on an attribute of the first data set; comparing digest values stored at each of the first and second locations in the hash table with the first digest value; and issuing a found notification if the comparing step identifies a digest value which corresponds with the first digest value at the first or second location in the hash table, such that the notification can be used by the computer system as an indication that the first data set is recognized.

In an embodiment, the method further comprises storing the first digest value in one or both of the first and second locations in the hash table replacing the previously stored digest values.

In an embodiment, the method further comprises comparing digest values stored at one or more further locations in the hash table, the one or more further locations being based on an attribute of the first data set, and issuing a found notification if the comparing step identifies a digest value at any of the one or more further locations in the hash table which corresponds with the first digest value.

Such interrogation methods may be implemented as part of a virus scanner for determining whether or not a data set has already been scanned for viruses and the like. In embodiments, such interrogation methods are used to determine whether or not a first data set is substantially the same as a second data set—for example, as part of an integrity check of the computer system. Thus, the found notification may be issued to an operating system or other functional program—such as a virus scanner. In embodiments, the found notification is issued to and/or used by an infrastructure program of a computer system. In this context, an infrastructure program is a program which operates on a computer system and which manages the running of other programs on the computer system—an operating system is an example of an infrastructure program. In addition, a virus scanner may also be considered to be an infrastructure program because it operates on data available to the computer system to ensure that the data is free from viruses. The function of an infrastructure program is typically to maintain the correct operation of the computer system and the other programs running thereon.

Another embodiment of the present disclosure provides, a method of generating a saturated hash table for use by a computer system in an interrogation method to determine if a data set is recognized, the method comprising: computing a first digest value based on an attribute of a first data set; computing a first and a second location in the hash table based on an attribute of the first data set; storing the first digest value at each of the first and second locations in the hash table.

In an embodiment, the method further comprises computing one or more further locations in the hash table based on an attribute of the first data set and storing the first digest value at the or each further locations in the hash table.

In an embodiment, the storing of a digest value comprises replacing a digest value already stored at the location in the hash table.

Generating a saturated hash table may be achieved by an infrastructure program of a computer system.

Methods of embodiments of the present disclosure may be performed by computer systems and may be represented by code stored on a computer readable medium—this medium may be volatile or non-volatile memory.

In the context of the present disclosure, a virus scanner may be a computer program which scans one or more data sets (usually in the form of files) on a computer system. The virus scanner may be seeking one or more predetermined computer programs or part thereof—which may include viruses, Trojan horses, worms, adware, spyware, and the like. Unless otherwise stated, the term "virus" as used herein is to be interpreted broadly as encompassing not only conventional computer viruses but also other unwanted and/or potentially malicious computer programs.

As will be appreciated, the use of saturated hash tables by embodiments of the present invention allows a balance to be made between having a large hash table which includes sufficient locations for all of the required digest values to be stored once, and limited memory resources that are available (or which are available within reasonable time periods).

When used in this specification and claims, the terms "comprises" and "comprising" and variations thereof mean that the specified features, steps or integers are included. The terms are not to be interpreted to exclude the presence of other features, steps or components.

Figure 6A:
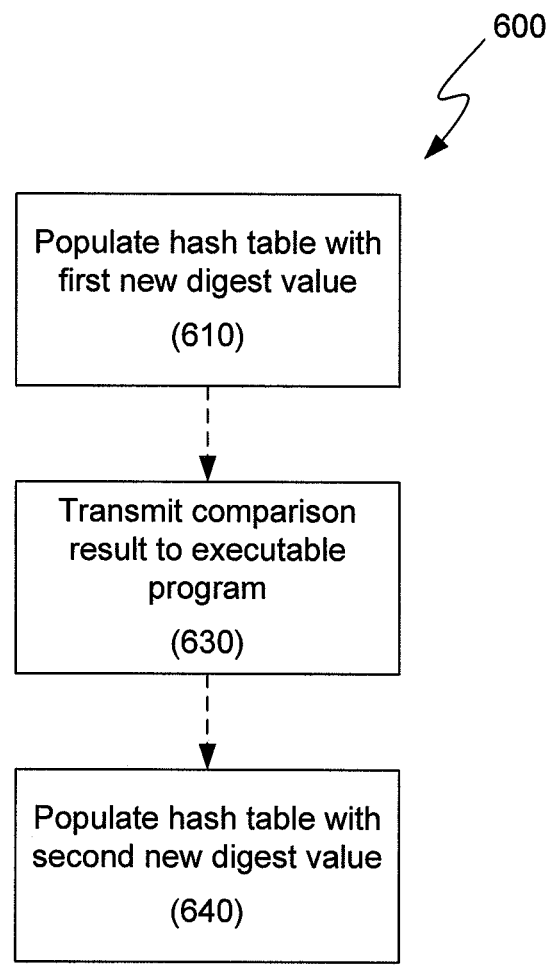
FIG. 6a is a flow chart of one embodiment of methods useful for operating a saturated hash table.

Methods of operating a saturated hash table are also provided. In one embodiment, and with reference now to FIG. 6a, the method (600) includes the step of populating a hash table with a first new digest value (610). In one approach, the first new digest value is stored at least at a first index position and a second index position of the hash table. The method (600) may optionally include the step of transmitting a comparison result to an executable program (630) and/or the step of populating the hash table with a second new digest value (640).

Figure 6B:
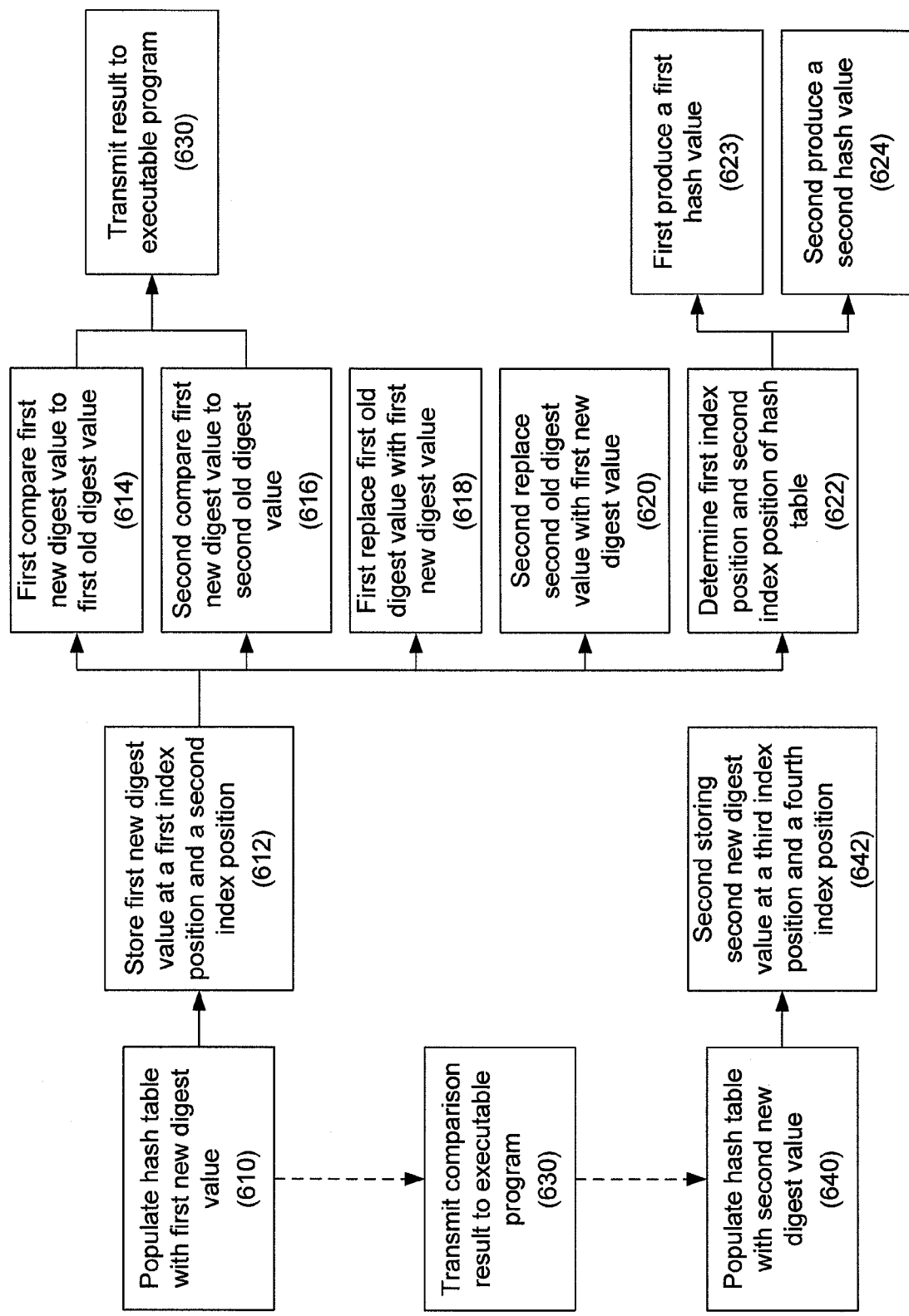
FIG. 6b is a flow chart of one embodiment of methods useful for operating a saturated hash table.

As noted above, the first new digest value may be stored at least at a first index position and a second index position of the hash table (612). Prior to the first new digest value being stored, the first index position may contain a first old digest value and the second index position may contain a second old digest value. With reference now to FIG. 6b, this storing step (612) may include the steps of first comparing the first new digest value to the first old digest value (614), second comparing the first new digest value to the second old digest value (616), first replacing the first old digest value with the first new digest value (618), and second replacing the second old digest value with the first new digest value (620). In one embodiment, the storing step (612) may include the step of determining the first index position and the second index position of the hash table based on an attribute of a first data item (622).

In one embodiment, this determining step (622) may include the steps of first producing a first hash value via a first data conversion module (623) and second producing a second hash value via a second data conversion module (624). After the storing step (612), the hash table may be populated with a second new digest value (640). In one approach, this populating step (640) may include the step of second storing the second new digest value at least at a third index position and a fourth index position of the hash table (642).

Unless otherwise stated in the present disclosure, the following definitions should be used throughout the entirety of the present disclosure.

A hash value is a value calculated by a data conversion module. For example, a data conversion module may receive a data item and calculate a hash value based on at least one attribute of the data item.

A hash table is an array stored in memory of a computer and that is used to, among other things, store digest values. For example, a hash table of size 2K (kilobytes) has 2048 index positions and may store 2048 digest values, each index position being associated with a corresponding digest value. In one embodiment, the hash table 210 may be a saturated hash table. A saturated hash table is a hash table that includes a number of index positions that is less than the number of data items utilized by the hash program 220. In one embodiment, the data item 300 may be one of a plurality of data items. In one embodiment, the ratio of the plurality of index positions of the hash table 210 to the plurality of data items 300 is at least 1:10. In other embodiments, the ratio of the plurality of index positions of the hash table 210 to the plurality of data items 300 is at least 1:100, or at least 1:1000, or at least 1:10,000.

A digest value is a hash value that represents at least one attribute of a data item and that is stored at a plurality of index positions of a hash table. For example, a data conversion module may calculate a digest value based on at least one attribute of the data item, and the digest value may be stored at a plurality of index positions of the hash table. In one embodiment, the digest value 230 may be a 32-bit number. In other embodiments, the digest value 230 may be a 64-bit number, or a 128-bit number. Other size numbers may be used. In one embodiment, the digest value 230 may be metadata and/or contained information of the data item 300, as defined below.

An index position is a position of a hash table (e.g., position 768 of a 1024 byte table). An index position may be associated with a digest value. For example, a hash value may be determined based on at least one attribute of the data item. This hash value may be used to determine an index position of the hash table. This index position may be used to store the digest value.

A hash program is a program located in memory of a computer, and that is operable to communicate with a hash table.

Data conversion module means a module of a hash program that is operable to calculate values based on at least one attribute of a data item (e.g., hash values, digest values). For example, a data conversion module may calculate a value based on a file name of a data item. In one embodiment, the value may be a hash value. In one embodiment, the value may be a digest value. Examples of data conversion modules include DJB2, Murmur, SDBM, Jenkins, Fowler-noll-vo, Pearson, and Zobrist, to name a few. These data conversion modules are conventional hashing algorithms that are well-known in the relevant art.

A data item is an item that contains or represents data and is useful in combination with a hash table. A data item may have associated metadata and/or contained information, either of which may be an attribute of the data item. Examples of data items include computer files (e.g., web pages, software applications, audio files, video files, executable files, a dynamical-linked library file), caches, associative arrays, binary decision programs, DNA sequences and records (e.g., information about employees of a company (employee names, addresses, and phone numbers)), to name a few.

Attribute of a data item means associated metadata of or contained information of the data item, and that is usable by a hash program to calculate a value (e.g., a hash value, a digest value). For example, if the data item is a file, file metadata (e.g., the file name, file size, file type) may be attributes of the file. In another example, if the data item is a file, contained information of the file (e.g., text, images, source code) may be attributes of the file.

Associated metadata of a data item means data associated with, but not contained within, the data item. Metadata may include information such as the method of creation of the data item, purpose of the data item, time and date of the data item, creator of the data item, and size of the data item, among others. For example, if the data item is a digital image, the metadata may include the size of the image, the color depth, the image resolution, and when the image was created, to name a few.

Contained information of a data item means content contained within the data item. Contained information may include information such as the text of a word document, images of a web page, the source code of a software application, and execution instructions, to name a few, and that are contained within the data item.

A comparison result is a result of the comparison between a first digest value (e.g., a new digest value) and a second digest value (e.g., an old digest value). For example, when a new digest value is compared to an old digest value, if the new digest value is the same as the old digest value, the hash program may transmit "found" to an executable program. In another example, when a new digest value is compared to an old digest value, if the new digest value is different than the old digest value, the hash program may transmit "not found" to an executable program.

An executable program may be a virus scanner, a free text content indexing system, a program used to evaluate the stock market, and/or a processor of a computer, to name a few.

EXAMPLES

Example 1

Conventional Saturated Hash Table Process—2K

Two conventional hashing algorithms (e.g., data conversion modules) are typically employed with a hash table having a size of 2K, or 2048 positions. The first hashing algorithm calculates a first hash value used to determine a position (e.g., an index position) in the hash table. The position in the hash table is determined by dividing the first hash value with the hash table size. The second hashing algorithm calculates a second hash value, commonly called the "digest", to be stored in the position determined from the first hashing algorithm. For example, if file #1 has a first hash value of 78654376 and second hash value of 56185468, the digest 56185468 will be stored at index position 936 (78654376% 2048). After each position in the hash table has been filled, the hash table becomes saturated and the chance of the saturated hash table remembering that a file has been accessed may not be improved.

Figure 7:
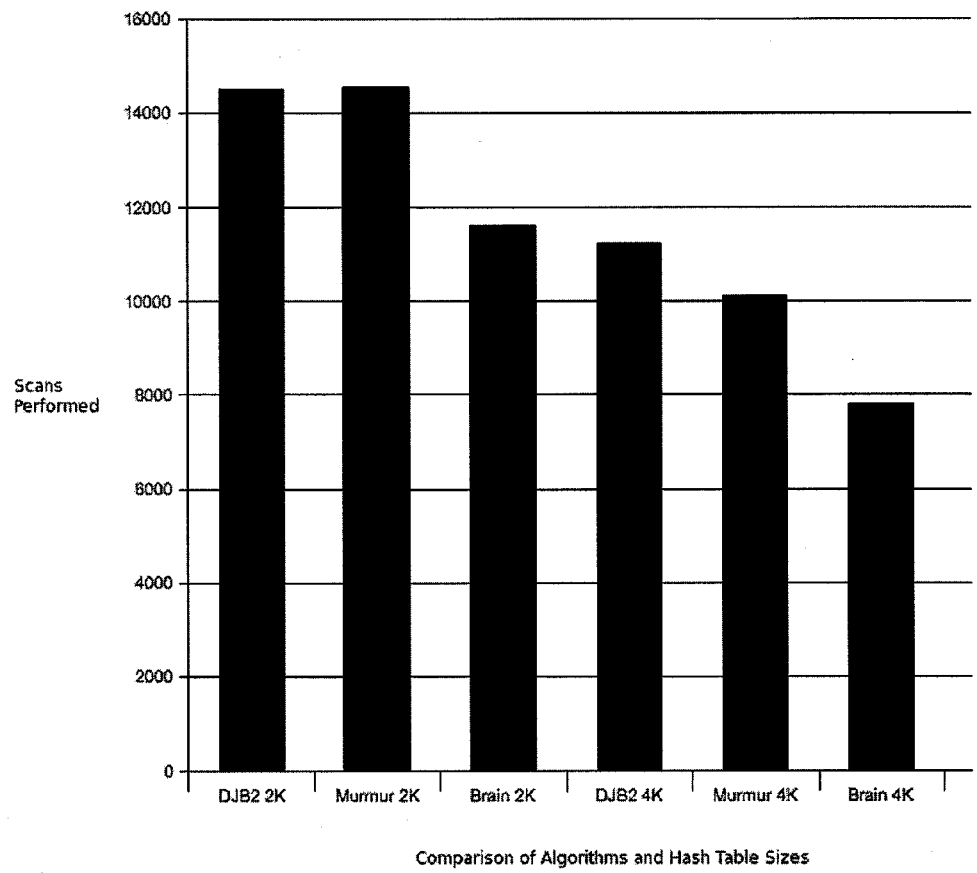
FIG. 7 is a graph illustrating the performance of various data conversion modules with hash tables of size 2 KB and 4 KB.

As illustrated in FIG. 7 below, DJB2 and Murmur are employed with a hash table having a size of 2K, or 2048 positions. An input data set of 80,000 file names is used by intercepting file accesses during real work, using common software applications such as FIREFOX, OPENOFFICE and VISUAL STUDIO. Each of DJB2 and Murmur are conventional hashing algorithms that calculate a first hash value used to determine the hash table index for every file of the input data set. A second hashing algorithm is employed to calculate a second hash value (the "digest"). If the value found at the index in the hash table is the same as the digest calculated for the current file name, the file has already been accessed and a new scan does not need to be performed. If the value found at the index in the hash table is different from the digest calculated for the current file name, the newly calculated digest is written at the index position in the hash table and a scan is performed on the file. Both the DJB2 and the Murmur hashing algorithms realize about 14,500 scans performed after remembered scans have been eliminated by the saturated hash table.

Example 2

New Saturated Hash Table Process—2K

A new hashing program Brain uses three conventional hashing algorithms that are employed with a hash table having a size of 2K, or 2048 positions. The first hashing algorithm calculates a first hash value used to determine a first index position in the hash table. The second hashing algorithm calculates a second hash value used to determine a second index position in the hash table. The first and second index positions in the hash table are determined by dividing the first and second hash values with the hash table size. The third hashing algorithm calculates a third hash value (the "digest") to be stored in the first and second index positions determined from the first and second hashing algorithms. For example, if file #1 has a first hash value of 78654376, a second hash value of 46739875, and a third hash value of 24629561, the digest represented by the third hash value 24629561 will be stored at both index positions 936 (78654376% 2048) and 419 (46739875% 2048) of the hash table.

As illustrated in FIG. 7 below, Brain is employed with a hash table having a size of 2K, or 2048 positions. The input data set of 80,000 file names, as used in Example 1, is used by intercepting file accesses during real work, using common software applications such as FIREFOX, OPENOFFICE and VISUAL STUDIO. The two index positions of the Brain program are calculated using the DJB2 and Murmur algorithms for each file of the input data set. A third hashing algorithm is employed to calculate the digest hash value. If the digest value calculated for the current file is found at either of the index positions, the file has already been accessed and a new scan does not need to be performed. If the digest value calculated for the current file is different from the values found in the hash table at both index positions, a new scan is performed on the file. In either case, the digest value calculated for the current file is stored in both of the index positions. The number of scans performed using the Brain hashing program is about 11,500, which is about 3,000 less than the number of scans performed using either the DJB2 or Murmur hashing algorithms with a 2K size hash table. One of ordinary skill in the art might expect storing a single hash value at two positions to reduce the effectiveness of the hash table in the same way as halving its size would do. However, the number of scans performed decreased from about 14,500 to about 11,500, which is an improvement of about 20%.

Example 3

Conventional Saturated Hash Table Process—4K

DJB2 and Murmur are each separately employed with a hash table having a size of 4K, or 4096 positions. The input data set of 80,000 file names, as used in Example 1, is used by intercepting file accesses during real work, using common software applications such as FIREFOX, OPENOFFICE and VISUAL STUDIO. DJB2 and Murmur calculate and store each hash value in the same way as they do with a 2K size table, as noted above in Example 1. As illustrated in FIG. 7 below, the DJB2 hashing algorithm realizes about 11,000 scans performed and the Murmur hashing algorithm realizes about 10,000 scans performed with a 4K size hash table.

Example 4

New Saturated Hash Table Process—4K

Brain is employed with a hash table having a size of 4K, or 4096 positions. The input data set of 80,000 file names, as used in Example 1, is used by intercepting file accesses during real work, using common software applications such as FIREFOX, OPENOFFICE and VISUAL STUDIO. Brain calculates and stores each hash value in the same way as it does with a 2K size table, as noted above in Example 2. As illustrated in FIG. 7 below, the number of scans performed using the Brain hashing program is about 8,000, which is about 2,000-3,000 less than the number of scans performed using either the DJB2 or Murmur hashing algorithms with a 4K size hash table. One of ordinary skill in the art might expect the performance of Brain with a 4K size hash table to be similar to that of DJB2 and Murmur with a 2K size hash table due to storing a single hash value at two positions. However, instead of scans performed increasing from about 11,500 to about 14,500 scans, as one of ordinary skill in the art might expect, the number of scans performed decreased from about 11,500 to about 8,000, which is an improvement of about 33%.

Overall Results:

The performance of DJB2 and Murmur algorithms used alone vs. Brain hashing program is shown in FIG. 7 below. DJB2 realizes about 14,500 scans performed with the 2K size hash table and about 11,000 scans performed with a 4K size hash table. Murmur realizes about 14,500 scans performed with the 2K size hash table and about 10,000 scans performed with a 4K size hash table. The Brain hashing program realizes about 11,500 scans performed with a 2K size hash table and about 8,000 scans performed with a 4K size hash table.

Example 5

Repetition Properties of Real World Data

The technique of storing one digest value at least at two index positions of a saturated hash table works by "biasing" the saturated hash table's memory towards more recent data entries. For this to be useful, the more recent data entries should be more likely to be repeated as data items, e.g., file names, utilized by the hash program. A distribution of file names is created from a real world data set while a variety of normal heavy use patterns including Word, Google Earth, Firefox, and Visual Studio were occurring. A program is used to produce a list of the repetition frequencies found in the distribution of file names.

Figure 8:
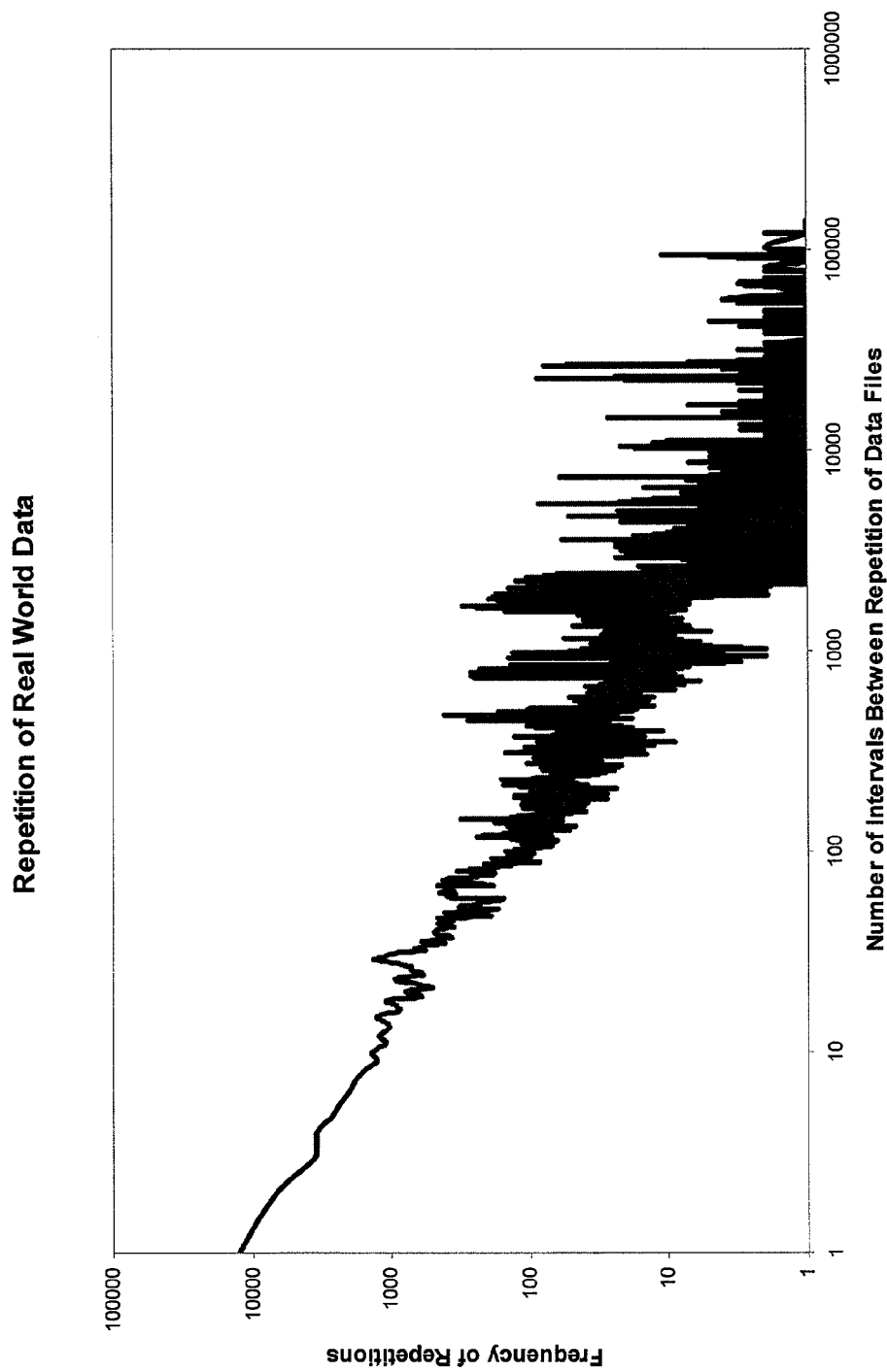
FIG. 8 is a graph illustrating the repetition properties of real world data.

FIG. 8 below illustrates the repetition properties of this real world data set. The frequency of repetition of data file names is over 10,000 when the number of intervals between repetition of data file names is 1. In other words, for this data set there were over 10,000 occurrences of a data file name being repeated immediately. In contrast, the frequency of repetition of data file names is only about 100 when the number of intervals between repetition of data file names is 100. In other words, for this data set there were about 100 occurrences of a data file being repeated after an interval of 100 data files names. As the number of intervals between repetition of data files names gets larger, the frequency of repetition of data files names gets smaller. The results of this data show that repetitions of real world data may follow a 1/f^2—like or Brownian—like distribution. Such 1/f^2—like or Brownian—like distributions may be ubiquitous in nature. This means that any data set utilized by the hash program may realize these repetition properties.

Example 6

Operation of a Saturated Hash Table with a Mixture of Data Conversion Modules

The same data used in Example 5 is used to determine the number of scans that would need to be performed out of a maximum of 158,344 (number of file names) using all possible combinations of four well-known algorithms (e.g., data conversion modules): DJB2, Murmur, SDBM, and Jenkins and for hash table sizes of 1,024 KB-32,768 KB. Each algorithm is used to determine an index position of the hash table to store each file name. For example, when one algorithm is used, the file name is stored at one index position of the hash table. When two algorithms are used, the file name is stored at two index positions of the hash table. When three algorithms are used, the file name is stored at three index positions of the hash table. When four algorithms are used, the file name is stored at four index positions of the hash table. As illustrated in FIGS. 9-14 and Tables 1-6, below, any combination of two algorithms is always better than one or four algorithms and, on average, is better than three algorithms for a table size of 1,024 KB-6,144 KB.

TABLE 1

| No. of IP | No. of DCMs | Average No. of Scans | Ratio of DCM:IP | Standard Deviation |
|---|---|---|---|---|
| 1024 | 1 | 33566 | 1024 | 1017 |
| 1024 | 2 | 31939 | 512 | 272 |
| 1024 | 3 | 34070 | 341 | 557 |
| 1024 | 4 | 37117 | 256 | — |

TABLE 2

| No. of IP | No. of DCMs | Average No. of Scans | Ratio of DCM:IP | Standard Deviation |
|---|---|---|---|---|
| 2048 | 1 | 24263 | 2048 | 319 |
| 2048 | 2 | 20873 | 1024 | 450 |
| 2048 | 3 | 20890 | 683 | 196 |
| 2048 | 4 | 21760 | 512 | — |

TABLE 3

| No. of IP | No. of DCMs | Average No. of Scans | Ratio of DCM:IP | Standard Deviation |
|---|---|---|---|---|
| 3072 | 1 | 19144 | 3072 | 844 |
| 3072 | 2 | 16213 | 1536 | 283 |
| 3072 | 3 | 16429 | 1024 | 286 |
| 3072 | 4 | 16958 | 768 | — |

TABLE 4

| No. of IP | No. of DCMs | Average No. of Scans | Ratio of DCM:IP | Standard Deviation |
|---|---|---|---|---|
| 4096 | 1 | 16938 | 4096 | 806 |
| 4096 | 2 | 14183 | 2048 | 367 |
| 4096 | 3 | 14302 | 1365 | 248 |
| 4096 | 4 | 14714 | 1024 | — |

TABLE 5

| No. of IP | No. of DCMs | Average No. of Scans | Ratio of DCM:IP | Standard Deviation |
|---|---|---|---|---|
| 5120 | 1 | 14686 | 5120 | 987 |
| 5120 | 2 | 12527 | 2560 | 206 |
| 5120 | 3 | 12806 | 1707 | 44 |
| 5120 | 4 | 13317 | 1280 | — |

TABLE 6

| No. of IP | No. of DCMs | Average No. of Scans | Ratio of DCM:IP | Standard Deviation |
|---|---|---|---|---|
| 6144 | 1 | 14167 | 6144 | 362 |
| 6144 | 2 | 11314 | 3072 | 116 |
| 6144 | 3 | 11529 | 2048 | 136 |
| 6144 | 4 | 12188 | 1536 | — |

As illustrated in FIGS. 15-24 and Tables 7-16 below, any combination of three algorithms is always better than one algorithm and, on average, is better than two or four algorithms for a table size of 7,168 KB-16,384 KB.

TABLE 7

| No. of IP | No. of DCMs | Average No. of Scans | Ratio of DCM:IP | Standard Deviation |
|---|---|---|---|---|
| 7168 | 1 | 13210 | 7168 | 1099 |
| 7168 | 2 | 10914 | 3584 | 367 |
| 7168 | 3 | 10890 | 2389 | 160 |
| 7168 | 4 | 11364 | 1792 | — |

TABLE 8

| No. of IP | No. of DCMs | Average No. of Scans | Ratio of DCM:IP | Standard Deviation |
|---|---|---|---|---|
| 8192 | 1 | 12460 | 8192 | 299 |
| 8192 | 2 | 10115 | 4096 | 169 |
| 8192 | 3 | 10107 | 2731 | 93 |
| 8192 | 4 | 10544 | 2048 | — |

TABLE 9

| No. of IP | No. of DCMs | Average No. of Scans | Ratio of DCM:IP | Standard Deviation |
|---|---|---|---|---|
| 9216 | 1 | 12015 | 9216 | 66 |
| 9216 | 2 | 9557 | 4608 | 72 |
| 9216 | 3 | 9503 | 3072 | 55 |
| 9216 | 4 | 9827 | 2304 | — |

TABLE 10

| No. of IP | No. of DCMs | Average No. of Scans | Ratio of DCM:IP | Standard Deviation |
|---|---|---|---|---|
| 10240 | 1 | 11375 | 10240 | 778 |
| 10240 | 2 | 9260 | 5120 | 133 |
| 10240 | 3 | 9143 | 3413 | 19 |
| 10240 | 4 | 9416 | 2560 | — |

TABLE 11

| No. of IP | No. of DCMs | Average No. of Scans | Ratio of DCM:IP | Standard Deviation |
|---|---|---|---|---|
| 11264 | 1 | 10832 | 11264 | 897 |
| 11264 | 2 | 8893 | 5632 | 132 |
| 11264 | 3 | 8776 | 3755 | 35 |
| 11264 | 4 | 8976 | 2816 | — |

TABLE 12

| No. of IP | No. of DCMs | Average No. of Scans | Ratio of DCM:IP | Standard Deviation |
|---|---|---|---|---|
| 12288 | 1 | 10723 | 12288 | 436 |
| 12288 | 2 | 8642 | 6144 | 133 |
| 12288 | 3 | 8523 | 4096 | 87 |
| 12288 | 4 | 8645 | 3072 | — |

TABLE 13

| No. of IP | No. of DCMs | Average No. of Scans | Ratio of DCM:IP | Standard Deviation |
|---|---|---|---|---|
| 13312 | 1 | 10587 | 13312 | 318 |
| 13312 | 2 | 8566 | 6656 | 86 |
| 13312 | 3 | 8287 | 4437 | 25 |
| 13312 | 4 | 8334 | 3328 | — |

TABLE 14

| No. of IP | No. of DCMs | Average No. of Scans | Ratio of DCM:IP | Standard Deviation |
|---|---|---|---|---|
| 14336 | 1 | 10615 | 14336 | 924 |
| 14336 | 2 | 8416 | 7168 | 123 |
| 14336 | 3 | 8139 | 4779 | 60 |
| 14336 | 4 | 8138 | 3584 | — |

TABLE 15

| No. of IP | No. of DCMs | Average No. of Scans | Ratio of DCM:IP | Standard Deviation |
|---|---|---|---|---|
| 15360 | 1 | 9854 | 15360 | 800 |
| 15360 | 2 | 8214 | 7680 | 103 |
| 15360 | 3 | 7989 | 5120 | 47 |
| 15360 | 4 | 8020 | 3840 | — |

TABLE 16

| No. of IP | No. of DCMs | Average No. of Scans | Ratio of DCM:IP | Standard Deviation |
|---|---|---|---|---|
| 16384 | 1 | 9766 | 16384 | 319 |
| 16384 | 2 | 8141 | 8192 | 85 |
| 16384 | 3 | 7896 | 5461 | 68 |
| 16384 | 4 | 7892 | 4096 | — |

As illustrated in FIGS. 25-40 and Tables 17-32 below, using all four algorithms is always better than any combination of using one, two, or three algorithms for a table size of 17,408 KB-32,768 KB.

TABLE 17

| No. of IP | No. of DCMs | Average No. of Scans | Ratio of DCM:IP | Standard Deviation |
|---|---|---|---|---|
| 17408 | 1 | 9720 | 17408 | 181 |
| 17408 | 2 | 8020 | 8704 | 85 |
| 17408 | 3 | 7780 | 5803 | 18 |
| 17408 | 4 | 7757 | 4352 | — |

TABLE 18

| No. of IP | No. of DCMs | Average No. of Scans | Ratio of DCM:IP | Standard Deviation |
|---|---|---|---|---|
| 18432 | 1 | 9616 | 18432 | 441 |
| 18432 | 2 | 7844 | 9216 | 43 |

TABLE 18-continued

| No. of IP | No. of DCMs | Average No. of Scans | Ratio of DCM:IP | Standard Deviation |
|---|---|---|---|---|
| 18432 | 3 | 7667 | 6144 | 30 |
| 18432 | 4 | 7632 | 4608 | — |

TABLE 19

| No. of IP | No. of DCMs | Average No. of Scans | Ratio of DCM:IP | Standard Deviation |
|---|---|---|---|---|
| 19456 | 1 | 9538 | 19456 | 159 |
| 19456 | 2 | 7798 | 9728 | 38 |
| 19456 | 3 | 7599 | 6485 | 33 |
| 19456 | 4 | 7542 | 4864 | — |

TABLE 20

| No. of IP | No. of DCMs | Average No. of Scans | Ratio of DCM:IP | Standard Deviation |
|---|---|---|---|---|
| 20480 | 1 | 9199 | 20480 | 327 |
| 20480 | 2 | 7758 | 10240 | 66 |
| 20480 | 3 | 7520 | 6827 | 24 |
| 20480 | 4 | 7480 | 5120 | — |

TABLE 21

| No. of IP | No. of DCMs | Average No. of Scans | Ratio of DCM:IP | Standard Deviation |
|---|---|---|---|---|
| 21504 | 1 | 9050 | 21504 | 198 |
| 21504 | 2 | 7713 | 10752 | 149 |
| 21504 | 3 | 7470 | 7168 | 27 |
| 21504 | 4 | 7433 | 5376 | — |

TABLE 22

| No. of IP | No. of DCMs | Average No. of Scans | Ratio of DCM:IP | Standard Deviation |
|---|---|---|---|---|
| 22528 | 1 | 9223 | 22528 | 754 |
| 22528 | 2 | 7630 | 11264 | 63 |
| 22528 | 3 | 7418 | 7509 | 26 |
| 22528 | 4 | 7349 | 5632 | — |

TABLE 23

| No. of IP | No. of DCMs | Average No. of Scans | Ratio of DCM:IP | Standard Deviation |
|---|---|---|---|---|
| 23552 | 1 | 9371 | 23552 | 732 |
| 23552 | 2 | 7588 | 11776 | 36 |
| 23552 | 3 | 7382 | 7851 | 54 |
| 23552 | 4 | 7322 | 5888 | — |

TABLE 24

| No. of IP | No. of DCMs | Average No. of Scans | Ratio of DCM:IP | Standard Deviation |
|---|---|---|---|---|
| 24576 | 1 | 8810 | 24576 | 353 |
| 24576 | 2 | 7526 | 12288 | 46 |
| 24576 | 3 | 7330 | 8192 | 8 |
| 24576 | 4 | 7259 | 6144 | — |

TABLE 25

| No. of IP | No. of DCMs | Average No. of Scans | Ratio of DCM:IP | Standard Deviation |
|---|---|---|---|---|
| 25600 | 1 | 8729 | 25600 | 246 |
| 25600 | 2 | 7524 | 12800 | 48 |
| 25600 | 3 | 7334 | 8533 | 35 |
| 25600 | 4 | 7267 | 6400 | — |

TABLE 26

| No. of IP | No. of DCMs | Average No. of Scans | Ratio of DCM:IP | Standard Deviation |
|---|---|---|---|---|
| 26624 | 1 | 8837 | 26624 | 250 |
| 26624 | 2 | 7494 | 13312 | 54 |
| 26624 | 3 | 7282 | 8875 | 29 |
| 26624 | 4 | 7223 | 6656 | — |

TABLE 27

| No. of IP | No. of DCMs | Average No. of Scans | Ratio of DCM:IP | Standard Deviation |
|---|---|---|---|---|
| 27648 | 1 | 8724 | 27648 | 561 |
| 27648 | 2 | 7453 | 13824 | 35 |
| 27648 | 3 | 7280 | 9216 | 36 |
| 27648 | 4 | 7233 | 6912 | — |

TABLE 28

| No. of IP | No. of DCMs | Average No. of Scans | Ratio of DCM:IP | Standard Deviation |
|---|---|---|---|---|
| 28672 | 1 | 8873 | 28672 | 431 |
| 28672 | 2 | 7425 | 14336 | 47 |
| 28672 | 3 | 7248 | 9557 | 17 |
| 28672 | 4 | 7187 | 7168 | — |

TABLE 29

| No. of IP | No. of DCMs | Average No. of Scans | Ratio of DCM:IP | Standard Deviation |
|---|---|---|---|---|
| 29696 | 1 | 8707 | 29696 | 91 |
| 29696 | 2 | 7398 | 14848 | 40 |
| 29696 | 3 | 7213 | 9899 | 25 |
| 29696 | 4 | 7159 | 7424 | — |

TABLE 30

| No. of IP | No. of DCMs | Average No. of Scans | Ratio of DCM:IP | Standard Deviation |
|---|---|---|---|---|
| 30720 | 1 | 8500 | 30720 | 529 |
| 30720 | 2 | 7337 | 15360 | 20 |
| 30720 | 3 | 7195 | 10240 | 14 |
| 30720 | 4 | 7168 | 7680 | — |

TABLE 31

| No. of IP | No. of DCMs | Average No. of Scans | Ratio of DCM:IP | Standard Deviation |
|---|---|---|---|---|
| 31744 | 1 | 8316 | 31744 | 120 |
| 31744 | 2 | 7351 | 15872 | 46 |
| 31744 | 3 | 7187 | 10581 | 10 |
| 31744 | 4 | 7152 | 7936 | — |

TABLE 32

| No. of IP | No. of DCMs | Average No. of Scans | Ratio of DCM:IP | Standard Deviation |
|---|---|---|---|---|
| 32768 | 1 | 8398 | 32768 | 214 |
| 32768 | 2 | 7329 | 16384 | 52 |
| 32768 | 3 | 7176 | 10923 | 16 |
| 32768 | 4 | 7121 | 8192 | — |

Example 7

Operation of a Saturated Hash Table with a Mixture of Data Conversion Modules

The same data used in Example 5 and Example 6 is used to determine the number of scans that would need to be performed out of a maximum of 158,344 (number of file names) using all possible combinations of eight well-known algorithms (e.g., data conversion modules): DJB2, Murmur, SDBM, RS, JS, BKDR, FNV, and AP and for hash table sizes of 1,024 KB-16,384 KB. Each algorithm is used to determine an index position of the hash table to store each file name. For example, when one algorithm is used, the file name is stored at one index position of the hash table. When two algorithms are used, the file name is stored at two index positions of the hash table and so on. As illustrated in Tables 33-48 below, two, three or four algorithms, on average, is always better than one, five, six, seven, or eight algorithms.

TABLE 33

| No. of IP | No. of DCMs | Average No. of Scans | Ratio of DCM:IP | Standard Deviation |
|---|---|---|---|---|
| 1024 | 1 | 36051 | 1024 | 6393 |
| 1024 | 2 | 32757 | 512 | 1532 |
| 1024 | 3 | 34308 | 341 | 616 |
| 1024 | 4 | 37018 | 256 | 415 |
| 1024 | 5 | 40053 | 205 | 420 |
| 1024 | 6 | 43055 | 171 | 383 |
| 1024 | 7 | 45850 | 146 | 311 |
| 1024 | 8 | 48377 | 128 | — |

TABLE 34

| No. of IP | No. of DCMs | Average No. of Scans | Ratio of DCM:IP | Standard Deviation |
|---|---|---|---|---|
| 2048 | 1 | 25850 | 2048 | 5493 |
| 2048 | 2 | 21391 | 1024 | 1339 |
| 2048 | 3 | 21169 | 683 | 617 |
| 2048 | 4 | 21787 | 512 | 408 |
| 2048 | 5 | 22785 | 410 | 336 |
| 2048 | 6 | 24014 | 341 | 294 |
| 2048 | 7 | 25385 | 293 | 259 |
| 2048 | 8 | 26822 | 256 | — |

TABLE 35

| No. of IP | No. of DCMs | Average No. of Scans | Ratio of DCM:IP | Standard Deviation |
|---|---|---|---|---|
| 3072 | 1 | 21043 | 3072 | 4140 |
| 3072 | 2 | 17046 | 1536 | 1038 |
| 3072 | 3 | 16859 | 1024 | 452 |
| 3072 | 4 | 17153 | 768 | 281 |
| 3072 | 5 | 17543 | 614 | 229 |
| 3072 | 6 | 17987 | 512 | 182 |
| 3072 | 7 | 18491 | 439 | 140 |
| 3072 | 8 | 19106 | 384 | — |

TABLE 36

| No. of IP | No. of DCMs | Average No. of Scans | Ratio of DCM:IP | Standard Deviation |
|---|---|---|---|---|
| 4096 | 1 | 17977 | 4096 | 3008 |
| 4096 | 2 | 14394 | 2048 | 529 |
| 4096 | 3 | 14461 | 1365 | 285 |
| 4096 | 4 | 14940 | 1024 | 215 |
| 4096 | 5 | 15417 | 819 | 175 |
| 4096 | 6 | 15847 | 683 | 139 |
| 4096 | 7 | 16235 | 585 | 124 |
| 4096 | 8 | 16604 | 512 | — |

TABLE 37

| No. of IP | No. of DCMs | Average No. of Scans | Ratio of DCM:IP | Standard Deviation |
|---|---|---|---|---|
| 5120 | 1 | 15871 | 5120 | 2588 |
| 5120 | 2 | 12823 | 2560 | 405 |
| 5120 | 3 | 12906 | 1707 | 161 |
| 5120 | 4 | 13456 | 1280 | 118 |
| 5120 | 5 | 14020 | 1024 | 106 |
| 5120 | 6 | 14503 | 853 | 109 |
| 5120 | 7 | 14894 | 731 | 88 |
| 5120 | 8 | 15197 | 640 | — |

TABLE 38

| No. of IP | No. of DCMs | Average No. of Scans | Ratio of DCM:IP | Standard Deviation |
|---|---|---|---|---|
| 6144 | 1 | 15193 | 6144 | 2650 |
| 6144 | 2 | 11712 | 3072 | 460 |
| 6144 | 3 | 11758 | 2048 | 200 |
| 6144 | 4 | 12300 | 1536 | 125 |
| 6144 | 5 | 12903 | 1229 | 82 |
| 6144 | 6 | 13438 | 1024 | 56 |

TABLE 38-continued

| No. of IP | No. of DCMs | Average No. of Scans | Ratio of DCM:IP | Standard Deviation |
|---|---|---|---|---|
| 6144 | 7 | 13865 | 878 | 51 |
| 6144 | 8 | 14195 | 768 | — |

TABLE 39

| No. of IP | No. of DCMs | Average No. of Scans | Ratio of DCM:IP | Standard Deviation |
|---|---|---|---|---|
| 7168 | 1 | 13665 | 7168 | 1728 |
| 7168 | 2 | 10831 | 3584 | 260 |
| 7168 | 3 | 10831 | 2389 | 134 |
| 7168 | 4 | 11311 | 1792 | 80 |
| 7168 | 5 | 11906 | 1434 | 70 |
| 7168 | 6 | 12475 | 1195 | 49 |
| 7168 | 7 | 12985 | 1024 | 34 |
| 7168 | 8 | 13425 | 896 | — |

TABLE 40

| No. of IP | No. of DCMs | Average No. of Scans | Ratio of DCM:IP | Standard Deviation |
|---|---|---|---|---|
| 8192 | 1 | 13159 | 8192 | 2287 |
| 8192 | 2 | 10253 | 4096 | 299 |
| 8192 | 3 | 10161 | 2731 | 124 |
| 8192 | 4 | 10569 | 2048 | 69 |
| 8192 | 5 | 11125 | 1638 | 50 |
| 8192 | 6 | 11726 | 1365 | 43 |
| 8192 | 7 | 12312 | 1170 | 25 |
| 8192 | 8 | 12832 | 1024 | — |

TABLE 41

| No. of IP | No. of DCMs | Average No. of Scans | Ratio of DCM:IP | Standard Deviation |
|---|---|---|---|---|
| 9216 | 1 | 12707 | 9216 | 1693 |
| 9216 | 2 | 9765 | 4608 | 279 |
| 9216 | 3 | 9594 | 3072 | 95 |
| 9216 | 4 | 9929 | 2304 | 57 |
| 9216 | 5 | 10435 | 1843 | 54 |
| 9216 | 6 | 10997 | 1536 | 43 |
| 9216 | 7 | 11570 | 1317 | 35 |
| 9216 | 8 | 12118 | 1152 | — |

TABLE 42

| No. of IP | No. of DCMs | Average No. of Scans | Ratio of DCM:IP | Standard Deviation |
|---|---|---|---|---|
| 10240 | 1 | 11787 | 10240 | 1762 |
| 10240 | 2 | 9298 | 5120 | 201 |
| 10240 | 3 | 9149 | 3413 | 75 |
| 10240 | 4 | 9400 | 2560 | 56 |
| 10240 | 5 | 9803 | 2048 | 55 |
| 10240 | 6 | 10288 | 1707 | 56 |
| 10240 | 7 | 10799 | 1463 | 55 |
| 10240 | 8 | 11297 | 1280 | — |

TABLE 43

| No. of IP | No. of DCMs | Average No. of Scans | Ratio of DCM:IP | Standard Deviation |
|---|---|---|---|---|
| 11264 | 1 | 11634 | 11264 | 1725 |
| 11264 | 2 | 9065 | 5632 | 211 |
| 11264 | 3 | 8845 | 3755 | 66 |
| 11264 | 4 | 9032 | 2816 | 48 |
| 11264 | 5 | 9378 | 2253 | 42 |
| 11264 | 6 | 9803 | 1877 | 42 |
| 11264 | 7 | 10275 | 1609 | 42 |
| 11264 | 8 | 10759 | 1408 | — |

TABLE 44

| No. of IP | No. of DCMs | Average No. of Scans | Ratio of DCM:IP | Standard Deviation |
|---|---|---|---|---|
| 12288 | 1 | 11250 | 12288 | 1252 |
| 12288 | 2 | 8769 | 6144 | 159 |
| 12288 | 3 | 8564 | 4096 | 72 |
| 12288 | 4 | 8710 | 3072 | 59 |
| 12288 | 5 | 8989 | 2458 | 42 |
| 12288 | 6 | 9352 | 2048 | 36 |
| 12288 | 7 | 9781 | 1755 | 31 |
| 12288 | 8 | 10269 | 1536 | — |

TABLE 45

| No. of IP | No. of DCMs | Average No. of Scans | Ratio of DCM:IP | Standard Deviation |
|---|---|---|---|---|
| 13312 | 1 | 11117 | 13312 | 1550 |
| 13312 | 2 | 8583 | 6656 | 130 |
| 13312 | 3 | 8342 | 4437 | 63 |
| 13312 | 4 | 8432 | 3328 | 44 |
| 13312 | 5 | 8650 | 2662 | 44 |
| 13312 | 6 | 8952 | 2219 | 45 |
| 13312 | 7 | 9311 | 1902 | 48 |
| 13312 | 8 | 9718 | 1664 | — |

TABLE 46

| No. of IP | No. of DCMs | Average No. of Scans | Ratio of DCM:IP | Standard Deviation |
|---|---|---|---|---|
| 14336 | 1 | 10635 | 14336 | 1039 |
| 14336 | 2 | 8408 | 7168 | 153 |
| 14336 | 3 | 8172 | 4779 | 74 |
| 14336 | 4 | 8222 | 3584 | 44 |
| 14336 | 5 | 8389 | 2867 | 31 |
| 14336 | 6 | 8627 | 2389 | 28 |
| 14336 | 7 | 8920 | 2048 | 23 |
| 14336 | 8 | 9253 | 1792 | — |

TABLE 47

| No. of IP | No. of DCMs | Average No. of Scans | Ratio of DCM:IP | Standard Deviation |
|---|---|---|---|---|
| 15360 | 1 | 10342 | 15360 | 1110 |
| 15360 | 2 | 8268 | 7680 | 139 |
| 15360 | 3 | 8014 | 5120 | 49 |
| 15360 | 4 | 8046 | 3840 | 42 |
| 15360 | 5 | 8189 | 3072 | 37 |
| 15360 | 6 | 8407 | 2560 | 33 |

TABLE 47-continued

| No. of IP | No. of DCMs | Average No. of Scans | Ratio of DCM:IP | Standard Deviation |
|---|---|---|---|---|
| 15360 | 7 | 8682 | 2194 | 26 |
| 15360 | 8 | 9010 | 1920 | — |

TABLE 48

| No. of IP | No. of DCMs | Average No. of Scans | Ratio of DCM:IP | Standard Deviation |
|---|---|---|---|---|
| 16384 | 1 | 10054 | 16384 | 1171 |
| 16384 | 2 | 8131 | 8192 | 104 |
| 16384 | 3 | 7884 | 5461 | 49 |
| 16384 | 4 | 7885 | 4096 | 35 |
| 16384 | 5 | 7983 | 3277 | 28 |
| 16384 | 6 | 8143 | 2731 | 26 |
| 16384 | 7 | 8347 | 2341 | 20 |
| 16384 | 8 | 8595 | 2048 | — |

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method, comprising:
populating a hash table with a first new digest value;
wherein the first new digest value is associated with a first data item;
wherein the hash table comprises a plurality of index positions;
wherein the hash table is located in memory of a computer;
wherein the populating step comprises:
storing the first new digest value at least at a first index position and a second index position of the hash table, wherein, prior to the storing step, the first index position contains a first old digest value, and wherein the second index position contains a second old digest value;
wherein the storing step comprises:
determining the first index position, and the second index position of the hash table based on an attribute of the first data item, wherein the determining step comprises:
first producing a first hash value via a first data conversion module; and
second producing a second hash value via a second data conversion module;
wherein the first hash value is associated with the first index position;
wherein the second hash value is associated with the second index position;
first comparing the first new digest value to the first old digest value;
second comparing the first new digest value to the second old digest value;
first replacing the first old digest value with the first new digest value; and
second replacing the second old digest value with the first new digest value.

2. The method of claim 1, further comprising:
transmitting, in response to at least one of the first or second comparing steps, a comparison result to an executable program.

3. The method of claim 1, wherein the storing step is a first storing step, the method further comprising:
populating the hash table with a second new digest value;
wherein the second new digest value is associated with a second data item;
wherein the populating step comprises:
second storing the second new digest value at least at a third index position and a fourth index position of the hash table.

4. The method of claim 3, wherein the first data item is different than the second data item.

5. The method of claim 4, wherein the third index position is the same as the first index position, wherein the first new digest value is replaced with the second new digest value at the first index position, and wherein, after the second storing step, the first new digest value is stored at the second index position and the second new digest value is stored at the first index position and the fourth index position.

6. The method of claim 4, wherein the third index position and fourth index position are both different than the first index position and the second index position, and wherein after the second storing step, the first new digest value is stored at the first index position and the second index position and the second new digest value is stored at the third index position and fourth index position.

7. The method of claim 1, wherein the hash table is in communication with a hash program, Wherein the hash program comprises at least three data conversion modules, and wherein the ratio of the plurality of index positions to the data conversion modules is at least about 1024:3.

8. A system comprising:
(a) a memory of a computer;
(b) a hash table, wherein the hash table is located in the memory of the computer, and wherein the hash table comprises a plurality of index positions; and
(c) a hash program in communication with the hash table, wherein the hash program is operable to populate the hash table with a first new digest value, wherein the first new digest value is associated with a first data item, and wherein the first new digest value is stored at least at a first index position and a second index position of the hash table, wherein, prior to being stored, the first index position contains a first old digest value, and wherein the second index position contains a second old digest value;
wherein the hash program is operable to produce a first hash value via a first data conversion module and a second hash value via a second data conversion module, wherein the first hash value is associated with the first index position, and wherein the second hash value is associated with the second index position; and
wherein the hash program is operable to compare the first new digest value to the first old digest value and the second old digest value, and wherein the hash program is operable to replace both the first old digest value and the second old digest value with the first new digest value.

9. The system of claim 8, wherein the first index position contains a first old digest value, and wherein the second index position contains a second old digest value.

10. The system of claim 8, wherein the hash program is operable to transmit a comparison result to an executable program.

11. The system of claim 8, wherein the hash program is operable to determine the first index position and the second index position of the hash table based on an attribute of the first data item.

12. The system of claim 8, wherein the hash program is operable to populate the hash table with a second new digest value, and wherein the second new digest value is associated with a second data item, and wherein the second new digest value is stored at least at a third index position and a fourth index position of the hash table.

13. The system of claim 8, wherein the hash program comprises at least three data conversion modules, and wherein the ratio of the plurality of index positions to the data conversion modules is at least about 1024:3.

14. The system of claim 8, wherein the first data item is one of a plurality of data items, and wherein the ratio of the plurality of index positions of the hash table to the plurality of data items is at least 1:10.

15. The system of claim 8, wherein each of the plurality of index positions contains one digest value.

* * * * *